United States Patent
Stauderman et al.

(10) Patent No.: US 12,544,371 B2
(45) Date of Patent: Feb. 10, 2026

(54) METHODS AND COMPOSITIONS FOR TREATING ACUTE LUNG INJURY AND ACUTE RESPIRATORY DISTRESS SYNDROME

(71) Applicant: CalciMedica, Inc., La Jolla, CA (US)

(72) Inventors: Kenneth A. Stauderman, La Jolla, CA (US); Michael Dunn, La Jolla, CA (US); Sudarshan Hebbar, La Jolla, CA (US); Rachel Leheny, La Jolla, CA (US)

(73) Assignee: CalciMedica, Inc., La Jolla, CA (US)

( * ) Notice: Subject to any disclaimer, the term of this patent is extended or adjusted under 35 U.S.C. 154(b) by 814 days.

(21) Appl. No.: 17/906,229

(22) PCT Filed: Mar. 19, 2021

(86) PCT No.: PCT/US2021/023345
§ 371 (c)(1),
(2) Date: Sep. 13, 2022

(87) PCT Pub. No.: WO2021/189013
PCT Pub. Date: Sep. 23, 2021

(65) Prior Publication Data
US 2023/0120819 A1   Apr. 20, 2023

Related U.S. Application Data

(60) Provisional application No. 63/027,092, filed on May 19, 2020, provisional application No. 62/992,826, filed on Mar. 20, 2020.

(51) Int. Cl.
| | | |
|---|---|---|
| *A61K 31/497* | (2006.01) | |
| *A61K 45/06* | (2006.01) | |
| *A61P 11/00* | (2006.01) | |
| *A61P 29/00* | (2006.01) | |
| *A61P 31/14* | (2006.01) | |

(52) U.S. Cl.
CPC ............ *A61K 31/497* (2013.01); *A61K 45/06* (2013.01); *A61P 11/00* (2018.01); *A61P 29/00* (2018.01); *A61P 31/14* (2018.01)

(58) Field of Classification Search
CPC ................................................... A61K 31/497
USPC ................................................... 514/255.05
See application file for complete search history.

(56) References Cited

U.S. PATENT DOCUMENTS

| | | |
|---|---|---|
| 6,348,480 B1 | 2/2002 | Kubota et al. |
| 6,506,747 B1 | 1/2003 | Betageri et al. |
| 6,958,339 B2 | 10/2005 | Kubota et al. |
| 7,285,554 B2 | 10/2007 | Kubota et al. |
| 7,709,518 B2 | 5/2010 | Chen et al. |
| 7,816,535 B2 | 10/2010 | Bohnert et al. |
| 8,030,336 B2 | 10/2011 | Burns et al. |
| 8,546,403 B2 | 10/2013 | Whitten et al. |
| 8,557,861 B2 | 10/2013 | Chen |
| 8,754,219 B2 | 6/2014 | Whitten et al. |
| 8,980,629 B2 | 3/2015 | Whitten et al. |
| 9,120,751 B2 | 9/2015 | Whitten et al. |
| 9,399,638 B2 | 7/2016 | Irlapati et al. |
| 9,604,978 B2 | 3/2017 | Chen et al. |
| 9,611,233 B2 | 4/2017 | Yamada et al. |
| 9,856,240 B2 | 1/2018 | Cao et al. |
| 10,106,529 B2 | 10/2018 | Whitten et al. |
| 10,478,435 B2 | 11/2019 | Stauderman et al. |
| 10,703,722 B2 | 7/2020 | Whitten et al. |
| 10,821,109 B1 | 11/2020 | Velicelebi et al. |
| 11,013,737 B2 | 5/2021 | Velicelebi et al. |
| 11,311,535 B2 | 4/2022 | Velicelebi et al. |
| 11,439,639 B2 | 9/2022 | Velicelebi et al. |
| 11,752,148 B2 | 9/2023 | Velicelebi et al. |
| 11,905,248 B2 | 2/2024 | Whitten et al. |
| 2001/0044445 A1 | 11/2001 | Bamaung et al. |
| 2002/0034728 A1 | 3/2002 | Normant et al. |
| 2003/0114353 A1 | 6/2003 | Parks et al. |
| 2006/0030567 A1 | 2/2006 | Ehrenfreund et al. |
| 2006/0067952 A1 | 3/2006 | Chen |
| 2006/0100245 A1 | 5/2006 | Bakthavatchalam et al. |
| 2006/0199845 A1 | 9/2006 | Sun et al. |
| 2006/0235028 A1 | 10/2006 | Li et al. |
| 2007/0031814 A1 | 2/2007 | Roos et al. |
| 2007/0105867 A1 | 5/2007 | Chidambaram et al. |
| 2007/0249050 A1 | 10/2007 | Chen et al. |
| 2007/0249051 A1 | 10/2007 | Bohnert et al. |
| 2007/0249609 A1 | 10/2007 | Chen et al. |
| 2007/0249661 A1 | 10/2007 | Chen et al. |
| 2007/0254363 A1 | 11/2007 | Chen et al. |

(Continued)

FOREIGN PATENT DOCUMENTS

| | | |
|---|---|---|
| JP | 2001080412 A | 3/2001 |
| JP | 2001522834 A | 11/2001 |

(Continued)

OTHER PUBLICATIONS

Berridge. Inositol trisphosphate and calcium signalling. Nature 361:315-325 (1993).
Cho. Recent Advances in Oral Prodrug Discovery. Annual Reports in Medicinal Chemistry 41:395-407 (2006).
Churchill et al. Imaging of intracellular calcium stores in single permeabilized lens cells. Am. J. Physiol. 276:C426-434 (1999).
Dargie et al. Comparison of Ca2+ mobilizing activities of cyclic ADP-ribose and inositol trisphosphate. Cell Regul. 1:279-290 (1990).
Fagan et al. Regulation of the Ca2+-inhibitable adenylyl cyclase type VI by capacitative Ca2+ entry requires localization in cholesterol-rich domains. J Biol Chem 275(34):26530-26537 (Aug. 25, 2000).

(Continued)

*Primary Examiner* — Raymond J Henley, III
(74) *Attorney, Agent, or Firm* — DLA Piper LLP (US)

(57) ABSTRACT

Compositions and methods related to the treatment of acute lung injury (ALI) and acute respiratory distress syndrome (ARDS) including viral pneumonia through the pharmaceutical manipulation of calcium signaling are disclosed. Such compositions and methods may be used to reduce pro-inflammatory cytokine releases that may lead to ALI and/or ARDS.

20 Claims, 15 Drawing Sheets

(56) References Cited

U.S. PATENT DOCUMENTS

| | | |
|---|---|---|
| 2007/0254912 A1 | 11/2007 | Chen et al. |
| 2007/0254925 A1 | 11/2007 | Vo et al. |
| 2007/0254926 A1 | 11/2007 | Jiang et al. |
| 2008/0064874 A1 | 3/2008 | Dunkel et al. |
| 2008/0293092 A1 | 11/2008 | Stauderman et al. |
| 2009/0311720 A1 | 12/2009 | Roos et al. |
| 2010/0016598 A1 | 1/2010 | Valacchi et al. |
| 2010/0041762 A1 | 2/2010 | Bohnert et al. |
| 2010/0130510 A1 | 5/2010 | Chen et al. |
| 2010/0130522 A1 | 5/2010 | Jiang et al. |
| 2010/0152241 A1 | 6/2010 | Whitten |
| 2010/0273744 A1 | 10/2010 | Gore et al. |
| 2010/0286103 A1 | 11/2010 | Chen |
| 2010/0292252 A1 | 11/2010 | Chen |
| 2010/0311787 A1 | 12/2010 | Chen et al. |
| 2011/0015184 A1 | 1/2011 | Bohnert et al. |
| 2011/0052643 A1 | 3/2011 | Che et al. |
| 2011/0105447 A1 | 5/2011 | Muthuppalaniappan et al. |
| 2011/0112058 A1 | 5/2011 | Muthuppalaniappan et al. |
| 2011/0130452 A1 | 6/2011 | Venkiteswaran et al. |
| 2011/0230536 A1 | 9/2011 | Whitten et al. |
| 2011/0263612 A1 | 10/2011 | Whitten et al. |
| 2011/0305709 A1 | 12/2011 | Braun et al. |
| 2012/0035237 A1 | 2/2012 | Coe et al. |
| 2012/0053210 A1 | 3/2012 | Whitten et al. |
| 2012/0316182 A1 | 12/2012 | Whitten et al. |
| 2012/0316185 A1 | 12/2012 | Beattie et al. |
| 2013/0252974 A1 | 9/2013 | Altenburger et al. |
| 2014/0105984 A1 | 4/2014 | Ryde et al. |
| 2014/0112978 A1 | 4/2014 | Su et al. |
| 2014/0256771 A1 | 9/2014 | Cao et al. |
| 2020/0101069 A1 | 4/2020 | Stauderman et al. |
| 2020/0253966 A1 | 8/2020 | Stauderman et al. |
| 2022/0056053 A1 | 2/2022 | Stauderman et al. |
| 2023/0226058 A1 | 7/2023 | Stauderman et al. |
| 2024/0010638 A1 | 1/2024 | Stauderman et al. |
| 2024/0058332 A1 | 2/2024 | Stauderman et al. |
| 2024/0307384 A1 | 9/2024 | Velicelebi et al. |

FOREIGN PATENT DOCUMENTS

| | | |
|---|---|---|
| JP | 2003527324 A | 9/2003 |
| JP | 2007514720 A | 6/2007 |
| JP | 2010522207 A | 7/2010 |
| JP | 2014523911 A | 9/2014 |
| WO | WO-9806719 A1 | 2/1998 |
| WO | WO-9924404 A1 | 5/1999 |
| WO | WO-9951580 A1 | 10/1999 |
| WO | WO-0114339 A2 | 3/2001 |
| WO | WO-2004054977 A1 | 7/2004 |
| WO | WO-2004056774 A2 | 7/2004 |
| WO | WO-2005009539 A2 | 2/2005 |
| WO | WO-2005009954 A2 | 2/2005 |
| WO | WO-2005058871 A1 | 6/2005 |
| WO | WO-2006006569 A1 | 1/2006 |
| WO | WO-2006034402 A2 | 3/2006 |
| WO | WO-2006081389 A1 | 8/2006 |
| WO | WO-2006081391 A2 | 8/2006 |
| WO | WO-2006083477 A2 | 8/2006 |
| WO | WO-2006089177 A2 | 8/2006 |
| WO | WO-2007052123 A2 | 5/2007 |
| WO | WO-2007056341 A1 | 5/2007 |
| WO | WO-2007059515 A2 | 5/2007 |
| WO | WO-2007081804 A2 | 7/2007 |
| WO | WO-2007087427 A2 | 8/2007 |
| WO | WO-2007087429 A2 | 8/2007 |
| WO | WO-2007093542 A1 | 8/2007 |
| WO | WO-2007112093 A2 | 10/2007 |
| WO | WO-2007120600 A2 | 10/2007 |
| WO | WO-2008002576 A2 | 1/2008 |
| WO | WO-2008063504 A2 | 5/2008 |
| WO | WO-2008118754 A2 | 10/2008 |
| WO | WO-2009020642 A1 | 2/2009 |
| WO | WO-2009035818 A1 | 3/2009 |
| WO | WO-2009111280 A1 | 9/2009 |
| WO | WO-2010025295 A2 | 3/2010 |
| WO | WO-2010027875 A2 | 3/2010 |
| WO | WO-2010034011 A2 | 3/2010 |
| WO | WO-2010122089 A1 | 10/2010 |
| WO | WO-2010138539 A2 | 12/2010 |
| WO | WO-2011034962 A2 | 3/2011 |
| WO | WO-2011063277 A1 | 5/2011 |
| WO | WO-2011139489 A2 | 11/2011 |
| WO | WO-2011139765 A2 | 11/2011 |
| WO | WO-2012027710 A2 | 3/2012 |
| WO | WO-2012151355 A1 | 11/2012 |
| WO | WO-2012170931 A2 | 12/2012 |
| WO | WO-2012170951 A2 | 12/2012 |
| WO | WO-2013059666 A1 | 4/2013 |
| WO | WO-2013059677 A1 | 4/2013 |
| WO | WO-2013164769 A1 | 11/2013 |
| WO | WO-2014043715 A1 | 3/2014 |
| WO | WO-2014059333 A1 | 4/2014 |
| WO | WO-2014203217 A1 | 12/2014 |
| WO | WO-2016138472 A1 | 9/2016 |
| WO | WO-2017027400 A1 | 2/2017 |
| WO | WO-2018140796 A1 | 8/2018 |
| WO | WO-2020053834 A1 | 3/2020 |
| WO | WO-2020072942 A1 | 4/2020 |
| WO | WO-2021189013 A1 | 9/2021 |
| WO | WO-2021236820 A1 | 11/2021 |

OTHER PUBLICATIONS

Fedorak et al. A novel colon-specific steroid prodrug enhances sodium chloride absorption in rat colitis. Am. J. Physiol. 269:G210-218 (1995).

Gandhirajan et al., Blockade of NOX2 and STIM1 signaling limits lipopolysaccharide-induced vascular inflammation. J Clin Invest. 123:887-902 (2013).

Gerasimenko et al. Inositol trisphosphate and cyclic ADP-ribose-mediated release of Ca2+ from single isolated pancreatic zymogen granules. Cell 84:473-480 (1996).

Gromoda et al. Cyclic ADP-ribose and inositol 1,4,5-triphosphate mobilizes Ca2+ from distinct intracellular pools in permeabilized lacrimal acinar cells. FEBS Lett. 360:303-306 (1995).

Guse et al. Regulation of calcium signalling in T lymphocytes by the second messenger cyclic ADP-ribose. Nature 398:70-73 (1999).

Hochhaus et al. A selective HPLC/RIA for dexamethasone and its prodrug dexamethasone-21-sulphobenzoate sodium in biological fluids. Biomed. Chrom. 6:283-286 (1992).

Hofer et al. Free [Ca2+] dynamics measured in agonist-sensitive stores of single living intact cells: a new look at the refilling process. EMBO J. 17:1986-1995 (1998).

Larsen et al. Prodrug forms for the sulfonamide group. I. Evaluation of N-acyl derivatives, N-sulfonylaminides, N-sulfonylsulfilimines and sulfonylureas as possible prodrug derivatives. Int. J. Pharmaceutics 37:87-95 (1987).

Larsen et al. Prodrug forms for the sulfonamide group. II. water-soluble amino acid derivatives of N-methylsulfonylaminides as possible prodrug derivatives. Int'l J of Pharmaceutics 47:103-110 (1988).

Lewis. Calcium Signaling Mechanisms in T Lymphocytes. Annu Rev Immunol 19:497-521 (2001).

Macian et al. Transcriptional mechanisms underlying lymphocyte tolerance. Cell 109(6):719-731 (Jun. 14, 2002).

McLeod et al. A glucocorticoid prodrug facilitates normal mucosal function in rat colitis without adrenal suppression. Gastroenterol 106:405-413 (1994).

Miller et al., Auxora versus standard of care for the treatment of severe or critical COVID-19 pneumonia: results from a randomized controlled trial. Randomized Controlled Trial 24(1):502 (2020).

Miller et al. Histone deacetylase inhibitors. Med. Chem. 46(24):5097-5116 (2003).

Miyawaki et al. Fluorescent indicators for Ca2+ based on green fluorescent proteins and calmodulin. Nature 388(6645):882-887 (Aug. 28, 1997).

Nogrady. Medicinal Chemistry A Biochemical Approach, Oxford University Press, New York, pp. 388-392 (1985).

(56) References Cited

OTHER PUBLICATIONS

Nunez et al. Cell proliferation depends on mitochondrial Ca2+ uptake: inhibition by salicylate. J Physiol. 571(Pt 1):57-73 (Feb. 15, 2006/ Epub Dec. 8, 2005).
Parekh et al. Store Depletion and Calcium Influx. Physiol Rev 77(4):901-930 (1997).
Parekh et al. Store-Operated Calcium Channels. Physiol Rev 85:757-810 (2005).
PCT/US2021/023345 International Search Report and Written Opinion dated Jul. 15, 2021.
Putney et al. A model for receptor-regulated calcium entry. Cell Calcium. 7(1):1-12 (1986).
Putney et al. The signal for capacitative calcium entry. Cell 75(2):199-201 (1993).
Rao et al. Transcription factors of the NFAT family: regulation and function. Annu Rev Immunol. 15:707-747 (1997).
Rooseboom et al. Enzyme-catalyzed activation of anticancer prodrugs. Pharmacological Reviews 56:53-102 (2004).
Rudensky et al. FOXP3 and NFAT: partners in tolerance. Cell 126(2):253-256 (2006).
Sadikot et al. Nanomedicine for Treatment of Acute Lung Injury and Acute Respiratory Distress Syndrome. Biomed Hub 2(2):1-12 (2017).
Saulnier et al. An Efficient Method for The Synthesis of Guanidino Prodrugs. Bioorg Med Chem Lett 4(16):1985-1990 (1994).
Seeley et al. Calcium flux and endothelial dysfunction during acute lung injury: a STIMulating target for therapy. J Clin Invest 123(3):1015-8 (2013).
Sheahan et al., Comparative therapeutic efficacy of remdesivir and combination lopinavir, ritonavir, and interferon beta against Mers-COV. Nat Commun 11(1):222 (2020).
Silverman. Chapter 8: Prodrugs and Drug Delivery Systems. The Organic Chemistry of Drug Design and Drug Action, Academic Press, Inc., San Diego (pp. 352-401) (1992).
Sinkula et al. Rationale for design of biologically reversible drug derivatives: prodrugs. J. Pharm. Sci. 64:181-210 (1975).
Streb et al. Release of Ca2+ from a nonmitochondrial intracellular store in pancreatic acinar cells by inositol-1,4,5-trisphosphate. Nature 306:67-69 (1983).
Waldron et al., The Orai Ca2+ channel inhibitor CM4620 targets both parenchymal and immune cells to reduce inflammation in experimental acute pancreatitis. J Physiol. 597(12):3085-3105 (2019).
Wang et al., Inhibition of SOCs attenuates acute lung injury induced by severe acute pancreatitis in rats and PMVECs injury induced by lipopol-ysaccharide. Inflammation 39(3):1049-105 (2016).
Wen et al. Orai1 inhibition prevents calcium toxicity and acute pancreatitis. Pancreatology 3.14 Supp 1:S100-S101 (2014).
Winslow et al. Calcium Signalling in Lymphocytes. Current Opinion in Immunology 16:299-307 (2003).
Wu et al. FOXP3 controls regulatory T cell function through cooperation with NFAT. Cell 126(2):375-387 (Jul. 28, 2006).
Yu et al. Rapid turnover of calcium in the endoplasmic reticulum during signaling. Studies with cameleon calcium indicators. J. Biol. Chem. 275:23648-23653 (2000).
Arthritis. http://en.wikipedia.org/wiki/Arthritis (1 pg.) (2014).
Ashizawa. Optimization of salts/crystal form and crystallization technique. Pharm Tech Japan 18(10):81-96 (2002).
Baba et al. Coupling of STIM1 to store-operated Ca2+ entry through its constitutive and inducible movement in the endoplasmic reticulum. PNAS USA 103:16704-16709 (2006).
Basile et al. T helper 17 cells in the pathophysiology of acute and chronic kidney disease. Kidney Res Clin Pract 40(1):12-28 (2021).
Bauer, T. T. et al. Acute respiratory distress syndrome and pneumonia: a comprehensive review of clinical data. Clin Infect Dis. 43(6):748-756 (2006).
Braga et al. Crystal polymorphism and multiple crystal forms. Molecular networks pp. 87-95 (2009).
Brayer et al. Alleles from chromosomes 1 and 3 of NOD mice combine to influence Sjogren's syndrome-like autoimmune exocrinopathy. J. Rheumatol. 27:1896-1904 (2000).
Caira. Crystalline Polymorphism of Organic Compounds. Topics in Current Chemistry. 198:163-208 (Jan. 1998).
Chaplan, et al. Quantitative assessment of tactile allodynia in the rat paw. J Neurosci Methods 53(1):55-63 (1994).
Chen et al., CAPlus Accession No. 2012:1630648 (2012).
Colitis. http://www.healthline.com/health/ulterative-colitis-take-control-can-it-be-cured? (3 pgs) (2014).
Dean et al. Recent Advances in the Synthesis and Applications of Radiolabeled Compounds for Drug Discovery and Development. Current Pharmaceutical Design 6:110 (2000).
Derler et al. The action of selective CRAC channel blockers is affected by the Orai pore geometry. Cell Calcium 53(2):139-151 (2013).
European Medicines Agency. Public summary of opinion on orphan designation N-(5-(6-chloro-2,2-difluorobenzo[d][1,3]dioxol-5-yl)pyrazin-2-yl)-2-fluoro-6-methylbenzamide for the treatment of acute pancreatitis. Committee report [online]. (Dec. 13, 2016) [Retrieved on Feb. 26, 2018]. Retrieved from the Internet: <URL: http://www.ema.europa.eu/docs/en_GB/document_library/Orphan_designation/2016/12NVC500 217961.pdf> (5 pgs.).
Evans. Synthesis of Radiolabelled Compounds. Journal of Radioanalytical and Nuclear Chemistry 64(1-2):9-32 (1981).
Feske et al. A Mutation in Orai1 Causes Immune Deficiency by Abrogating CRAC Channel Function. Nature 441:179-185 (2006).
Frick. The role of calcium in acute pancreatitis. Surgery 152(3 Suppl 1):S157-S163 (2012).
Funaba et al. Degranulation in RBL-2H3 cells: regulation by calmodulin pathway. Cell Biol Int 27:879-885 (2003).
Gerasimenko et al. Ca2+ release-activated Ca2+ channel blockade as a potential tool in antipancreatitis therapy. PNAS USA 110(32):13186-13191 (2013).
Gerasimenko et al. Ca2+ signalling underlying pancreatitis. Cell Calcium 70:95-101 (2018).
Gomez-Puerta et al. Tyrosine kinase inhibitors for the treatment of rheumatoid arthritis. Curr Top Med Chem. 13(6):760-773 (2013).
Gompertz et al. Bedside index for severity in acute pancreatitis (BISAP) score as predictor of clinical outcome in acute pancreatitis: retrospective review of 128 patients. Rev Med Chil 140(8):977-983 (2012).
Gorenjak. 4: Kidneys and Autoimmune Disease. Kidneys and Autoimmune disease—eJIFCC 20/01 http://www.ifcc.org (2009).
Griffiths et al. Genetic analysis of collagen-induced arthritis in rats: a polygenic model for rheumatoid arthritis predicts a common framework of cross-species inflammatory/autoimmune disease loci. Immunol. Rev. 184:172-183 (2001).
Guram et al. New catalysts for Suzuki-Miyaura coupling reactions of heteroatom-substituted heteroaryl chlorides. J Org Chem 72:5104-5112 (2007).
Haider et al. Use of Calcium Channel Blockers is Associated with Mortality in Patients with Chronic Kidney Disease. Kidney Blood Press Res 40:630-637 (2015).
Hilfiker et al. Relevance of solid-state properties for pharmaceutical products. Polymorphism: in the pharmaceutical industry pp. 1-19 (2006).
Huang et al. STIM1 carboxyl-terminus activates native SOC, Icrac and TRPC1 channels. Nature Cell Biology 8(9):1003-1010 (2006).
Humbles et al. The murine CCR3 receptor regulates both the role of eosinophils and mast cells in allergen-induced airway inflammation and hyperresponsiveness. PNAS USA 99:1479-1484 (2002).
Humphreys-Beher et al. New concepts for the development of autoimmune exocrinopathy derived from studies with the NOD mouse model. Arch. Oral Biol. 44( Suppl 1):S21-25 (1999).
Jefferson et al. Experimental mesangial proliferative glomerulonephritis (the anti-Thy-1.1 model). J. Nephrol. 12:297-307 (1999).
Kabalka et al., The synthesis of radiolabeled compounds via organometallic intermediates. Tetrahedron 45(21):6601-6621 (1989).
Karlsson et al. Pulmonary-Allergy, Dermatological, Gastrointestinal & Arthiritis Phosphodiesterase 4 Inhibitors for the treatment of asthma. Exp. Opin. Their Patents. 7(9):989-1003 (1997).
Kojima. Iyakuhin kaihatsu niokeru kesshosei sentaku no kouritsuka wo mezashite (Aiming at efficient selection of crystallinity in the development of pharmaceutical products). Journal of Pharmaceutical science and technology 68(5):344-349 (2008).

(56) References Cited

OTHER PUBLICATIONS

Lian et al. ORAI1 mutations abolishing store-operated Ca 2+ entry cause anhidrotic ectodermal dysplasia with immunodeficiency. J Allergy Clin Immunol 142(4):1297-1310.e11 (2018).
Liou et al. STIM is a Ca2+ sensor essential for Ca2+-store-depletion-triggered Ca2+ influx. Curr. Biol. 15(13):1235-1241 (2005).
Luik et al. The elementary unit of store-operated Ca2+ entry: local activation of CRAC channels by STIM1 at ER-plasma membrane junctions. J. Cell Biol. 174:815-825 (2006).
Luo et al. Upregulation of dorsal root ganglion (alpha)2(delta) calcium channel subunit and its correlation with allodynia in spinal nerve-injured rats. J. Neurosci 21:1868-1875 (2001).
Manji et al. STIM1: a novel phosphoprotein located at the cell surface. Biochim Biophys Acta. 1481(1):147-155 (2000).
Mercer et al. Large store-operated calcium selective currents due to co-expression of Orai1 or Orai2 with the intracellular calcium sensor, Stim1. JBC 281:24979-24990 (2006).
Michelucci et al. Role of STIM1/ORAI1-mediated store-operated Ca2+ entry in skeletal muscle physiology and disease. Cell Calcium 76:101-115 (2018).
Millar et al. Functional expression of a cloned *Drosophila muscarinic* acetylcholine receptor in a stable *Drosophila* cell line. Exp. Biol. 198:1843-1850 (1995).
Miller et al. 353 An Open-Label, Dose-Response Study of CM4620-Injectable Emulsion in Emergency Department Patients With Acute Pancreatitis. Research Forum Abstract 74(4, Supplement):S138-S139 (2019).
Multiple Sclerosis Prevention. Retrieved from http://www.webmd.com/multiple-sclerosis/tc/multiple-sclerosis-ms-prevention (3 pgs.) (2017).
Multiple Sclerosis Treatment. Retrieved from http://www.webmd.com/multiple-sclerosis/tc/multiple-sclerosis-ms-medications#1 (4 pgs) (2017).
Papachristou et al. Comparison of Bisap, Ranson's, Apache-II, and CTSI scores in predicting organ failure, complications, and mortality in acute pancreatitis. Am J Gastroenterol. 105(2):435-441 (2010).
Patani et al., Bioisosterism: A Rational Approach In Drug Design. Chemical Reviews. American Chemical Society 96:3147-3176 (1996).
Patterson et al. Phospholipase C-γ is Required for Agonist-Induced Ca2+ Entry. Cell 111(4):529-541 (2002).
PCT/US2011/031992 International Search Report and Written Opinion dated Dec. 7, 2011.
PCT/US2016/019924 International Search Report and Written Opinion dated Jul. 8, 2016.
PCT/US2016/045846 International Search Report and Written Opinion dated Oct. 24, 2016.
PCT/US2018/015555 International Search Report and Written Opinion dated Apr. 4, 2018.
PCT/US2021/033237 International Search Report and Written Opinion dated Jul. 30, 2021.
Petersen. Can specific calcium channel blockade be the basis for a drug-based treatment of acute pancreatitis? Expert Reviews 8(4):339-341 (2014).
Prakriya et al. Store-Operated Calcium Channels. Physiol Rev 95:1383-1436 (2015).
Prakriya et al. Store-operated calcium channels: properties, functions and the search for a molecular mechanism. Molecular and Cellular Insights into Ion Channel Biology 32:121-140 (2004).
RN1269124-20-0, registry database compound, Mar. 21, 2011.
Roos et al. STIM1, an essential and conserved component of store-operated Ca2+ channel function. J Cell Biol 169(3):435-445 (2005).
Spassova et al. STIM1 has a plasma membrane role in the activation of store-operated Ca(2+) channels. PNAS USA 103:4040-4045 (2006).
Stathopulos et al. Stored Ca2+ depletion-induced oligomerization of stromal interaction molecule 1 (STIM1) via the EF-SAM region: An initiation mechanism for capacitive Ca2+ entry. J. Biol. Chem. 281:35855-35862 (2006).
Takata. API form screening and selection in drug discovery stage. Pharm Stage 6(10):20-25 (2007).
Takizawa et al. Caplus AN 2006:50793 (WO2006006569) (2 pgs) (2006).
Trevilyan et al. Potent inhibition of NFAT activation and T cell cytokine production by novel low molecular weight pyrazole compounds. J Biol Chem. 276(51):48118-48126 (2001).
U.S. Appl. No. 13/085,324 Office Action dated Feb. 8, 2013.
U.S. Appl. No. 13/969,401 Office Action dated Dec. 10, 2014.
U.S. Appl. No. 13/969,401 Office Action dated Jul. 8, 2014.
U.S. Appl. No. 13/969,401 Office Action dated Mar. 17, 2014.
U.S. Appl. No. 13/975,238 Office Action dated Jan. 27, 2014.
U.S. Appl. No. 13/975,238 Office Action dated Jun. 9, 2014.
U.S. Appl. No. 14/805,292 Office Action dated Aug. 21, 2017.
U.S. Appl. No. 14/805,292 Office Action dated Feb. 6, 2017.
U.S. Appl. No. 14/805,292 Office Action dated Mar. 30, 2018.
U.S. Appl. No. 14/805,292 Office Action dated Oct. 18, 2018.
U.S. Appl. No. 15/553,531 Office Action dated Apr. 6, 2020.
U.S. Appl. No. 15/553,531 Office Action dated Aug. 13, 2019.
U.S. Appl. No. 15/553,531 Office Action dated Dec. 9, 2020.
U.S. Appl. No. 15/553,531 Office Action dated Jun. 14, 2021.
U.S. Appl. No. 15/751,098 Office Action dated Nov. 26, 2018.
U.S. Appl. No. 16/481,380 Office Action dated Jan. 14, 2022.
U.S. Appl. No. 16/481,380 Office Action dated May 23, 2023.
U.S. Appl. No. 16/481,380 Office Action dated Sep. 22, 2022.
U.S. Appl. No. 16/535,968 Office Action dated Apr. 13, 2022.
U.S. Appl. No. 16/535,968 Office Action dated Mar. 30, 2021.
U.S. Appl. No. 16/535,968 Office Action dated Oct. 7, 2021.
U.S. Appl. No. 16/653,475 Office Action dated Apr. 17, 2023.
U.S. Appl. No. 16/653,475 Office Action dated Jun. 7, 2021.
U.S. Appl. No. 16/653,475 Office Action dated Nov. 19, 2021.
U.S. Appl. No. 16/653,475 Office Action dated Sep. 15, 2022.
U.S. Appl. No. 16/988,508 Office Action dated Aug. 25, 2020.
U.S. Appl. No. 17/203,547 Office Action dated Dec. 28, 2022.
U.S. Appl. No. 17/472,422 Office Action dated Jan. 25, 2022.
Vig et al. CRACM1 is a plasma membrane protein essential for store-operated Ca2+ entry. Science 312(5777):1220-1223 (2006).
Vig et al. CRACM1 Multimers Form the Ion-Selective Pore of the CRAC Channel. Current Biology 16:2073-2079 (2006).
Voronina et al. The role of Ca2+ influx in endocytic vacuole formation in pancreatic acinar cells. Biochemical J 465(3):405-412 (2015).
Williams et al. Identification and characterization of the STIM (stromal interaction molecule) gene family: coding for a novel class of transmembrane proteins. Biochem. J. 357:673-685 (2001).
Wu et al. Ca2+ store depletion causes STIM1 to accumulate in ER regions closely associated with the plasma membrane. J Cell Biol 174(6):803-813 (2006).
Wu et al. The early prediction of mortality in acute pancreatitis: a large population-based study. Gut 57(12):1698-1703 (2008).
Xu et al. Aggregation of STIM1 underneath the plasma membrane induces clustering of Orai1. Biochem. Biophys. Res. Commun. 350:969-976 (2006).
Yagodin et al. Functional characterization of thapsigargin and agonist-insensitive acidic Ca2+ stores in *Drosophila melanogaster* S2 cell lines. Cell Calcium 25:429-438 (1999).
Yagodin et al. Thapsigargin and receptor-mediated activation of *Drosophila* TRPL channels stably expressed in a *Drosophila* S2 cell line. Cell Calcium 23:219-228 (1998).
Yeromin et al. Molecular identification of the CRAC channel by altered ion selectivity in a mutant of Orai. Nature 443:226-229 (2006).
Zhang et al. Genome Wide RNAi Screen of Ca2+ influx identifies Genes that Regulate Ca2+ Channel Activity. PNAS USA 103(4):9357-9362 (2006).
Zhang et al. STIM1 is a Ca2+ sensor that activates CRAC channels and migrates from the Ca2+ store to the plasma membrane. Nature 437(7060):902-905 (2005).
Tang, S. et al. Calcium Release-Activated Calcium Channel Inhibitor, BTP2, Attenuates Ventilator-Induced Lung Injury in Rats. American Journal of Respiratory and Critical Care Medicine 199:A1159 (2019).

METHODS AND COMPOSITIONS FOR TREATING ACUTE LUNG INJURY AND ACUTE RESPIRATORY DISTRESS SYNDROME

CROSS-REFERENCE

This application is a § 371 U.S. National Stage Entry of International Application No. PCT/US2021/023345, filed Mar. 19, 2021, which claims the benefit of U.S. Provisional Application No. 62/992,826, filed Mar. 20, 2020, and U.S. Provisional Application No. 63/027,092, filed May 19, 2020, each of which is incorporated herein by reference.

BACKGROUND

Acute lung injury (ALI) and the acute respiratory distress syndrome (ARDS) describe clinical syndromes of acute respiratory failure with substantial morbidity and mortality. Under the current pandemic of COVID-19, for patients infected with COVID-19, their immune responses can lead to a "cytokine storm", which in turn can cause ALI, ARDS, death, or in the case of survivors permanently compromised pulmonary function.

SUMMARY OF THE INVENTION

Provided herein are embodiments related to methods and compositions for reducing pro-inflammatory cytokine releases a pulmonary endothelial and epithelial barrier disruption in order to treat acute lung injury (ALI) and acute respiratory distress syndrome (ARDS).

In an aspect, the disclosure provides a method for treating acute lung injury (ALI) or acute respiratory distress syndrome (ARDS) in a subject comprising administering a therapeutically effective amount of an intracellular Calcium signaling inhibitor to said subject.

In another aspect, the disclosure provides a method for preventing or treating acute lung injury (ALI) or acute respiratory distress syndrome (ARDS) in a subject at risk of developing or experiencing ALI or ARDS, comprising administering a therapeutically effective amount of an intracellular Calcium signaling inhibitor to said subject.

In some embodiments, the ALI or ARDS comprises pneumonia. In some embodiments, the pneumonia comprises a viral pneumonia. In some embodiments, the viral pneumonia comprises a viral pneumonia due to a coronavirus, an adenovirus, an influenza virus, a rhinovirus, or a respiratory syncytial virus. In some embodiments, the viral pneumonia comprises a viral pneumonia due to a coronavirus. In some embodiments, the coronavirus is SARS-CoV, SARS-CoV-2, or MERS-CoV. In some embodiments, the coronavirus is SARS-CoV-2. In some embodiments, the pneumonia comprises a severe or critical COVID-19 pneumonia. In some embodiments, the ALI or ARDS is caused by a ventilator (or is caused by sepsis, trauma, inhalation of toxic substances, transfusions, cocaine or other drug overdose, pancreatitis, burns, etc). Some embodiments include identifying the subject as having the ALI. Some embodiments include identifying the subject as having the ARDS.

In some embodiments, an expression level of a cytokine is decreased from a baseline level in the subject after administering a therapeutically effective amount of an intracellular Calcium signaling inhibitor. In some embodiments, the cytokine is from the group consisting of IL-6, IL-7, IL-17, TNF-α, IFN-α, IFN-β, IFN-ω, and IFN-γ. In some embodiments, an expression level of D-dimer is decreased from a baseline level in the subject after administering a therapeutically effective amount of an intracellular Calcium signaling inhibitor.

In some embodiments, the intracellular Calcium signaling inhibitor is a SOC channel inhibitor. In some embodiments the intracellular Calcium signaling inhibitor is a CRAC channel inhibitor. In some embodiments the intracellular Calcium signaling inhibitor inhibits a channel comprising a STIM1 protein. In some embodiments the intracellular Calcium signaling inhibitor inhibits a channel comprising Orai1 protein. In some embodiments the intracellular Calcium signaling inhibits a channel comprising Orai2 protein.

In some embodiments, the intracellular Calcium signaling inhibitor is a compound having a structure of:

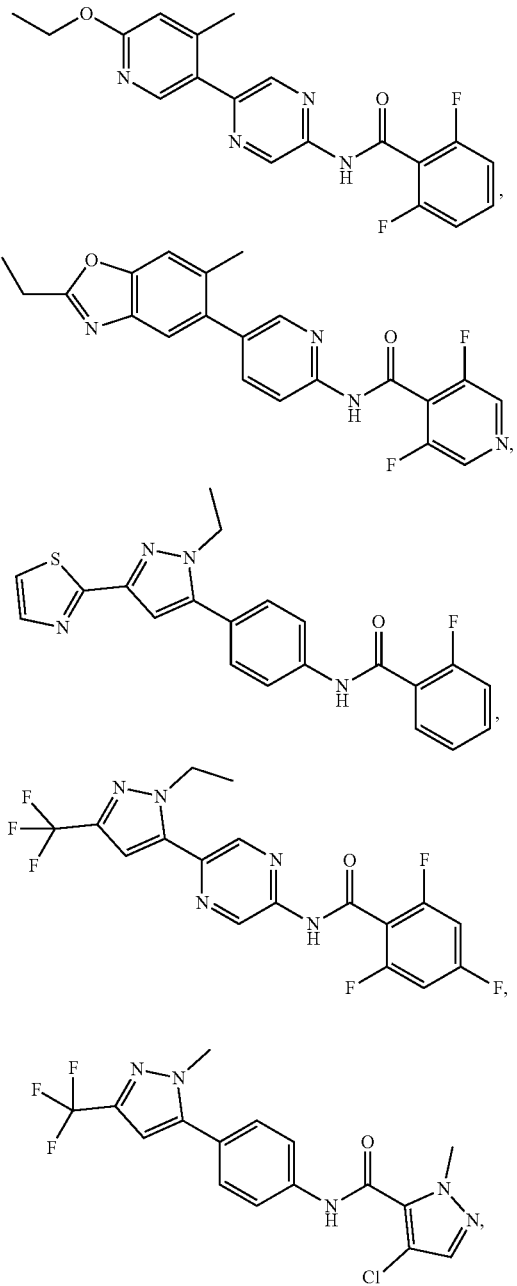

-continued
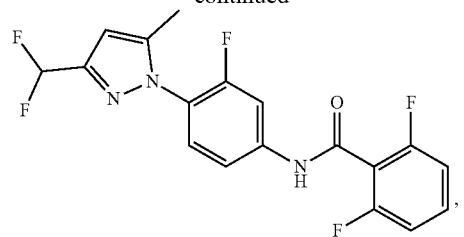
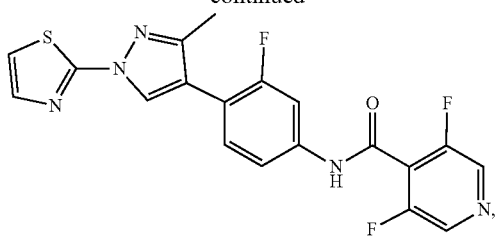
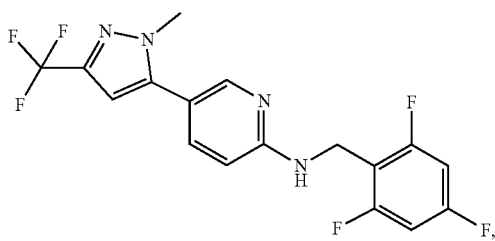
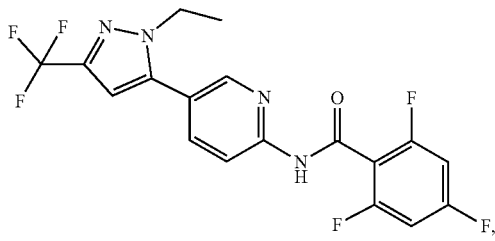
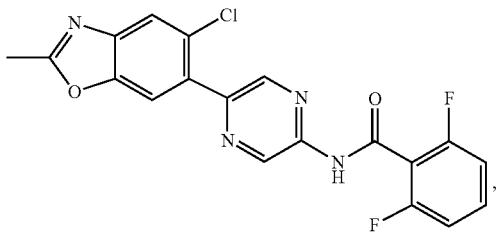
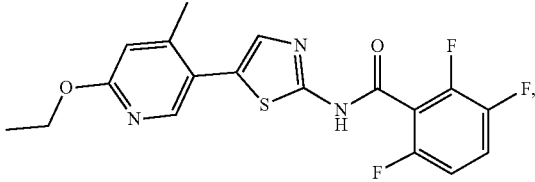
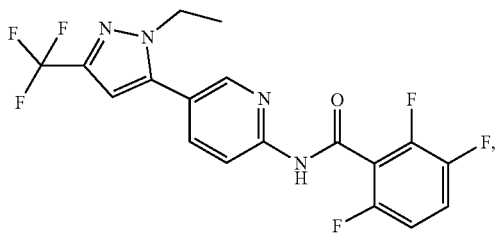
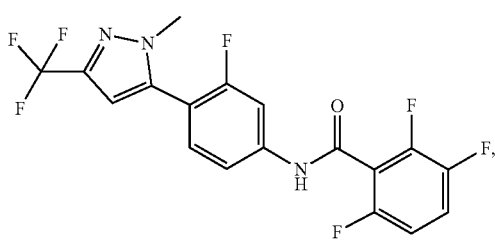

-continued

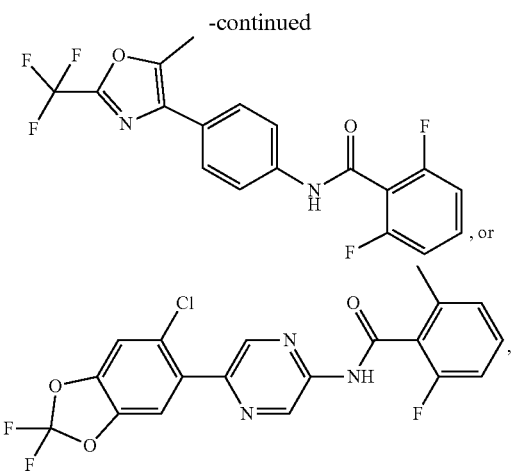

(collectively, "Compound A"), or a pharmaceutically acceptable salt, pharmaceutically acceptable solvate, or pharmaceutically acceptable prodrug thereof. In some embodiments the intracellular Calcium signaling inhibitor is a compound having a structure from the group of Compound A or a nanoparticle formulation thereof, including a nanoparticle suspension or emulsion.

In some embodiments, the intracellular Calcium signaling inhibitor is a compound of N-(5-(6-chloro-2,2-difluorobenzo[d][1,3]dioxol-5-yl)pyrazin-2-yl)-2-fluoro-6-methylbenzamide. In some aspects the intracellular Calcium signaling inhibitor is a compound of N-(5-(6-chloro-2,2-difluorobenzo[d][1,3]dioxol-5-yl)pyrazin-2-yl)-2-fluoro-6-methylbenzamide or a pharmaceutically acceptable salt, pharmaceutically acceptable solvate, or pharmaceutically acceptable prodrug thereof. In some aspects the intracellular Calcium signaling inhibitor is chosen from among the compounds, N-(5-(6-ethoxy-4-methylpyridin-3-yl)pyrazin-2-yl)-2,6-difluorobenzamide, N-(5-(2-ethyl-6-methylbenzo[d]oxazol-5-yl)pyridin-2-yl)-3,5-difluoroisonicotinamide, N-(4-(1-ethyl-3-(thiazol-2-yl)-1H-pyrazol-5-yl)phenyl)-2-fluorobenzamide, N-(5-(1-ethyl-3-(trifluoromethyl)-1H-pyrazol-5-yl)pyrazin-2-yl)-2,4,6-trifluorobenzamide, 4-chloro-1-methyl-N-(4-(1-methyl-3-(trifluoromethyl)-1H-pyrazol-5-yl)phenyl)-1H-pyrazole-5-carboxamide, N-(4-(3-(difluoromethyl)-5-methyl-1H-pyrazol-1-yl)-3-fluorophenyl)-2,6-difluorobenzamide, N-(4-(3-(difluoromethyl)-5-methyl-1H-pyrazol-1-yl)-3-fluorophenyl)-2,4,6-trifluorobenzamide, N-(4-(3-(difluoromethyl)-1-methyl-1H-pyrazol-5-yl)-3-fluorophenyl)-2,4,6-trifluorobenzamide, 4-chloro-N-(3-fluoro-4-(1-methyl-3-(trifluoromethyl)-1H-pyrazol-5-yl)phenyl)-1-methyl-1H-pyrazole-5-carboxamide, 3-fluoro-4-(1-methyl-3-(trifluoromethyl)-1H-pyrazol-5-yl)-N-((3-methylisothiazol-4-yl)methyl)aniline, N-(5-(7-chloro-2,3-dihydro-[1,4]dioxino[2,3-b]pyridin-6-yl)pyridin-2-yl)-2,6-difluorobenzamide, N-(2,6-difluorobenzyl)-5-(1-ethyl-3-(thiazol-2-yl)-1H-pyrazol-5-yl)pyrimidin-2-amine, 3,5-difluoro-N-(3-fluoro-4-(3-methyl-1-(thiazol-2-yl)-1H-pyrazol-4-yl)phenyl)isonicotinamide, 5-(1-methyl-3-(trifluoromethyl)-1H-pyrazol-5-yl)-N-(2,4,6-trifluorobenzyl)pyridin-2-amine, N-(5-(1-ethyl-3-(trifluoromethyl)-1H-pyrazol-5-yl)pyridin-2-yl)-2,4,6-trifluorobenzamide, N-(5-(5-chloro-2-methylbenzo[d]oxazol-6-yl)pyrazin-2-yl)-2,6-difluorobenzamide, N-(5-(6-ethoxy-4-methylpyridin-3-yl)thiazol-2-yl)-2,3,6-trifluorobenzamide, N-(5-(1-ethyl-3-(trifluoromethyl)-1H-pyrazol-5-yl)pyridin-2-yl)-2,3,6-trifluorobenzamide, 2,3,6-trifluoro-N-(3-fluoro-4-(1-methyl-3-(trifluoromethyl)-1H-pyrazol-5-yl)phenyl)benzamide, 2,6-difluoro-N-(4-(5-methyl-2-(trifluoromethyl)oxazol-4-yl)phenyl)benzamide, or N-(5-(6-chloro-2,2-difluorobenzo[d][1,3]dioxol-5-yl)pyrazin-2-yl)-2-fluoro-6-methylbenzamide, (collectively, "Compound A"), or a pharmaceutically acceptable salt, pharmaceutically acceptable solvate, or pharmaceutically acceptable prodrug thereof.

In some embodiments, the intracellular Calcium signaling inhibitor is a compound of chemical name N-(5-(6-Chloro-2,2-difluorobenzo[d][1,3]dioxol-5-yl)pyrazin-2-yl)-2-fluoro-6-methylbenzamide or a pharmaceutically acceptable salt, pharmaceutically acceptable solvate, or pharmaceutically acceptable prodrug thereof.

In some embodiments, the intracellular Calcium signaling inhibitor is a compound of chemical name 2,6-Difluoro-N-(1-(4-hydroxy-2-(trifluoromethyl)benzyl)-1H-pyrazol-3-yl)benzamide or a pharmaceutically acceptable salt, pharmaceutically acceptable solvate, or pharmaceutically acceptable prodrug thereof.

In another aspect, the disclosure herein provides a composition comprising an intracellular Calcium signaling inhibitor and at least a compound for treating ALI or ARDS. In some embodiments, the compound is selected from the list consisting of a prostaglandin inhibitor, complement inhibitor, β-agonist, beta-2 agonist, granulocyte macrophage colony-stimulating factor, corticosteroid, N-acetylcysteine, statin, glucagon-like peptide-1 (7-36) amide (GLP-1), triggering receptor expressed on myeloid cells (TREM1) blocking peptide, 17-allylamino-17-demethoxygeldanamycin (17-AAG), antibody to tumor necrosis factor (TNF), recombinant interleukin (IL)-1 receptor antagonist, cisatracurium besilate, and angiotensin-Converting Enzyme (ACE) Inhibitor. In some embodiments, the compound includes an antiviral compound. In some embodiments, the antiviral compound is an anti-coronavirus compound. In some embodiments, the anti-coronavirus compound comprises remdesivir. In some embodiments, the compound comprises an antibiotic. In some embodiments, the compound comprises an anti-malarial drug. In some embodiments, the compound comprises hydroxychloroquine. In some embodiments, the compound comprises chloroquine.

In another aspect, the disclosure herein provides a dosing regimen comprising administration to a subject of a compound for treating ALI or ARDS, and administration of an intracellular Calcium signaling inhibitor.

In another aspect, the disclosure herein provides a composition for preventing ALI or ARDS in a subject at risk of developing ALI or ARDS, comprising administering a therapeutically effective amount of an intracellular Calcium signaling inhibitor.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
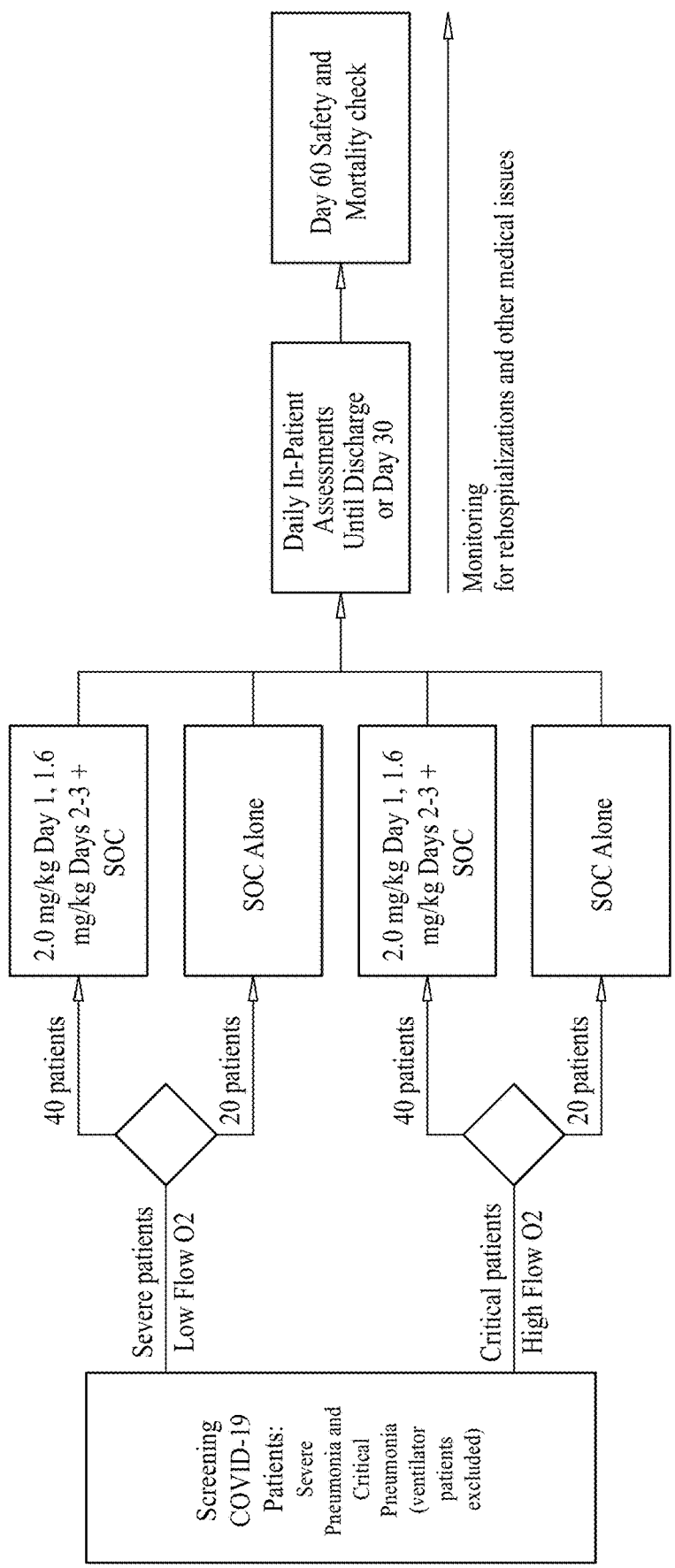
FIG. 1A is a chart showing an example of a clinical trial design for evaluating CRAC inhibitors in patients with severe COVID-19 pneumonia.

Methods and compositions disclosed herein are used for modulating intracellular calcium to treat or prevent acute lung injury (ALI) and/or acute respiratory distress syndrome (ARDS). In some aspects, compounds provided herein modulate SOC channel activity. In some aspects, methods and compounds provided herein modulate CRAC channel activity. In another aspect, compounds provided herein modulate STIM protein activity. In another aspect, methods and compounds provided herein modulate Orai protein activity. In another aspect, methods and compounds provided herein modulate the functional interactions of STIM proteins with Orai proteins. In another aspect, methods and compounds provided herein reduce the number of functional SOC channels. In another aspect, methods and compounds provided herein reduce the number of functional CRAC channels. In some aspects, methods and compounds described herein are SOC channel blockers. In some aspects, methods and compounds described herein are CRAC channel blockers or CRAC channel modulators.

Calcium plays a vital role in cell function and survival. Specifically, calcium is a key element in the transduction of signals into and within cells. Cellular responses to growth factors, neurotransmitters, hormones and a variety of other signal molecules are initiated through calcium-dependent processes.

Almost all cell types depend in some manner upon the generation of cytoplasmic $Ca^{2+}$ signals to regulate cell function, or to trigger specific responses. Cytosolic $Ca^{2+}$ signals control a wide array of cellular functions ranging from short-term responses such as contraction and secretion to longer-term regulation of cell growth and proliferation. Usually, these signals involve some combination of release of $Ca^{2+}$ from intracellular stores, such as the endoplasmic reticulum (ER), and influx of $Ca^{2+}$ across the plasma membrane. In one example, cell activation begins with an agonist binding to a surface membrane receptor, which is coupled to phospholipase C (PLC) through a G-protein mechanism. PLC activation leads to the production of inositol 1,4,5-triphosphate ($IP_3$), which in turn activates the $IP_3$ receptor causing release of $Ca^{2+}$ from the ER. The fall in ER $Ca^{2+}$ then signals to activate plasma membrane store-operated calcium (SOC) channels.

Store-operated calcium (SOC) influx is a process in cellular physiology that controls such diverse functions such as, but not limited to, refilling of intracellular $Ca^{2+}$ stores (Putney et al. Cell, 75, 199-201, 1993), activation of enzymatic activity (Fagan et al., J. Biol. Chem. 275:26530-26537, 2000), gene transcription (Lewis, Annu. Rev. Immunol. 19:497-521, 2001), cell proliferation (Nunez et al., J. Physiol. 571.1, 57-73, 2006), and release of cytokines (Winslow et al., Curr. Opin. Immunol. 15:299-307, 2003). In some nonexcitable cells, e.g., blood cells, immune cells, hematopoietic cells, T lymphocytes and mast cells, pancreatic acinar cells (PACs), epithelial and ductal cells of other glands (e.g. salivary glands), endothelial and endothelial progenitor cells (e.g., pulmonary endothelial cells), SOC influx occurs through calcium release-activated calcium (CRAC) channels, a type of SOC channel.

The calcium influx mechanism has been referred to as store-operated calcium entry (SOCE). Stromal interaction molecule (STIM) proteins are an essential component of SOC channel function, serving as the sensors for detecting the depletion of calcium from intracellular stores and for activating SOC channels.

Preclinical and animal work provided herein show that CRAC inhibitors such as N-(5-(6-Chloro-2,2-difluorobenzo[d][1,3]dioxol-5-yl)pyrazin-2-yl)-2-fluoro-6-methylbenzamide (Compound 1) can treat COVID-19 pneumonia, other viral pneumonias, and ALI or ARDS. Compound 1 has been tested in acutely ill acute pancreatitis (AP) patients with systemic inflammatory response syndrome (SIRS) and hypoxemia (and patients with severe and/or critical COVID-19 pneumonia). Treatment of a subject with CRAC inhibitors may lead to a rapid reduction of IL-6, IL-2, IL-17, TNFα, and/or other inflammatory cytokines in the subject. Treatment of a subject with CRAC inhibitors such as Compound 1 may lead to preservation of lung function and protection from injury.

Calcium Homeostasis

Cellular calcium homeostasis is a result of the summation of regulatory systems involved in the control of intracellular calcium levels and movements. Cellular calcium homeostasis is achieved, at least in part, by calcium binding and by movement of calcium into and out of the cell across the plasma membrane and within the cell by movement of calcium across membranes of intracellular organelles including, for example, the endoplasmic reticulum, sarcoplasmic reticulum, mitochondria and endocytic organelles including endosomes and lysosomes.

Movement of calcium across cellular membranes is carried out by specialized proteins. For example, calcium from the extracellular space can enter the cell through various calcium channels and a sodium/calcium exchanger and is actively extruded from the cell by calcium pumps and sodium/calcium exchangers. Calcium can also be released from internal stores through inositol trisphosphate or ryanodine receptors and can be taken up by these organelles by means of calcium pumps.

Calcium can enter cells by any of several general classes of channels, including but not limited to, voltage-operated calcium (VOC) channels, ligand-gated calcium channels, store-operated calcium (SOC) channels, and sodium/calcium exchangers operating in reverse mode. VOC channels are activated by membrane depolarization and are found in excitable cells like nerve and muscle and are for the most part not found in nonexcitable cells. Under some conditions, $Ca^{2+}$ can enter cells via $Na+$-$Ca^{2+}$ exchangers operating in reverse mode.

Endocytosis provides another process by which cells can take up calcium from the extracellular medium through endosomes. In addition, some cells, e.g., exocrine cells, can release calcium via exocytosis.

Cytosolic calcium concentration is tightly regulated with resting levels usually estimated at approximately 0.1 μM in mammalian cells, whereas the extracellular calcium concentration is typically about 2 mM. This tight regulation facilitates transduction of signals into and within cells through transient calcium flux across the plasma membrane and membranes of intracellular organelles. There is a multiplicity of intracellular calcium transport and buffer systems in cells that serve to shape intracellular calcium signals and maintain the low resting cytoplasmic calcium concentration. In cells at rest, the principal components involved in maintaining basal calcium levels are calcium pumps and leak pathways in both the endoplasmic reticulum and plasma membrane. Disturbance of resting cytosolic calcium levels can affect transmission of calcium-dependent signals and give rise to defects in a number of cellular processes. For example, cell proliferation involves a prolonged calcium signaling sequence. Other cellular processes that involve calcium signaling include, but are not limited to, secretion, transcription factor signaling, and fertilization.

Cell-surface receptors that activate phospholipase C (PLC) create cytosolic $Ca^{2+}$ signals from intra- and extracellular sources. An initial transient rise of $[Ca^{2+}]i$ (intracellular calcium concentration) results from the release of $Ca^{2+}$ from the endoplasmic reticulum (ER), which is triggered by the PLC product, inositol-1,4,5-trisphosphate ($IP_3$), opening $IP_3$ receptors in the ER (Streb et al. Nature, 306, 67-69, 1983). A subsequent phase of sustained $Ca^{2+}$ entry across the plasma membrane then ensues, through specialized store operated calcium (SOC) channels (in the case of non-excitable cells like immune PAC cells, the SOC channels are calcium release-activated calcium (CRAC) channels) in the plasma membrane. Store-operated Ca2+ entry (SOCE) is the process in which the emptying of $Ca^{2+}$ stores itself activates $Ca^{2+}$ channels in the plasma membrane to help refill the stores (Putney, Cell Calcium, 7, 1-12, 1986; Parekh et al., Physiol. Rev. 757-810; 2005). SOCE does more than simply provide Ca2+ for refilling stores, but can itself generate sustained $Ca^{2+}$ signals that control such essential functions as gene expression, cell metabolism and exocytosis (Parekh and Putney, Physiol. Rev. 85, 757-810 (2005).

In lymphocytes and mast cells, activation of antigen or Fc receptors, respectively causes the release of $Ca^{2+}$ from intracellular stores, which in turn leads to $Ca^{2+}$ influx through CRAC channels in the plasma membrane. In some immune cells, including monocyte/macrophage, neutrophils, or dendritic cells, release of $Ca^{2+}$ from intracellular stores and $Ca^{2+}$ influx through CRAC channels in the plasma membrane may result without Fc receptor activation. The subsequent rise in intracellular $Ca^{2+}$ activates calcineurin, a phosphatase that regulates the transcription factor NFAT. In resting cells, NFAT is phosphorylated and resides in the cytoplasm, but when dephosphorylated by calcineurin, NFAT translocates to the nucleus and activates different genetic programs depending on stimulation conditions and cell type. In response to infections and during transplant rejection, NFAT partners with the transcription factor AP-1 (Fos-Jun) in the nucleus of "effector" T cells, thereby trans-activating cytokine genes, genes that regulate T cell proliferation and other genes that orchestrate an active immune response (Rao et al., Annu Rev Immunol., 1997; 15:707-47). In contrast, in T cells recognizing self-antigens, NFAT is activated in the absence of AP-1, and activates a transcriptional program known as "anergy" that suppresses autoimmune responses (Macian et al., Transcriptional mechanisms underlying lymphocyte tolerance. Cell. 2002 Jun. 14; 109(6):719-31). In a subclass of T cells known as regulatory T cells which suppress autoimmunity mediated by self-reactive effector T cells, NFAT partners with the transcription factor FOXP3 to activate genes responsible for suppressor function (Wu et al., Cell, 2006 Jul. 28; 126(2): 375-87; Rudensky A Y, Gavin M, Zheng Y. Cell. 2006 Jul. 28; 126(2):253-256).

The endoplasmic reticulum (ER) carries out a variety processes. The ER has a role as both a $Ca^{2+}$ sink and an agonist-sensitive $Ca^{2+}$ store, and protein folding/processing takes place within its lumen. In the latter case, numerous $Ca^{2+}$-dependent chaperone proteins ensure that newly synthesized proteins are folded correctly and sent off to their appropriate destination. The ER is also involved in vesicle trafficking, release of stress signals, regulation of cholesterol metabolism, and apoptosis. Many of these processes require intraluminal $Ca^{2+}$ and protein misfolding, ER stress responses, and apoptosis can all be induced by depleting the ER of $Ca^{2+}$ for prolonged periods of time. Because it contains a finite amount of $Ca^{2+}$, it is clear that ER $Ca^{2+}$ content must fall after release of that $Ca^{2+}$ during stimulation. However, to preserve the functional integrity of the ER, it is vital that the $Ca^{2+}$ content does not fall too low or is maintained at least at a low level. Replenishment of the ER with $Ca^{2+}$ is therefore a central process to all eukaryotic cells. Because a fall in ER $Ca^{2+}$ content activates store-operated $Ca^{2+}$ channels in the plasma membrane, a major function of this $Ca^{2+}$ entry pathway is believed to be maintenance of ER $Ca^{2+}$ levels that are necessary for proper protein synthesis and folding. However, store-operated $Ca^{2+}$ channels have other important roles.

The understanding of store-operated calcium entry was provided by electrophysiological studies which established that the process of emptying the stores activated a $Ca^{2+}$ current in mast cells called $Ca^{2+}$ release-activated $Ca^{2+}$ current or ICRAC. ICRAC is non-voltage activated, inwardly rectifying, and remarkably selective for $Ca^{2+}$. It is found in several cell types mainly of hematopoietic origin. ICRAC is not the only store-operated current, and it is now apparent that store-operated influx encompasses a family of $Ca^{2+}$-permeable channels, with different properties in different cell types. ICRAC was the first store-operated $Ca^{2+}$ current to be described and remains a popular model for studying store-operated influx.

Store-operated calcium channels can be activated by any procedure that empties ER $Ca^{2+}$ stores; it does not seem to matter how the stores are emptied, the net effect is activation of store-operated $Ca^{2+}$ entry. Physiologically, store emptying is evoked by an increase in the levels of $IP_3$ or other $Ca^{2+}$-releasing signals followed by $Ca^{2+}$ release from the stores. But there are several other methods for emptying stores. These methods include the following:

1) elevation of $IP_3$ in the cytosol (following receptor stimulation or, dialyzing the cytosol with $IP_3$ itself or related congeners like the nonmetabolizable analog $Ins(2,4,5)P_3$);
2) application of a $Ca^{2+}$ ionophore (e.g., ionomycin) to permeabilize the ER membrane;
3) dialyzing the cytoplasm with high concentrations of $Ca^{2+}$ chelators (e.g., EGTA or BAPTA), which chelate $Ca^{2+}$ that leaks from the stores and hence prevent store refilling;
4) exposure to the sarcoplasmic/endoplasmic reticulum $Ca^{2+}$-ATPase (SERCA) inhibitors like thapsigargin, cyclopiazonic acid, and di-tert-butylhydroquinone;
5) sensitizing the $IP_3$ receptors to resting levels of InsP3 with agents like thimerosal; and
6) loading membrane-permeable metal $Ca^{2+}$ chelators like N,N,N',N'-tetrakis(2-pyridylmethyl)ethylene diamine (TPEN) directly into the stores.

Through mass action, TPEN lowers free intraluminal $Ca^{2+}$ concentration without changing total store $Ca^{2+}$ such that the store depletion-dependent signal is generated.

These methods of emptying stores are not devoid of potential problems. The key feature of store-operated $Ca^{2+}$ entry is that it is the fall in $Ca^{2+}$ content within the stores and not the subsequent rise in cytoplasmic $Ca^{2+}$ concentration that activates the channels. However, ionomycin and SERCA pump blockers generally cause a rise in cytoplasmic $Ca^{2+}$ concentration as a consequence of store depletion, and such a rise in $Ca^{2+}$ could open $Ca^{2+}$-activated cation channels permeable to $Ca^{2+}$. One way to avoid such problems is to use agents under conditions where cytoplasmic $Ca^{2+}$ has been strongly buffered with high concentrations of $Ca^{2+}$ chelator such as EGTA or BAPTA.

Store-Operated Calcium Entry

Reduced calcium concentration in intracellular calcium stores such as the endoplasmic reticulum resulting from release of calcium therefrom provides a signal for influx of calcium from the extracellular medium into the cell. This influx of calcium, which produces a sustained "plateau" elevation of cytosolic calcium concentration, generally does not rely on voltage-gated plasma membrane channels and does not involve activation of calcium channels by calcium. This calcium influx mechanism is referred to as capacitive calcium entry (CCE), calcium release-activated, store-operated or depletion-operated calcium entry. Store-operated calcium entry can be recorded as an ionic current with distinctive properties. This current is referred to as $I_{SOC}$ (store-operated current) or $I_{CRAC}$ (calcium release-activated current).

Electrophysiological analysis of store-operated or calcium release-activated currents reveal distinct biophysical properties (see, e.g., Parekh and Penner (1997) *Physiol. Rev.* 77:901-930) of these currents. For example, the current can be activated by depletion of intracellular calcium stores (e.g., by non-physiological activators such as thapsigargin, CPA, ionomycin and BAPTA, and physiological activators such as $IP_3$) and can be selective for divalent cations, such as calcium, over monovalent ions in physiological solutions or conditions, can be influenced by changes in cytosolic calcium levels, and can show altered selectivity and conductivity in the presence of low extracellular concentrations of divalent cations. The current may also be blocked or enhanced by 2-APB (depending on concentration) and blocked by SKF96365 and $Gd^{3+}$ and generally can be described as a calcium current that is not strictly voltage-gated.

Patch-clamp studies in mast cells and Jurkat leukemic T cells have established the CRAC entry mechanism as an ion channel with distinctive biophysical characteristics, including a high selectivity for $Ca^{2+}$ paired with an exceedingly low conductance. Furthermore, the CRAC channel was shown to fulfill the rigorous criteria for being store-operated, which is the activation solely by the reduction of $Ca^{2+}$ in the ER rather than by cytosolic $Ca^{2+}$ or other messengers generated by PLC (Prakriya et al., In *Molecular and Cellular Insights into Ion Channel Biology* (ed. Robert Maue) 121-140 (Elsevier Science, Amsterdam, 2004)).

Regulation of Store-Operated Calcium Entry by Intracellular Calcium Stores

Store-operated calcium entry is regulated by the level of calcium within an intracellular calcium store. Intracellular calcium stores can be characterized by sensitivity to agents, which can be physiological or pharmacological, which activate release of calcium from the stores or inhibit uptake of calcium into the stores. Different cells have been studied in characterization of intracellular calcium stores, and stores have been characterized as sensitive to various agents, including, but not limited to, $IP_3$ and compounds that effect the $IP_3$ receptor, thapsigargin, ionomycin and/or cyclic ADP-ribose (cADPR) (see, e.g., Berridge (1993) *Nature* 361:315-325; Churchill and Louis (1999) *Am. J. Physiol.* 276:$C_4$26-$C_4$34; Dargie et al. (1990) *Cell Regul.* 1:279-290; Gerasimenko et al. (1996) *Cell* 84:473-480; Gromoda et al. (1995) *FEBS Lett.* 360:303-306; Guse et al. (1999) *Nature* 398:70-73).

Accumulation of calcium within endoplasmic reticulum and sarcoplasmic reticulum (SR; a specialized version of the endoplasmic reticulum in striated muscle) storage organelles is achieved through sarcoplasmic-endoplasmic reticulum calcium ATPases (SERCAs), commonly referred to as calcium pumps. During signaling (i.e., when endoplasmic reticulum channels are activated to provide for calcium release from the endoplasmic reticulum into the cytoplasm), endoplasmic reticulum calcium is replenished by the SERCA pump with cytoplasmic calcium that has entered the cell from the extracellular medium (Yu and Hinkle (2000) *J. Biol. Chem.* 275:23648-23653; Hofer et al. (1998) *EMBO J.* 17:1986-1995).

Calcium release channels associated with IP$_3$ and ryanodine receptors provide for controlled release of calcium from endoplasmic and sarcoplasmic reticulum into the cytoplasm resulting in transient increases in cytoplasmic calcium concentration. IP$_3$ receptor-mediated calcium release is triggered by IP$_3$ formed by the breakdown of plasma membrane phosphoinositides through the action of phospholipase C, which is activated by binding of an agonist to a plasma membrane G protein-coupled receptor or tyrosine kinase. Ryanodine receptor-mediated calcium release is triggered by an increase in cytoplasmic calcium and is referred to as calcium-induced calcium release (CICR). The activity of ryanodine receptors (which have affinity for ryanodine and caffeine) may also be regulated by cyclic ADP-ribose.

Thus, the calcium levels in the stores, and in the cytoplasm, fluctuate. For example, ER free calcium concentration can decrease from a range of about 60-400 µM to about 1-50 µM when HeLa cells are treated with histamine, an agonist of PLC-linked histamine receptors (Miyawaki et al. (1997) Nature 388:882-887). Store-operated calcium entry is activated as the free calcium concentration of the intracellular stores is reduced. Depletion of store calcium, as well as a concomitant increase in cytosolic calcium concentration, can thus regulate store-operated calcium entry into cells.

Cytoplasmic Calcium Buffering

Agonist activation of signaling processes in cells can involve dramatic increases in the calcium permeability of the endoplasmic reticulum, for example, through opening of IP$_3$ receptor channels, and the plasma membrane through store-operated calcium entry. These increases in calcium permeability are associated with an increase in cytosolic calcium concentration that can be separated into two components: a "spike" of calcium release from the endoplasmic reticulum during activation of the IP$_3$ receptor and a plateau phase which is a sustained elevation of calcium levels resulting from entry of calcium into the cytoplasm from the extracellular medium. Upon stimulation, the resting intracellular free calcium concentration of about 100 nM can rise globally to greater than 1 µM and higher in microdomains of the cell. The cell modulates these calcium signals with endogenous calcium buffers, including physiological buffering by organelles such as mitochondria, endoplasmic reticulum and Golgi. Mitochondrial uptake of calcium through a uniporter in the inner membrane is driven by the large negative mitochondrial membrane potential, and the accumulated calcium is released slowly through sodium-dependent and -independent exchangers, and, under some circumstances, the permeability transition pore (PTP). Thus, mitochondria can act as calcium buffers by taking up calcium during periods of cellular activation and can slowly release it later. Uptake of calcium into the endoplasmic reticulum is regulated by the sarcoplasmic and endoplasmic reticulum calcium ATPase (SERCA). Uptake of calcium into the Golgi is mediated by a P-type calcium transport ATPase (PMR$_1$/ATP2C$_1$). Additionally, there is evidence that a significant amount of the calcium released upon IP$_3$ receptor activation is extruded from the cell through the action of the plasma membrane calcium ATPase. For example, plasma membrane calcium ATPases provide the dominant mechanism for calcium clearance in human T cells and Jurkat cells, although sodium/calcium exchange also contributes to calcium clearance in human T cells. Within calcium-storing organelles, calcium ions can be bound to specialized calcium-buffering proteins, such as, for example, calsequestrins, calreticulins and calnexins. Additionally, there are calcium-buffering proteins in the cytosol that modulate calcium spikes and assist in redistribution of calcium ions. Thus, proteins and other molecules that participate in any of these and other mechanisms through which cytosolic calcium levels can be reduced are proteins that are involved in, participate in and/or provide for cytoplasmic calcium buffering. Thus, cytoplasmic calcium buffering helps regulate cytoplasmic Ca$^{2+}$ levels during periods of sustained calcium influx through SOC channels or bursts of Ca$^{2+}$ release. Large increases in cytoplasmic Ca$^{2+}$ levels or store refilling deactivate SOCE.

Downstream Calcium Entry-Mediated Events

In addition to intracellular changes in calcium stores, store-operated calcium entry affects a multitude of events that are consequent to or in addition to the store-operated changes. For example Ca$^{2+}$ influx results in the activation of a large number of calmodulin-dependent enzymes including the serine phosphatase calcineurin. Activation of calcineurin by an increase in intracellular calcium results in acute secretory processes such as mast cell degranulation. Activated mast cells release preformed granules containing histamine, heparin, TNFα and enzymes such as 0-hexosaminidase. Some cellular events, such as B and T cell proliferation, require sustained calcineurin signaling, which requires a sustained increase in intracellular calcium. A number of transcription factors are regulated by calcineurin, including NFAT (nuclear factor of activated T cells), MEF$_2$ and NFκB. NFAT transcription factors play important roles in many cell types, including immune cells. In immune cells NFAT mediates transcription of a large number of molecules, including cytokines, chemokines and cell surface receptors. Transcriptional elements for NFAT have been found within the promoters of cytokines such as IL-2, IL-3, IL-4, IL-5, IL-8, IL-13, as well as tumor necrosis factor alpha (TNFα), granulocyte colony-stimulating factor (G-CSF), and gamma-interferon (γ-IFN).

The activity of NFAT proteins is regulated by their phosphorylation level, which in turn is regulated by both calcineurin and NFAT kinases. Activation of calcineurin by an increase in intracellular calcium levels results in dephosphorylation of NFAT and entry into the nucleus. Rephosphorylation of NFAT masks the nuclear localization sequence of NFAT and prevents its entry into the nucleus. Because of its strong dependence on calcineurin-mediated dephosphorylation for localization and activity, NFAT is a sensitive indicator of intracellular free calcium levels.

CRAC Channels and Immune Responses

CRAC channels are located in the plasma membrane and open in response to the release of Ca2+ from endoplasmic reticulum stores. In immune cells, stimulation of cell surface receptors activates CRAC channels, leading to Ca2+ entry and cytokine production. Cells of both the adaptive and innate immune system (e.g., T-cells, neutrophils and macrophages) are known to be regulated by CRAC channels. CRAC channels also play a role in the activation of endothelial cells, which are involved in the pathogenesis of ALI/ARDS. The normal pulmonary endothelium maintains a tight barrier between endothelial cells, the pulmonary interstitium, and the alveolar space, thereby enabling gas exchange. In inflammatory conditions, stimulation of receptors on pulmonary endothelial cells leads to activation of Ca2+ entry via CRAC channels. The Ca2+ entry leads to loss of barrier function, which in turn causes leakage of protein-rich fluid into the alveolus, impaired gas exchange, and hypoxemia.

Stimulation of T cell receptors causes depletion of intracellular Ca2+ stores and subsequent opening of the CRAC (Ca2+-release-activated Ca2+) channels. A sustained increase in intracellular Ca2+ concentration activates the calcineurin/NFAT (nuclear factor of activated T cells) pathway and turns on transcriptional programs of various cytokines. Orai1 and STIM1 are identified as a long-sought pore component of CRAC channels and as an endoplasmic reticulum (ER) Ca2+ sensor, respectively. STIM1 senses Ca2+ depletion in ER after stimulation of T cell receptors, translocates to plasma membrane (PM) proximal ER, binds to and activates Orai1. Human patients deficient in Orai1 or STIM1 have severe combined immune deficiency.

Calcium Channel Inhibitors

Disclosed herein are a number of Calcium channel inhibitors consistent with the methods, compositions, administration regimens and compositions for use disclosed herein. In some embodiments, a Calcium channel inhibitor comprises a SOC inhibitor. In some embodiments, a Calcium channel inhibitor is a SOC inhibitor. In some embodiments, the SOC comprises a CRAC. In some embodiments the SOC inhibitor comprises a CRAC inhibitor. In some embodiments the Calcium channel inhibitor is a CRAC inhibitor. In some embodiments, the Calcium channel inhibitor inhibits a channel comprising STIM1 protein. In some embodiments, the CRAC comprises an Orai1 protein. In some embodiments, the CRAC inhibitor comprises an Orai1 protein inhibitor. In some embodiments, the Calcium channel inhibitor inhibits a channel comprising Orai1 protein. In some embodiments, the CRAC comprises an Orai2 protein. In some embodiments, the CRAC inhibitor comprises an Orai2 protein inhibitor. In some embodiments, the Calcium channel inhibitor inhibits a channel comprising Orai2 protein.

In some embodiments the compound is a compound having the structure of:

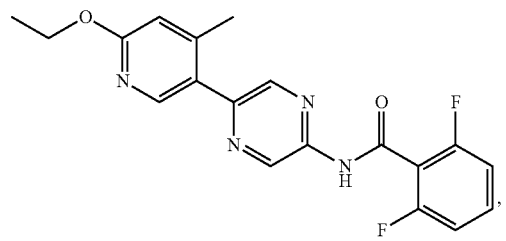

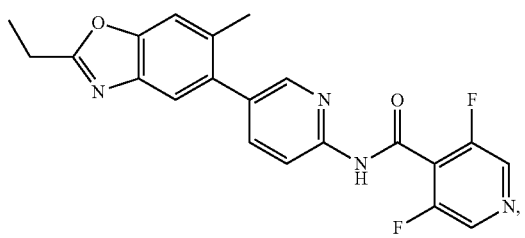

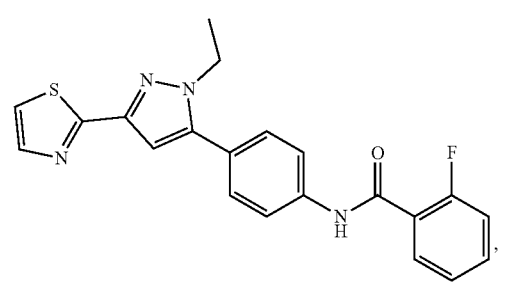

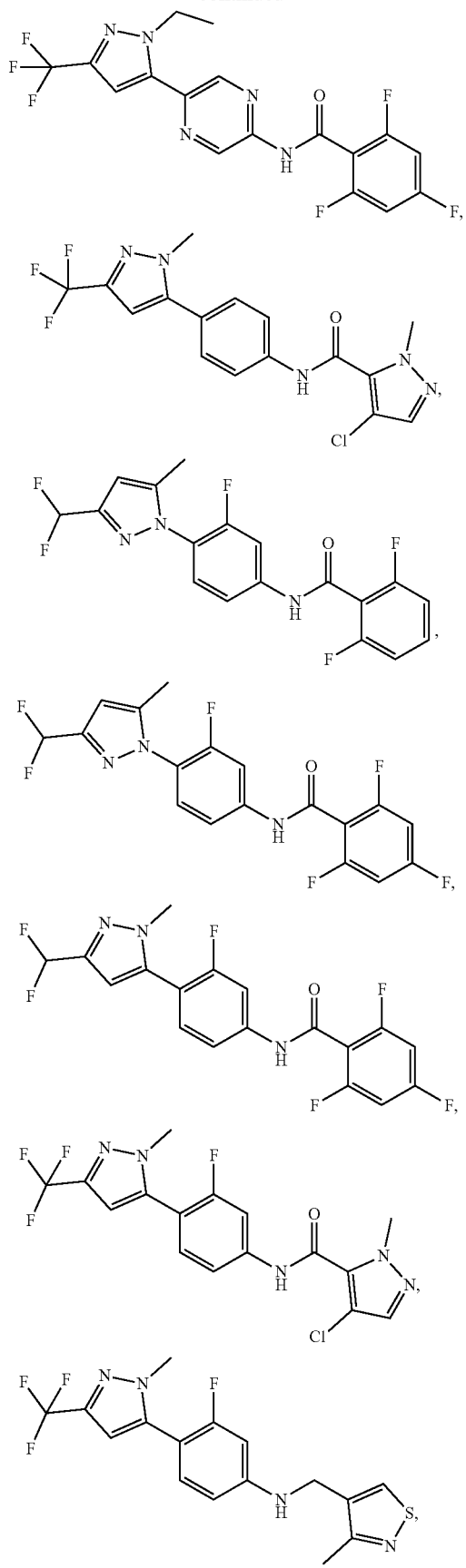

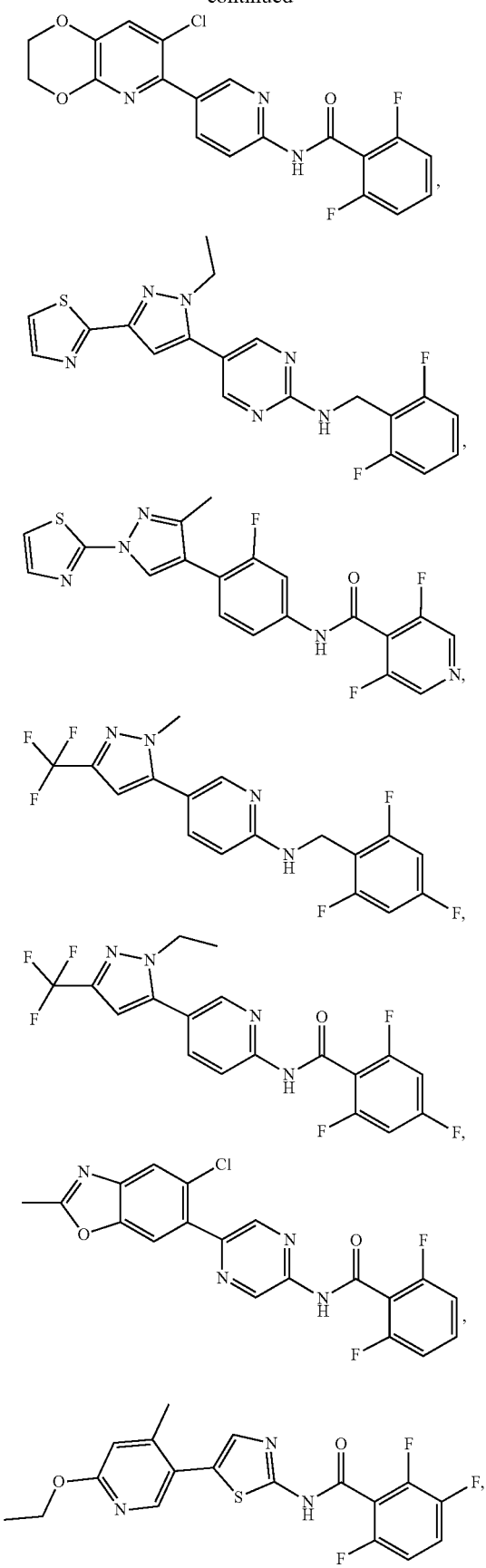
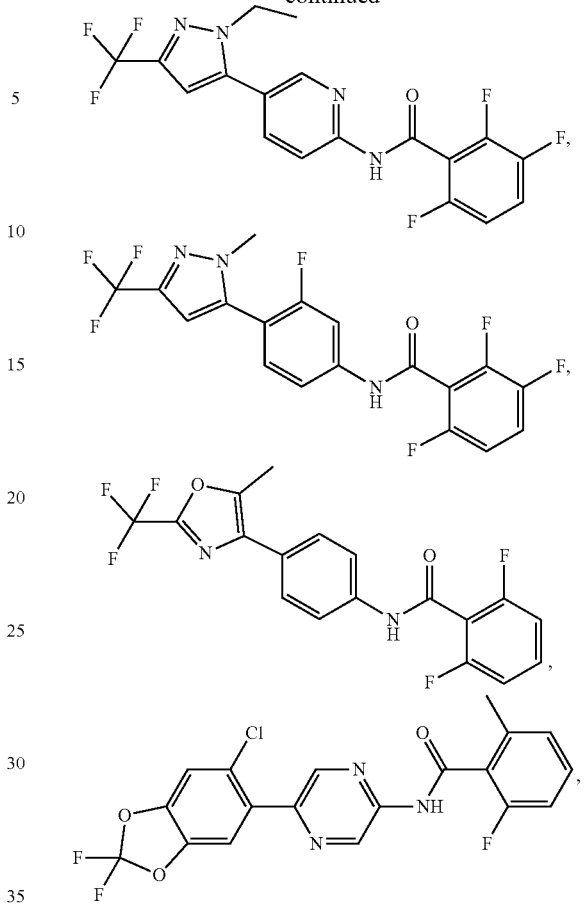

or a pharmaceutically acceptable salt, pharmaceutically acceptable solvate, or pharmaceutically acceptable prodrug thereof. In some embodiments the compound is selected form a list of compounds consisting: N-(5-(6-chloro-2,2-difluorobenzo[d][1,3]dioxol-5-yl)pyrazin-2-yl)-2-fluoro-6-methylbenzamide. In some aspects the intracellular Calcium signaling inhibitor is a compound of N-(5-(6-chloro-2,2-difluorobenzo[d][1,3]dioxol-5-yl)pyrazin-2-yl)-2-fluoro-6-methylbenzamide or a pharmaceutically acceptable salt, pharmaceutically acceptable solvate, or pharmaceutically acceptable prodrug thereof. In some aspects the intracellular Calcium signaling inhibitor is chosen from among the compounds, N-(5-(6-ethoxy-4-methylpyridin-3-yl)pyrazin-2-yl)-2,6-difluorobenzamide, N-(5-(2-ethyl-6-methylbenzo[d]oxazol-5-yl)pyridin-2-yl)-3,5-difluoroisonicotinamide, N-(4-(1-ethyl-3-(thiazol-2-yl)-1H-pyrazol-5-yl)phenyl)-2-fluorobenzamide, N-(5-(1-ethyl-3-(trifluoromethyl)-1H-pyrazol-5-yl)pyrazin-2-yl)-2,4,6-trifluorobenzamide, 4-chloro-1-methyl-N-(4-(1-methyl-3-(trifluoromethyl)-1H-pyrazol-5-yl)phenyl)-1H-pyrazole-5-carboxamide, N-(4-(3-(difluoromethyl)-5-methyl-1H-pyrazol-1-yl)-3-fluorophenyl)-2,6-difluorobenzamide, N-(4-(3-(difluoromethyl)-5-methyl-1H-pyrazol-1-yl)-3-fluorophenyl)-2,4,6-trifluorobenzamide, N-(4-(3-(difluoromethyl)-1-methyl-1H-pyrazol-5-yl)-3-fluorophenyl)-2,4,6-trifluorobenzamide, 4-chloro-N-(3-fluoro-4-(1-methyl-3-(trifluoromethyl)-1H-pyrazol-5-yl)phenyl)-1-methyl-1H-pyrazole-5-carboxamide, 3-fluoro-4-(1-methyl-3-(trifluoromethyl)-1H-pyrazol-5-yl)-N-((3-methylisothiazol-4-yl)methyl)aniline, N-(5-(7-chloro-2,3-dihydro-[1,4]dioxino[2,3-b]pyridin-6-yl)

pyridin-2-yl)-2,6-difluorobenzamide, N-(2,6-difluorobenzyl)-5-(1-ethyl-3-(thiazol-2-yl)-1H-pyrazol-5-yl)pyrimidin-2-amine, 3,5-difluoro-N-(3-fluoro-4-(3-methyl-1-(thiazol-2-yl)-1H-pyrazol-4-yl)phenyl) isonicotinamide, 5-(1-methyl-3-(trifluoromethyl)-1H-pyrazol-5-yl)-N-(2,4,6-trifluorobenzyl)pyridin-2-amine, N-(5-(1-ethyl-3-(trifluoromethyl)-1H-pyrazol-5-yl)pyridin-2-yl)-2,4,6-trifluorobenzamide, N-(5-(5-chloro-2-methylbenzo[d]oxazol-6-yl)pyrazin-2-yl)-2,6-difluorobenzamide, N-(5-(6-ethoxy-4-methylpyridin-3-yl)thiazol-2-yl)-2,3,6-trifluorobenzamide, N-(5-(1-ethyl-3-(trifluoromethyl)-1H-pyrazol-5-yl)pyridin-2-yl)-2,3,6-trifluorobenzamide, 2,3,6-trifluoro-N-(3-fluoro-4-(1-methyl-3-(trifluoromethyl)-1H-pyrazol-5-yl)phenyl)benzamide, 2,6-difluoro-N-(4-(5-methyl-2-(trifluoromethyl)oxazol-4-yl)phenyl)benzamide, or N-(5-(6-chloro-2,2-difluorobenzo[d][1,3]dioxol-5-yl) pyrazin-2-yl)-2-fluoro-6-methylbenzamide or a pharmaceutically acceptable salt, pharmaceutically acceptable solvate, or pharmaceutically acceptable prodrug thereof. Each of these compounds is an example of a Calcium channel inhibitor, a SOC inhibitor, or a CRAC inhibitor.

Disclosed herein, in some embodiments, are CRAC inhibitors. In some embodiments, the CRAC inhibitor comprises SK&F 96365. In some embodiments, the CRAC inhibitor comprises Econazole. In some embodiments, the CRAC inhibitor comprises L-651582. In some embodiments, the CRAC inhibitor comprises a carboxanilide compound. In some embodiments, the CRAC inhibitor comprises a biaryl carboxanilide compound. In some embodiments, the CRAC inhibitor comprises a heterocyclic carboxanilide compound. In some embodiments, the CRAC inhibitor comprises RP4010. In some embodiments, the CRAC inhibitor comprises Synta-66 (N-(2',5'-dimethoxy[1, 1'-biphenyl]-4-yl)-3-fluoro-4-pyridinecarboxamide). In some embodiments, the CRAC inhibitor comprises ML-9 (1-(5-chloronaphthalene-1-sulfonyl)homopiperazine). In some embodiments, the CRAC inhibitor comprises capsaicin (8-methyl-N-vanillyl-(trans)-6-nonenamide). In some embodiments, the CRAC inhibitor comprises NPPB (5-nitro-2-(3-phenylpropylamino)-benzoic acid). In some embodiments, the CRAC inhibitor comprises DES (diethylstilbestrol). In some embodiments, the CRAC inhibitor comprises BEL (bromenol lactone, or E-6-(bromoethylene) tetrahydro-3-(1-naphthyl)-2H-pyran-2-one). In some embodiments, the CRAC inhibitor comprises Carboxyamidotriazole (CAI). In some embodiments, the CRAC inhibitor comprises RO2959 (2,6-difluoro-N-{5-[4-methyl-1-(5-methyl-thiazol-2-yl)-1,2,5,6-tetrahydro-pyridin-3-yl]-pyrazin-2-yl}-benzamide). In some embodiments, the CRAC inhibitor comprises a Tanshinone IIA sulfonate. In some embodiments, the CRAC inhibitor comprises sodium Tanshinone IIA sulfonate. In some embodiments, the CRAC inhibitor comprises MRS1845. Each of these compounds is also an example of a Calcium channel inhibitor, or of a SOC inhibitor.

Disclosed herein, in some embodiments, are CRAC inhibitors. In some embodiments, the CRAC inhibitor comprises a lanthanide. In some embodiments, the CRAC inhibitor comprises lanthanide trivalent ion. In some embodiments, the CRAC inhibitor comprises $La^{3+}$ (lanthanum). In some embodiments, the CRAC inhibitor comprises $Gd^{3+}$ (gadolinium). Each of these compounds is also an example of a Calcium channel inhibitor, or of a SOC inhibitor.

Disclosed herein, in some embodiments, are CRAC inhibitors. In some embodiments, the CRAC inhibitor comprises an imidazole. In some embodiments, the CRAC inhibitor comprises imidazole antimycotic SKF-96365. In some embodiments, the CRAC inhibitor comprises econazole. In some embodiments, the CRAC inhibitor comprises miconazole. Each of these compounds is also an example of a Calcium channel inhibitor, or of a SOC inhibitor.

Disclosed herein, in some embodiments, are CRAC inhibitors. In some embodiments, the CRAC inhibitor comprises a diphenylboronate. In some embodiments, the CRAC inhibitor comprises 2-Aminoethyldiphenyl borate (2-APB). In some embodiments, the CRAC inhibitor comprises DPB162-AE. In some embodiments, the CRAC inhibitor comprises DPB163-AE. Each of these compounds is also an example of a Calcium channel inhibitor, or of a SOC inhibitor.

Disclosed herein, in some embodiments, are CRAC inhibitors. In some embodiments, the CRAC inhibitor comprises a pyrazole. In some embodiments, the CRAC inhibitor comprises a bis(trifluoromethyl)pyrazole. In some embodiments, the CRAC inhibitor comprises BTP1. In some embodiments, the CRAC inhibitor comprises BTP2. In some embodiments, the CRAC inhibitor comprises YM-58483. In some embodiments, the CRAC inhibitor comprises BTP3. Each of these compounds is also an example of a Calcium channel inhibitor, or of a SOC inhibitor.

Disclosed herein, in some embodiments, are CRAC inhibitors. In some embodiments, the CRAC inhibitor comprises a Pyr compound. Disclosed herein, in some embodiments, are CRAC inhibitors. In some embodiments, the CRAC inhibitor comprises N-(4-(3,5-bis(trifluoromethyl)-1H-pyrazol-1-yl)phenyl)-4-methyl-1,2,3-thiadiazole-5-carboxamide (Pyr2/BTP2/YM58483). In some embodiments, the CRAC inhibitor comprises ethyl 1-(4-(2,3,3-trichloroacrylamido)phenyl)-5-(trifluoromethyl)-1H-pyrazole-4-carboxylate (Pyr3). In some embodiments, the CRAC inhibitor comprises N-(4-(3,5-bis(trifluoromethyl)-1H-pyrazol-1-yl) phenyl)-3-fluoroisonicotinamide (Pyr6). In some embodiments, the CRAC inhibitor comprises N-(4-(3,5-bis(trifluoromethyl)-1H-pyrazol-1-yl)phenyl)-4-methylbenzenesulfonamide (Pyr10). In some embodiments, the CRAC inhibitor comprises 2-aminoethoxydiphenylborate (2-APB). In some embodiments, the CRAC inhibitor comprises 2,2'-((((oxybis(methylene))bis(3,1-phenylene)) bis(phenylboranediyl))bis(oxy)) bis(ethan-1-amine) (DPB162-AE); 2,2'-((((oxybis(methylene))bis(4,1-phenylene))bis(phenylboranediyl))bis(oxy)) bis(ethan-1-amine) (DPB163-AE). Each of these compounds is also an example of a Calcium channel inhibitor, or of a SOC inhibitor.

Disclosed herein, in some embodiments, are CRAC inhibitors. In some embodiments, the CRAC inhibitor comprises a GSK compound. In some embodiments, the CRAC inhibitor comprises GSK-5498A. In some embodiments, the CRAC inhibitor comprises GSK-5503A (2,6-difluoro-N-(1-(2-phenoxybenzyl)-1H-pyrazol-3-yl)benzamide). In some embodiments, the CRAC inhibitor comprises GSK-7975A (2,6-difluoro-N-(1-(4-hydroxy-2-(trifluoromethyl)benzyl)-1H-pyrazol-3-yl)benzamide). Each of these compounds is also an example of a Calcium channel inhibitor, or of a SOC inhibitor.

Disclosed herein, in some embodiments, are CRAC inhibitors. In some embodiments, the CRAC inhibitor comprises a polyunsaturated fatty acid (PUFA). In some embodiments, the CRAC inhibitor comprises an 18-C PUFA. In some embodiments, the CRAC inhibitor comprises linoleic acid. Each of these compounds is also an example of a Calcium channel inhibitor, or of a SOC inhibitor.

Disclosed herein, in some embodiments, are CRAC inhibitors. In some embodiments, the CRAC inhibitor comprises 1-phenyl-3-(1-phenylethyl)urea. In some embodiments, the CRAC inhibitor comprises a 1-phenyl-3-(1-phenylethyl)urea derivative. In some embodiments, the CRAC inhibitor comprises a 1-phenyl-3-(1-phenylethyl) urea derivative comprising Compound 22. In some embodiments, the CRAC inhibitor comprises a 1-phenyl-3-(1-phenylethyl)urea derivative comprising Compound 23. Each of these compounds is also an example of a Calcium channel inhibitor, or of a SOC inhibitor.

Disclosed herein, in some embodiments, are CRAC inhibitors. In some embodiments, the CRAC inhibitor comprises a cholestatic bile acid. In some embodiments, the CRAC inhibitor comprises taurolithocholic acid (TLCA; 2-[4-[(3R,5R,8R,9S,10S,13R,14S,17R)-3-hydroxy-10,13-dimethyl-2,3,4,5,6,7,8,9,11,12,14,15,16,17-tetradecahydro-1H-cyclopenta[a]phenanthren-17-yl]pentanoylamino]ethanesulfonic acid). In some embodiments, the CRAC inhibitor comprises lithocholic acid (LCA; (4R)-4-[(3R,5R,8R,9S,10S,13R,14S,17R)-3-Hydroxy-10,13-dimethyl-2,3,4,5,6,7,8,9,11,12,14,15,16,17-tetradecahydro-1H-cyclopenta[a]phenanthren-17-yl]pentanoic acid). In some embodiments, the CRAC inhibitor comprises cholic acid (CA; (R)-4-((3R,5S,7R,8R,9S,10S,12S,13R,14S,17R)-3,7,12-trihydroxy-10,13-dimethylhexadecahydro-1H-cyclopenta[a]phenanthren-17-yl)pentanoic acid). In some embodiments, the CRAC inhibitor comprises taurocholic acid (TCA; 2-{[(3α,5β,7α,12α)-3,7,12-trihydroxy-24-oxocholan-24-yl]amino}ethanesulfonic acid)). Each of these compounds is also an example of a Calcium channel inhibitor, or of a SOC inhibitor.

Disclosed herein, in some embodiments, are CRAC inhibitors. In some embodiments, the CRAC inhibitor comprises FCC2121 (4-[3-(diphenylmethyl)-1,2,4-oxadiazol-5-yl]piperidineyl]piperidine). In some embodiments, the CRAC inhibitor comprises FCC2122 (3-(4-methyl-1,5-diphenyl-1H-pyrazol-3-yl)-2-phenylpropanoic acid). In some embodiments, the CRAC inhibitor comprises FC-2399 (2-(4-Chloro-phenyl)-3-[1-(4-chloro-phenyl)-5-methyl-1H-pyrazol-3-yl]-propionic acid). Each of these compounds is also an example of a Calcium channel inhibitor, or of a SOC inhibitor.

Disclosed herein, in some embodiments, are CRAC inhibitors. In some embodiments, the CRAC inhibitor comprises any one of N-[1-({2-Chloro-5-[(cyclopropylmethyl)oxy]phenyl}methyl)-1H-pyrazol-3-yl]-2,6-difluorobenzamide; N-{1-[(2,4-Dichlorophenyl)methyl]-1H-pyrazol-3-yl}-2,6-difluorobenzamide; 2-Bromo-N-{1-[(2,4-dichlorophenyl)methyl]-1H-pyrazol-3-yl}-6-fluorobenzamide; 2-Chloro-N-{1-[(2,4-dichlorophenyl)methyl]-1H-pyrazol-3-yl}-6-fluorobenzamide; 2,6-Dichloro-N-{1-[(2,4-dichlorophenyl)methyl]-1H-pyrazol-3-yl}benzamide; N-{1-[(2,4-dichlorophenyl)methyl]-1H-pyrazol-3-yl}-3,5-difluoro-4-pyridinecarboxamide; N-[1-({5-chloro-2-[(phenylmethyl)oxy]phenyl}methyl)-1H-pyrazol-3-yl]-2,6-25 difluorobenzamide; N-{1-[(2,6-dichlorophenyl)methyl]-1H-pyrazol-3-yl}-2,6-difluorobenzamide; N-[1-({5-chloro-2-[(2-methylpropyl)oxy]phenyl}methyl)-1H-pyrazol-3-yl]-2,6-difluorobenzamide; N-(1-{[2-bromo-5-(methyloxy)phenyl]methyl}-1H-pyrazol-3-yl)-2,6-difluorobenzamide; N-(1-{[5-chloro-2-(methyloxy)phenyl]methyl}-1H-pyrazol-3-yl)-2,6-difluorobenzamide; 2,6-Difluoro-N-(1-{[2-(phenyloxy)phenyl]methyl}-1H-pyrazol-3-yl)benzamide; N-[1-({5-bromo-2-[(phenylmethyl)oxy]phenyl}methyl)-1H-pyrazol-3-yl]-2,6-difluorobenzamide; 2,6-Difluoro-N-[1-({2-[(trifluoromethyl)oxy]phenyl}methyl)-1H-pyrazol-3-yl]benzamide; 2,6-Difluoro-N-(1-{[4-[(phenylmethyl)oxy]-2-(trifluoromethyl)phenyl]methyl}-1H-pyrazol-3-yl) benzamide; N-{1-[(2-Bromo-6-chlorophenyl)methyl]-1H-pyrazol-3-yl}-2,6-difluorobenzamide; 2,6-Difluoro-/V-[1-({2-[(phenylmethyl)oxy]phenyl}methyl)-1H-pyrazol-3-yl] benzamide; N/-[1-({2-chloro-5-[(2-methylpropyl)oxy]phenyl}methyl)-1H-pyrazol-3-yl]-2,6-difluorobenzamide; N-(1-{[4-[(cyclopropylmethyl)oxy]-2-(trifluoromethyl)phenyl]methyl}-1H-pyrazol-3-yl)-2,6-difluorobenzamide; 2,6-Difluoro-N-(1-{[4-iodo-2-(trifluoromethyl)phenyl]methyl}-1H-pyrazol-3-yl)benzamide; 2,6-Difluoro-N-(1-{[4-methyl-2-(trifluoromethyl)phenyl]methyl}-1H-pyrazol-3-yl)benzamide; N-(1-{[4-cyclopropyl-2-(trifluoromethyl)phenyl]methyl}-1H-pyrazol-3-yl)-2,6-difluorobenzamide; 2,6-Difluoro-N-{1-[(4-iodo-2-methylphenyl)methyl]-1H-pyrazol-3-yl}benzamide; N-(1-{[4-chloro-2-(trifluoromethyl)phenyl]methyl}-1H-pyrazol-3-yl)-2,6-difluorobenzamide; 2-Fluoro-N-(1-{[4-iodo-2-(trifluoromethyl)phenyl]methyl}-1H-pyrazol-3-yl)benzamide; 2-Chloro-N-(1-{[4-cyclopropyl-2-(trifluoromethyl) phenyl]methyl}-1H-pyrazol-3-yl)benzamide; N-(1-{[4-cyclopropyl-2-(trifluoromethyl) phenyl]methyl}-1H-pyrazol-3-yl)-2-fluorobenzamide; 2,6-Difluoro-N-(1-{[5-iodo-2-(trifluoromethyl)phenyl]methyl}-1H-pyrazol-3-yl) benzamide; 2,6-Difluoro-N-(1-{[2-fluoro-6-(trifluoromethyl)phenyl]methyl}-1H-pyrazol-3-yl) benzamide; or 2,6-Difluoro-N-(1-{[4-hydroxy-2-(trifluoromethyl)phenyl]methyl}-1H-pyrazol-3-yl) benzamide. Each of these compounds is also an example of a Calcium channel inhibitor, or of a SOC inhibitor.

Disclosed herein, in some embodiments, are CRAC inhibitors. In some embodiments, the CRAC inhibitor comprises any one of N-[4-(3,5-dicyclopropyl-1H-pyrazol-1-yl)phenyl]-1H-benzo[d]imidazole-6-carboxamide; N-[4-(3,5-dicyclopropyl-1H-pyrazol-1-yl)phenyl]-1H-benzo[d][1,2,3]triazole-6-carboxamide; N-[4-(3,5-dicyclopropyl-1H-pyrazol-1-yl)phenyl]quinoline-6-carboxamide; N-[4-(3,5-dicyclopropyl-1H-pyrazol-1-yl)phenyl]quinoxaline-6-carboxamide; 2-(1H-benzo[d]imidazol-1-yl)-N-[4-(3,5-dicyclopropyl-1H-pyrazol-1-yl)phenyl]acetamide; 2-(1H-benzo[d][1,2,3] triazol-1-yl)-N-[4-(3,5-dicyclopropyl-1H-pyrazol-1-yl)phenyl] acetamide; N-[4-(3,5-dicyclopropyl-1H-pyrazol-1-yl)phenyl]-2-(1H-indol-3-yl)acetamide; N-[4-(3,5-dicyclopropyl-1H-pyrazol-1-yl)phenyl]-2-(imidazo[1,2-a]pyridin-2-yl) acetamide; N-[4-(3,5-dicyclopropyl-1H-pyrazol-1-yl)phenyl]-2-(quinolin-6-yl)acetamide; N-[4-(3,5-dicyclopropyl-1H-pyrazol-1-yl)phenyl]-2-(quinolin-6-yl)acetamide; 2-(1H-benzo[d][1,2,3]triazol-1-yl)-N-(4-(3,5-dicyclopropyl-1H-pyrazol-1-yl)-3-fluorophenyl) acetamide; N-[4-(3,5-dicyclopropyl-1H-pyrazol-1-yl)-3-fluorophenyl]-2-(quinolin-6-yl) acetamide; N-[6-(3,5-dicyclopropyl-1H-pyrazol-1-yl)pyridin-3-yl]quinoline-6-carboxamide; N-[6-(3,5-dicyclopropyl-1H-pyrazol-1-yl)pyridin-3-yl]quinoxaline-6-carboxamide; 2-(1H-benzo[d][1,2,3]triazol-1-yl)-N-[6-(3,5-dicyclopropyl-1H-pyrazol-1-yl)pyridin-3-yl] acetamide; N-[6-(3,5-dicyclopropyl-1H-pyrazol-1-yl)pyridin-3-yl]-2-(quinolin-6-yl) acetamide; N-{4-[5-cyclopropyl-3-(trifluoromethyl)-1H-pyrazol-1-yl]phenyl}quinoline-6-carboxamide; N-{4-[5-cyclopropyl-3-(trifluoromethyl)-1H-pyrazol-1-yl]phenyl}quinoxaline-6-carboxamide; 2-(1H-benzo[d]imidazol-1-yl)-N-{4-[5-cyclopropyl-3-(trifluoromethyl)-1H-pyrazol-1-yl]phenyl} acetamide; 2-(1H-benzo[d][1,2,3]triazol-1-yl)-N-{4-[5-cyclopropyl-3-(trifluoromethyl)-1H-pyrazol-1-yl]phenyl}acetamide; 2-(2H-benzo[d][1,2,3]triazol-2-yl)-N-{4-[5-cyclopropyl-3-(trifluoromethyl)-1H-pyrazol-1-yl]phenyl}acetamide; 2-(3H-[1,2,3]triazolo[4,5-b]pyridin-3-yl)-N-{4-[5-cyclopropyl-3-(trifluoromethyl)-1H-pyrazol-1- yl] phenyl}acetamide; (S)-2-(3H-[1,2,3]triazolo[4,5-b]pyridin-3-y])-N-{4-[5-cyclopropyl-3-(trifluoromethyl)-1H-pyrazol-1-yl]phenyl}propanamide; 2-(6-amino-9H-purin-9-yl)-N-{4-[5-cyclopropyl-3-(trifluoromethyl)-1H-pyrazol-1-yl]phenyl}acetamide; N-(4-(5-cyclopropyl-3-(trifluoromethyl)-1H-pyrazol-1-yl)phenyl)-2-(1,3-dimethyl-2,6-dioxo-2,3-dihydro-1H-purin-7(6H)-yl)acetamide; N-{4-[5-cyclopropyl-3-(trifluoromethyl)-1H-pyrazol-1-yl)phenyl)-2-(imidazo[1,2-a] pyridin-2-yl) acetamide; N-{4-[5-cyclopropyl-3-(trifluoromethyl)-1H-pyrazol-1-yl]phenyl}-2-(quinolin-6-yl)acetamide; N-{4-[5-cyclopropyl-3-(trifluoromethyl)-1H-pyrazol-1-yl]phenyl}-2-(quinolin-6-yl)propanamide; N-{4-[5-cyclopropyl-3-(trifluoromethyl)-1H-pyrazol-1-yl]-3-fluorophenyl}-1H-benzo[d] [1,2,3]triazole-6-carboxamide; 2-(1H-benzo[d][1,2,3]triazol-1-yl)-N-{4-[5-cyclopropyl-3-(trifluoromethyl)-1H-pyrazol-1-yl]-3-fluorophenyl}acetamide; N-{6-[5-cyclopropyl-3-(trifluoromethyl)-1H-pyrazol-1-yl]pyridin-3-yl}-1H-benzo[d][1,2,3] triazole-5-carboxamide; 2-(1H-benzo[d][1,2,3]triazol-1-yl)-N-{6-[5-cyclopropyl-3-(trifluoromethyl)-1H-pyrazol-1-yl]pyridin-3-yl}acetamide; 2-(2H-benzo[d][1,2,3]triazol-2-yl)-N-{6-[5-cyclopropyl-3-(trifluoromethyl)-1H-pyrazol-1-yl]pyridin-3-yl}acetamide; N-{6-[5-cyclopropyl-3-(trifluoromethyl)-1H-pyrazol-1-yl]pyridin-3-yl}-2-(quinolin-6-yl)acetamide; 2-(1H-benzo[d][1,2,3]triazol-1-yl)-N-{6-[4-chloro-5-cyclopropyl-3-(trifluoromethyl)-1H-pyrazol-1-yl]pyridin-3-yl}acetamide; 4-[5-cyclopropyl-3-(trifluoromethyl)-1H-pyrazol-1-yl]-3-fluoro-N-(quinolin-6-ylmethyl)benzamide; or 1-[4-(3,5-dicyclopropyl-1H-pyrazol-1-yl)phenyl]-3-(quinolin-6-yl)urea. Each of these compounds is also an example of a Calcium channel inhibitor, or of a SOC inhibitor.

Disclosed herein, in some embodiments, are CRAC inhibitors. In some embodiments, the CRAC inhibitor comprises any one of 4-[6-(2-chloro-6-fluoro-phenyl)-5H-pyrrolo[3,2-d]pyrimidin-2-yl]-3,N,N-trimethyl-benzenesulfonamide; 6-(2-Chloro-phenyl)-2-(2-methyl-5-trifluoromethyl-2H-pyrazol-3-yl)-5H-pyrrolo[2,3-b]pyrazine; 4-[6-(2-Chloro-phenyl)-5H-pyrrolo[2,3-b]pyrazin-2-yl]-3-methyl-benzoic acid methyl ester; 4-(6-(2-Chlorophenyl)-5H-pyrrolo[2,3-b]pyrazin-2-yl)-N,N,3-trimethylbenzenesulfonamide; 6-(2-chloro-6-fluorophenyl)-2-(1-methyl-3-(trifluoromethyl)-1H-pyrazol-5-yl)-5H-pyrrolo[2,3-b]pyrazine; 6-Cyclohexyl-2-(1-methyl-3-(trifluoromethyl)-1H-pyrazol-5-yl)-5H-pyrrolo[2,3-b]pyrazine; or 4-(6-Cyclohexyl-5H-pyrrolo[2,3-b]pyrazin-2-yl)-N,N,3-trimethylbenzenesulfonamide. Each of these compounds is also an example of a Calcium channel inhibitor, or of a SOC inhibitor.

Disclosed herein, in some embodiments, are CRAC inhibitors. In some embodiments, the CRAC inhibitor comprises any one of 2,6-Difluoro-N-(6-(5-(4-methyl-5-oxo-4,5-dihydro-1,3,4-oxadiazol-2-yl)-3-(trifluoromethyl)-1H-pyrazol-1-yl)pyridin-3-yl)benzamide; 2-Fluoro-6-methyl-N-(6-(5-(4-methyl-5-oxo-4,5-dihydro-1,3,4-oxadiazol-2-yl)-3-(trifluoromethyl)-1H-pyrazol-1-yl)pyridin-3-yl)benzamide; 5-(3-Cyclopropyl-1-(5-(2,6-difluorobenzyl)amino)pyridin-2-yl)-1H-pyrazol-5-yl)-3-methyl-1,3,4-oxadiazol-2(3H)-one; N-(6-(3-(Difluoromethyl)-5-(4-methyl-5-oxo-4,5-dihydro-1,3,4-oxadiazol-2-yl)-1H-pyrazol-1-yl)pyridin-3-yl)-2,6-difluorobenzamide; 5-(1-(5-(2,6-Difluorobenzyl)amino)pyridin-2-yl)-5-(fluoromethyl)-1H-pyrazol-3-yl)-3-methyl-1,3,4-oxadiazol-2(3H)-one; Methyl 3-(1-(5-((2,6-difluorobenzyl) amino)pyridin-2-yl)-5-(trifluoromethyl)-1H-pyrazol-3-yl)-5-methyl-4,5-dihydroisoxazole-5-carboxylate; Methyl 3-(1-(5-(2-chloro-6-fluorobenzyl)amino)pyridin-2-yl)-5-(trifluoromethyl)-1H-pyrazol-3-yl)-5-methyl-4,5-dihydroisoxazole-5-carboxylate; 2,6-Difluoro-W-(6-(3-(4-methyl-5-oxo-4,5-dihydro-1,3,4-oxadiazol-2-yl)-5-(trifluoromethyl)-1H-pyrazol-1-yl)pyridin-3-yl)benzamide; 2-Chloro-6-fluoro-N-(6-(3-(4-methyl-5-oxo-4,5-dihydro-1,3,4-oxadiazol-2-yl)-5-(trifluoromethyl)-H-pyrazol-1-yl)pyridin-3-yl)benzamide; 2-Fluoro-6-methyl-/v-(6-(3-(4-methyl-5-oxo-4,5-dihydro-1,3,4-oxadiazol-2-yl)-5-(trifluoromethyl)-1H-pyrazol-1-yl)pyridin-3-yl)benzamide; N-(6-(5-(Difluoromethyl)-3-(4-methyl-5-oxo-4,5-dihydro-1,3,4-oxadiazol-2-yl)-1H-pyrazol-1-yl)pyridin-3-yl)-2,6-difluorobenzamide; 5-(1-(5 ((2,6-Difluorobenzyl) amino)pyridin-2-yl)-5-(difluoromethyl)-1H-pyrazol-3-yl)-3-methyl-1,3,4-oxadiazol-2(3H)-one; 5-(1-(5-((2,6-Difluorobenzyl)amino)pyridin-2-yl)-3-(difluoromethyl)-1H-pyrazol-5-yl)-3-methyl-1,3,4-oxadiazol-2(3H)-one; N-(6-(3-(5,5-Dimethyl-4-oxo-4,5-dihydroisoxazol-3-yl)-5-(trifluoromethyl)-1H-pyrazol-1-yl)pyridin-3-yl)-2,6-difluorobenzamide; 2-Chloro-N-(6-(3-(5,5-dimethyl-4-oxo-4,5-dihydroisoxazol-3-yl)-5-(trifluoromethyl)-1H-pyrazol-1-yl)pyridin-3-yl)-6-fluorobenzamide; 2,6-Difluoro-N-(6-(1',4',4,-trimethyl-5'-oxo-5-(trifluoromethyl)-4',5'-dihydro-1H,1H'-[3,3'-bipyrazol]-1-yl)pyridin-3-yl)benzamide; 2-Chloro-6-fluoro-N-(6-(1,4,4'-trimethyl-5'-oxo-5-(trifluoromethyl)-4',5,-dihydro-1H,1'H-[3,3'-bipyrazol]-1-yl)pyridin-3-yl)benzamide; 2-Fluoro-6-methyl-N-(6-(1,4,4'-trimethyl-5'-oxo-5-(trifluoromethyl)-4',5'-dihydro-1H,1'H-[3,3'-bipyrazol]-1-yl)pyridin-3-yl)benzamide; 2,6-Difluoro-N-(6-(3-(4-methyl-5-oxo-4,5-dihydro-1,2,4-oxadiazol-3-yl)-5-(trifluoromethyl)-1H-pyrazol-1-yl)pyridin-3-yl)benzamide; N-(6-(3-(4-Acetyl-5,5-dimethyl-4,5-dihydro-1,3,4-oxadiazol-2-yl)-5-trifluoromethyl-1H-pyrazol-1-yl)pyridin-3-yl)-2,6-difluorobenzamide; N-(6-(3-(4,4-Dimethyl-4,5-dihydrooxazol-2-yl)-5-(trifluoromethyl)-1H-pyrazol-1-yl)pyridin-3-yl)-2,6-difluorobenzamide; 5-(1-(5-(2,6-Difluorobenzyl)amino)pyridin-2-yl)-5-(trifluoromethyl)-1H-pyrazol-3-yl)-3-methyl-1,3,4-oxadiazol-2(3H)-one; 5-(1-(5-((2-Chloro-6-fluorobenzyl)amino)pyridin-2-yl)-5-(trifluoromethyl)-1H-pyrazol-3-yl)-3-methyl-1,3,4-oxadiazol-2(3iy)-one; 1'454(2,6-Difluorobenzyl)amino)pyridin-2-yl)-1,4,4-trimethyl-5'-(trifluoromethyl)-1H,1'H-[3,3'-bipyrazol]-5(4H)-one; 1'-(5-(2-Chloro-6-fluorobenzyl)amino)pyridin-2-yl)-1,4,4-trimethyl-5'-(trifluoromethyl)-1H,1'H-[3,3'-bipyrazol]-5(4H)-one; 3-(1-(5-(2,6-Difluorobenzyl)amino)pyridin-2-yl)-5-(trifluoromethyl)-1H-pyrazol-3-yl)-4-methyl-1,2,4-oxadiazol-5(4H)-one; 1-(5-(1-(5-(2,6-Difluorobenzyl)amino)pyridin-2-yl)-5-(trifluoromethyl)-1H-pyrazol-3-yl)-2,2-dimethyl-1,3,4-oxadiazol-3(2H)-yl)ethanone; N-(2,6-Difluorobenzyl)-6-(3-(4,4-dimethyl-4,5-dihydrooxazol-2-yl)-5-(trifluoromethyl)-1H-pyrazol-1-yl)pyridin-3-amine; N-(6-(5-Cyclopropyl-3-(4-methyl-5-oxo-4,5-dihydro-1,3,4-oxadiazol-2-yl)-1H-pyrazol-1-yl)pyridin-3-yl)-2,6-difluorobenzamide; N-(6-(3-Cyclopropyl-5-(4-methyl-5-oxo-4,5-dihydro-1,3,4-oxadiazol-2-yl)-1H-pyrazol-1-yl)pyridin-3-yl)-2,6-difluorobenzamide; 2,6-Difluoro-N-(6-(5-methyl-3-(4-methyl-5-oxo-4,5-dihydro-1,3,4-oxadiazol-2-yl)-1H-pyrazol-1-yl)pyridin-3-yl)benzamide; 5-(1-(5-((2,6-Difluorobenzyl) amino)pyridin-2-yl)-5-methyl-1H-pyrazol-3-yl)-3-methyl-1,3,4-oxadiazol-2(3H)-one; (3-(I-(5-((2,6-Difluorobenzyl)amino)pyridin-2-yl)-5-(trifluoromethyl)-1H-pyrazol-3-yl)-5-methyl-4,5-dihydroisoxazol-5-yl) methanol; (3-(1-(5-((2-Chloro-6-fluorobenzyl)amino)pyridin-2-yl)-5-(trifluoromethyl)-1H-pyrazol-3-yl)-5-methyl-4,5-dihydroisoxazol-5-yl)methanol; Methyl 3-(1-(5-(2,6-difluorobenzamido)pyridin-2-yl)-5-(trifluoromethyl)-1H-pyrazol-3-yl)-5-methyl-4,5-dihydroisoxazole-5- carboxylate; 2,6-Difluoro-N-(6-(3-(5-(hydroxymethyl)-5-methyl-4,5-dihydroisoxazol-3-yl)-5-(trifluoromethyl)-1H-pyrazol-1-yl)pyridin-3-yl)benzamide; 3-(1-(5-(2,6-Difluorobenzamido)pyridin-2-yl)-5-(trifluoromethyl)-1H-pyrazol-3-yl)-5-methyl-4,5-dihydroisoxazole-5-carboxamide; 2,6-Difluoro-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 2-Chloro-6-fluoro-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 2-Fluoro-6-methyl-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 2-Fluoro-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 2,3-Difluoro-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 2,4,5-Trifluoro-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 2,3,4-Trifluoro-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 2,4-Difluoro-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 2,3-Dimethyl-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 2-Chloro-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 2-Methyl-N-(5-(3-(4-methyl-5-oxo-4,5-dihydro-1,3,4-oxadiazol-2-yl)-5-(trifluoromethyl)-1H-pyrazol-1-yl)pyridin-2-yl)benzamide; 4-Ethyl-N-(5-(3-(4-methyl-5-oxo-4,5-dihydro-1,3,4-oxadiazol-2-yl)-5-(trifluoromethyl)-1//-pyrazol-1-yl)pyridin-2-yl)benzamide; N-(5-(3-(4-Methyl-5-oxo-4,5-dihydro-13,4-oxadiazol-2-yl)-5-(trifluoromethyl)-1H-pyrazol-1-yl)pyridin-2-yl)-2-naphthamide; 5-(1-(6-((2,6-Difluorobenzyl)amino)pyridin-3-yl)-5-(trifluoromethyl)-1H-pyrazol-3-yl)-3-methyl-1,3,4-oxadiazol-2(3H)-one; 5-(1-(6-((2-Chloro-6-fluorobenzyl)amino)pyridin-3-yl)-5-(trifluoromethyl)-1H-pyrazol-3-yl)-3-methyl-1,3,4-oxadiazol-2(3H)-one; 5-(1-(6-(2-Fluoro-6-methylbenzyl)amino)pyridm-3-yl)-5-(trifluoromethyl)-1H-pyrazol-3-yl)-3-methyl-1,3,4-oxadiazol-2(3H)-one; N-(2,6-Difluorophenyl)-6-(3-(4-methyl-5-oxo-4,5-dihydro-1,3,4-oxadiazol-2-yl)-5-(trifluoromethyl)-1H-pyrazol-1-yl)nicotinamide; or N-(2-Chloro-6-fluorophenyl)-6-(3-(4-methyl-5-oxo-4,5-dihydro-1,3,4-oxadiazol-2-yl)-5-(trifluoromethyl)-1H-pyrazol-1-yl)nicotinamide. Each of these compounds is also an example of a Calcium channel inhibitor, or of a SOC inhibitor.

Disclosed herein, in some embodiments, are Calcium channel inhibitors, SOC inhibitors, or CRAC inhibitors. In some embodiments, the Calcium channel inhibitor, SOC inhibitor, or CRAC inhibitor comprises a small molecule such as a small molecule that interferes with the Calcium channel's activity, the SOC channel's activity, or the CRAC channel's activity. In some embodiments, the Calcium channel inhibitor, SOC inhibitor, or CRAC inhibitor comprises a polypeptide such as a mutated or nonfunctional form of a component of a Calcium channel, of a SOC channel, or of a CRAC channel that may interfere with the Calcium channel's activity, the SOC channel's activity, or the CRAC channel's activity.

Further Forms of Compounds

The compounds described herein may in some cases exist as diastereomers, enantiomers, or other stereoisomeric forms. The compounds presented herein include all diastereomeric, enantiomeric, and epimeric forms as well as the appropriate mixtures thereof. Separation of stereoisomers may be performed by chromatography or by the forming diastereomeric and separation by recrystallization, or chromatography, or any combination thereof (Jean Jacques, Andre Collet, Samuel H. Wilen, "Enantiomers, Racemates and Resolutions", John Wiley And Sons, Inc., 1981, herein incorporated by reference for this disclosure). Stereoisomers may also be obtained by stereoselective synthesis.

In some situations, compounds may exist as tautomers. All tautomers are included within the formulas described herein.

The methods and compositions described herein include the use of amorphous forms as well as crystalline forms (also known as polymorphs). The compounds described herein may be in the form of pharmaceutically acceptable salts. As well, active metabolites of these compounds having the same type of activity are included in the scope of the present disclosure. In addition, the compounds described herein can exist in unsolvated as well as solvated forms with pharmaceutically acceptable solvents such as water, ethanol, and the like. The solvated forms of the compounds presented herein are also considered to be disclosed herein.

In some embodiments, compounds described herein may be prepared as prodrugs. A "prodrug" refers to an agent that is converted into the parent drug in vivo. Prodrugs are often useful because, in some situations, they may be easier to administer than the parent drug. They may, for instance, be bioavailable by oral administration whereas the parent is not. The prodrug may also have improved solubility in pharmaceutical compositions over the parent drug. An example, without limitation, of a prodrug would be a compound described herein, which is administered as an ester (the "prodrug") to facilitate transmittal across a cell membrane where water solubility is detrimental to mobility but which then is metabolically hydrolyzed to the carboxylic acid, the active entity, once inside the cell where water-solubility is beneficial. A further example of a prodrug might be a short peptide (polyaminoacid) bonded to an acid group where the peptide is metabolized to reveal the active moiety. In certain embodiments, upon in vivo administration, a prodrug is chemically converted to the biologically, pharmaceutically or therapeutically active form of the compound. In certain embodiments, a prodrug is enzymatically metabolized by one or more steps or processes to the biologically, pharmaceutically or therapeutically active form of the compound.

To produce a prodrug, a pharmaceutically active compound is modified such that the active compound will be regenerated upon in vivo administration. The prodrug can be designed to alter the metabolic stability or the transport characteristics of a drug, to mask side effects or toxicity, to improve the flavor of a drug or to alter other characteristics or properties of a drug. In some embodiments, by virtue of knowledge of pharmacodynamic processes and drug metabolism in vivo, once a pharmaceutically active compound is determined, prodrugs of the compound are designed. (see, for example, Nogrady (1985) Medicinal Chemistry A Biochemical Approach, Oxford University Press, New York, pages 388-392; Silverman (1992), The Organic Chemistry of Drug Design and Drug Action, Academic Press, Inc., San Diego, pages 352-401, Saulnier et al., (1994), Bioorganic and Medicinal Chemistry Letters, Vol. 4, p. 1985; Rooseboom et al., Pharmacological Reviews, 56:53-102, 2004; Miller et al., J. Med. Chem. Vol. 46, no. 24, 5097-5116, 2003; Aesop Cho, "Recent Advances in Oral Prodrug Discovery", Annual Reports in Medicinal Chemistry, Vol. 41, 395-407, 2006).

Prodrug forms of the herein described compounds, wherein the prodrug is metabolized in vivo to produce a compound as set forth herein, are included within the scope of the claims. In some cases, some of the herein-described compounds may be a prodrug for another derivative or active compound.

Prodrugs are often useful because, in some situations, they may be easier to administer than the parent drug. They may, for instance, be bioavailable by oral administration whereas the parent is not. The prodrug may also have improved solubility in pharmaceutical compositions over the parent drug. Prodrugs may be designed as reversible drug derivatives, for use as modifiers to enhance drug transport to site-specific tissues. In some embodiments, the design of a prodrug increases the effective water solubility. See, e.g., Fedorak et al., Am. J. Physiol., 269:G210-218 (1995); McLoed et al., Gastroenterol, 106:405-413 (1994); Hochhaus et al., Biomed. Chrom., 6:283-286 (1992); J. Larsen and H. Bundgaard, Int. J. Pharmaceutics, 37, 87 (1987); J. Larsen et al., Int. J. Pharmaceutics, 47, 103 (1988); Sinkula et al., J. Pharm. Sci., 64:181-210 (1975); T. Higuchi and V. Stella, Pro-drugs as Novel Delivery Systems, Vol. 14 of the A.C.S. Symposium Series; and Edward B. Roche, Bioreversible Carriers in Drug Design, American Pharmaceutical Association and Pergamon Press, 1987, all incorporated herein for such disclosure).

Sites on the aromatic ring portion of compounds described herein can be susceptible to various metabolic reactions, therefore incorporation of appropriate substituents on the aromatic ring structures, such as, by way of example only, halogens can reduce, minimize or eliminate this metabolic pathway.

The compounds described herein may be labeled isotopically (e.g. with a radioisotope) or by other means, including, but not limited to, the use of chromophores or fluorescent moieties, bioluminescent labels, photoactivatable or chemiluminescent labels.

Compounds described herein include isotopically-labeled compounds, which are identical to those recited in the various formulae and structures presented herein, but for the fact that one or more atoms are replaced by an atom having an atomic mass or mass number different from the atomic mass or mass number usually found in nature. Examples of isotopes that can be incorporated into the present compounds include isotopes of hydrogen, carbon, nitrogen, oxygen, fluorine and chlorine, such as, for example, 2H, 3H, 13C, 14C, 15N, 18O, 17O, 35S, 18F, 36Cl, respectively. Certain isotopically-labeled compounds described herein, for example those into which radioactive isotopes such as 3H and 14C are incorporated, are useful in drug and/or substrate tissue distribution assays. Further, substitution with isotopes such as deuterium, i.e., 2H, can afford certain therapeutic advantages resulting from greater metabolic stability, such as, for example, increased in vivo half-life or reduced dosage requirements.

In additional or further embodiments, the compounds described herein are metabolized upon administration to an organism in need to produce a metabolite that is then used to produce a desired effect, including a desired therapeutic effect.

Compounds described herein may be formed as, and/or used as, pharmaceutically acceptable salts. The type of pharmaceutical acceptable salts, include, but are not limited to: (1) acid addition salts, formed by reacting the free base form of the compound with a pharmaceutically acceptable: inorganic acid, such as, for example, hydrochloric acid, hydrobromic acid, sulfuric acid, phosphoric acid, metaphosphoric acid, and the like; or with an organic acid, such as, for example, acetic acid, propionic acid, hexanoic acid, cyclopentanepropionic acid, glycolic acid, pyruvic acid, lactic acid, malonic acid, succinic acid, malic acid, maleic acid, fumaric acid, trifluoroacetic acid, tartaric acid, citric acid, benzoic acid, 3-(4-hydroxybenzoyl)benzoic acid, cinnamic acid, mandelic acid, methanesulfonic acid, ethanesulfonic acid, 1,2-ethanedisulfonic acid, 2-hydroxyethanesulfonic acid, benzenesulfonic acid, toluenesulfonic acid, 2-naphthalenesulfonic acid, 4-methylbicyclo-[2.2.2]oct-2-ene-1-carboxylic acid, glucoheptonic acid, 4,4'-methylenebis-(3-hydroxy-2-ene-1-carboxylic acid), 3-phenylpropionic acid, trimethylacetic acid, tertiary butylacetic acid, lauryl sulfuric acid, gluconic acid, glutamic acid, hydroxynaphthoic acid, salicylic acid, stearic acid, muconic acid, butyric acid, phenylacetic acid, phenylbutyric acid, valproic acid, and the like; (2) salts formed when an acidic proton present in the parent compound is replaced by a metal ion, e.g., an alkali metal ion (e.g. lithium, sodium, potassium), an alkaline earth ion (e.g. magnesium, or calcium), or an aluminum ion. In some cases, compounds described herein may coordinate with an organic base, such as, but not limited to, ethanolamine, diethanolamine, triethanolamine, tromethamine, N-methylglucamine, dicyclohexylamine, tris(hydroxymethyl)methylamine. In other cases, compounds described herein may form salts with amino acids such as, but not limited to, arginine, lysine, and the like. Acceptable inorganic bases used to form salts with compounds that include an acidic proton, include, but are not limited to, aluminum hydroxide, calcium hydroxide, potassium hydroxide, sodium carbonate, sodium hydroxide, and the like.

It should be understood that a reference to a pharmaceutically acceptable salt includes the solvent addition forms or crystal forms thereof, particularly solvates or polymorphs. Solvates contain either stoichiometric or non-stoichiometric amounts of a solvent, and may be formed during the process of crystallization with pharmaceutically acceptable solvents such as water, ethanol, and the like. Hydrates are formed when the solvent is water, or alcoholates are formed when the solvent is alcohol. Solvates of compounds described herein can be conveniently prepared or formed during the processes described herein. In addition, the compounds provided herein can exist in unsolvated as well as solvated forms. In general, the solvated forms are considered equivalent to the unsolvated forms for the purposes of the compounds and methods provided herein.

In some embodiments, compounds described herein, are in various forms, including but not limited to, amorphous forms, milled forms, injectable emulsion forms, and nanoparticulate forms. In addition, compounds described herein include crystalline forms, also known as polymorphs. Polymorphs include the different crystal packing arrangements of the same elemental composition of a compound. Polymorphs usually have different X-ray diffraction patterns, melting points, density, hardness, crystal shape, optical properties, stability, and solubility. Various factors such as the recrystallization solvent, rate of crystallization, and storage temperature may cause a single crystal form to dominate.

The screening and characterization of the pharmaceutically acceptable salts, polymorphs and/or solvates may be accomplished using a variety of techniques including, but not limited to, thermal analysis, x-ray diffraction, spectroscopy, vapor sorption, and microscopy. Thermal analysis methods address thermo chemical degradation or thermo physical processes including, but not limited to, polymorphic transitions, and such methods are used to analyze the relationships between polymorphic forms, determine weight loss, to find the glass transition temperature, or for excipient compatibility studies. Such methods include, but are not limited to, Differential scanning calorimetry (DSC), Modulated Differential Scanning Calorimetry (MDCS), Thermogravimetric analysis (TGA), and Thermogravi-metric and Infrared analysis (TG/IR). X-ray diffraction methods include, but are not limited to, single crystal and powder diffractometers and synchrotron sources. The various spectroscopic techniques used include, but are not limited to, Raman, FTTR, UV-VIS, and NMR (liquid and solid state). The various microscopy techniques include, but are not limited to, polarized light microscopy, Scanning Electron Microscopy (SEM) with Energy Dispersive X-Ray Analysis (EDX), Environmental Scanning Electron Microscopy with EDX (in gas or water vapor atmosphere), IR microscopy, and Raman microscopy.

Throughout the specification, groups and substituents thereof can be chosen to provide stable moieties and compounds.

Synthesis of Compounds

In some embodiments, the synthesis of compounds described herein are accomplished using means described in the chemical literature, using the methods described herein, or by a combination thereof. In addition, solvents, temperatures and other reaction conditions presented herein may vary.

In other embodiments, the starting materials and reagents used for the synthesis of the compounds described herein are synthesized or are obtained from commercial sources, such as, but not limited to, Sigma-Aldrich, Fischer Scientific (Fischer Chemicals), and Acros Organics.

In further embodiments, the compounds described herein, and other related compounds having different substituents are synthesized using techniques and materials described herein as well as those that are recognized in the field, such as described, for example, in Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), Larock's Comprehensive Organic Transformations (VCH Publishers Inc., 1989), March, Advanced Organic Chemistry 4th Ed., (Wiley 1992); Carey and Sundberg, Advanced Organic Chemistry 4th Ed., Vols. A and B (Plenum 2000, 2001), and Green and Wuts, Protective Groups in Organic Synthesis 3rd Ed., (Wiley 1999) (all of which are incorporated by reference for such disclosure).

Acute Lung Injury (ALI) and its Severe Manifestation, Acute Respiratory Distress Syndrome (ARDS)

ALI and ARDS are deadly and complex respiratory complications that includes various pathogenic factors such as aspiration of gastric contents, microbial infection, sepsis and trauma. There are two major pathological features of ALI/ARDS; edema and neutrophil accumulation in the lung tissue. Initial inflammatory stimuli disrupt lung endothelial and/or epithelial barrier and induce extravasation of protein rich fluid resulting in lung edema. These stimuli also cause neutrophil infiltration into the interstitium and alveolar airspace. Infiltrated neutrophils injure lung parenchymal cells by secreting elastase and reactive oxygen species, inducing the further production of pro-inflammatory cytokines and activation of inflammatory cells. These physical and chemical tissue damages lead to the impairment of air exchange and severe respiratory dysfunction.

The innate immune response plays a role in the pathophysiology of ALI/ARDS. Multiple immunologic processes involving neutrophils, macrophages, and dendritic cells involve in mediating tissue injury. Inflammatory insults, either locally from the lungs or systemically from extrapulmonary sites, affect bronchial epithelium, alveolar macrophages, and vascular endothelium, causing accumulation of protein-rich edema fluid into the alveoli and, subsequently, hypoxemia due to impaired gas exchange. Alveolar macrophages play a central role in orchestrating inflammation, as well as the resolution of ARDS. Once alveolar macrophages are stimulated, they recruit neutrophils and circulating macrophages to the pulmonary sites of injury. These cells are involved in the elaboration of a diverse array of bioactive mediators, including proteases, reactive oxygen species, eicosanoids, phospholipids, and cytokines, that perpetuate inflammatory responses. One profound effect of these mediators is to damage or induce distal cell death, specifically alveolar type 2 epithelial cells. These cells serve vital functions by synthesizing and secreting pulmonary surfactant, which is an indispensable material that lines the inner lung surface to lower alveolar surface tension. Type 2 cells also actively partake in ion transport to control lung fluid. Together, these inflammatory events lead to histological changes typical of an acute exudative phase that results in significant impairment of lung mechanics and gas exchange. During the initial inflammatory and/or resolution phases of ARDS, alveolar macrophages also coordinate in a paracrine manner to interact with other cells, including epithelial cells, lymphocytes, and mesenchymal stem cells, which can result in augmentation of the inflammatory response or accentuation of tissue injury. Prolonged M1 (classically activated macrophages) or M2 (alternatively activated macrophages) phenotypes appear to be associated with nonhealing chronic ARDS/ALI. ARDS/ALI is a systemic inflammatory disease with bidirectional involvement between the lungs and other organ systems, rather than a local pulmonary process. Inflammatory cytokines, such as IL-1$\beta$, TNF-$\alpha$, IL-6, and IL-8, are elevated both in bronchoalveolar lavage fluid and circulating plasma in ARDS subjects.

Bacterial and viral infections, such as Coronavirus (COVID-19) infection, can lead to ALI/ARDS. During infection, circulating bacterial and/or viral products and endogenous cytokines (e.g., IL-2, IL-6) stimulate the endothelium, setting off a cascade of vascular activation, including the increased expression of vascular adhesion molecules and regional increases in endothelial permeability.

In some embodiments, the ALI or ARDS is associated with a symptom or marker associated with the ALI or ARDS. For example, the ALI or ARDS may be associated with an increased expression of Stim1, Orai1, or PKC$\alpha$, increased cellular $Ca^{2+}$ uptake or $Ca^{2+}$ levels, an increase in AMPK activation, an increase in ACC or PLC phosphorylation, Na,K-ATPase downregulation, alveolar epithelial dysfunction, an increase in edema, an increase in a lung wet/dry weight ratio, an increase in a BALF protein level, or an increase in endothelial permeability, in a subject (e.g. in a subject's lungs). In some embodiments, the ALI or ARDS comprises lung inflammation and/or endothelial cell dysfunction in a subject, for example, in a subject's lungs. In some embodiments, the inflammation is caused or contributed by endothelial cell dysfunction. In some embodiments, the ALI comprises pulmonary inflammation. In some embodiments, the ARDS comprises pulmonary inflammation. In some embodiments, the pulmonary inflammation is caused or contributed by pulmonary endothelial cell dysfunction. In some embodiments, the ALI comprises pulmonary endothelial cell dysfunction. In some embodiments, the ALI or ARDS comprises lung damage. In some embodiments, the ALI or ARDS comprises a cough. In some embodiments, the ALI or ARDS comprises a dry cough. In some embodiments, the ALI or ARDS comprises a fever or high temperature. In some embodiments, the ALI or ARDS comprises a shortness of breath. In some embodiments, the ALI or ARDS comprises a need for oxygen support. In some embodiments, the ALI or ARDS comprises a need for low flow oxygen. In some embodiments, the ALI or ARDS comprises a need for high flow oxygen. In some embodiments, the ALI or ARDS comprises a cytokine storm. In some embodiments, the ALI or ARDS comprises pulmonary endothelial damage. In some embodiments, the ALI or ARDS comprises CRAC channel overactivation. In some embodiments, the ALI or ARDS comprises an increase in intracellular calcium. In some embodiments, the ARDS comprises pulmonary endothelial cell dysfunction. In some embodiments, administration of a compound described herein, such as a CRAC inhibitor, may reduce, prevent, or reverse any of these symptoms.

In some embodiments, the ALI or ARDS comprises pneumonia. In some embodiments, the ALI comprises pneumonia. In some embodiments, the ARDS comprises pneumonia. In some embodiments, the pneumonia comprises a pneumonia stage such as a consolidation, red hepatization, grey hepatization, or resolution. In some embodiments, the pneumonia comprises a buildup of fluid in a subject's lung. In some embodiments, the pneumonia results in a symptom such as hypoxia or reduced blood oxygenation in a subject.

In some embodiments, the pneumonia comprises a community-related pneumonia. In some embodiments, the pneumonia comprises an aspiration pneumonia. In some embodiments, the pneumonia is a hospital-acquired pneumonia. In some embodiments, the pneumonia is a ventilator-associated pneumonia (VAP) pneumonia. In some embodiments, the hospital-acquired pneumonia comprises VAP. In some embodiments, the VAP is acquired by a patient has been hospitalized and/or intubated. In some embodiments, the ALI is ventilator-induced. In some embodiments, the ventilator induced ALI is associated with increased endothelial permeability. In some embodiments, the ALI or the ARDS is caused by sepsis, trauma, inhalation of a toxic substance, a transfusion, cocaine or other drug overdose, pancreatitis, or a burn.

In some embodiments, the pneumonia comprises an infection-related pneumonia. In some embodiments, the ALI or ARDS comprises an infection-related pneumonia. In some embodiments, the pneumonia does not include an infection-related pneumonia. In some embodiments, the infection-related pneumonia is a hospital-acquired pneumonia.

In some embodiments, the pneumonia comprises a viral pneumonia. In some embodiments, the ALI or ARDS comprises a viral pneumonia. In some embodiments, the infection-related pneumonia does not include a viral pneumonia.

In some embodiments, the viral pneumonia comprises a coronavirus pneumonia, an influenza pneumonia, a rhinovirus pneumonia, an adenovirus pneumonia, or a respiratory syncytial virus pneumonia. In some embodiments, the viral pneumonia comprises a rhinovirus pneumonia. In some embodiments, the viral pneumonia comprises an adenovirus pneumonia. In some embodiments, the viral pneumonia comprises a respiratory syncytial virus pneumonia.

In some embodiments, the viral pneumonia comprises an influenza pneumonia. In some embodiments, the influenza pneumonia comprises an influenza type A pneumonia. In some embodiments, the influenza pneumonia comprises an influenza type B pneumonia.

In some embodiments, the infection-related pneumonia comprises a bacterial pneumonia. In some embodiments, the bacterial pneumonia comprises a *Streptococcus pneumonia*, a *Staphylococcus aureus* pneumonia, a *Haemophilus influenzae* pneumonia, a *Legionella pneumophila* pneumonia, or a Methicillin resistant *Staphylococcus aureus* (MRSA) pneumonia. In some embodiments, the bacterial pneumonia comprises a *Streptococcus pneumonia*. In some embodiments, the bacterial pneumonia comprises a *Staphylococcus aureus* pneumonia. In some embodiments, the bacterial pneumonia comprises a *Haemophilus influenzae* pneumonia. In some embodiments, the bacterial pneumonia comprises a *Legionella pneumophila* pneumonia. In some embodiments, the bacterial pneumonia comprises a Methicillin resistant *Staphylococcus aureus* (MRSA) pneumonia. In some embodiments, the bacterial pneumonia comprises an atypical pneumonia. An example of an atypical pneumonia is a pneumonia that does not respond to a normal antibiotic. In some embodiments, the atypical pneumonia comprises a *Legionella pneumophila*. In some embodiments, the atypical pneumonia comprises a *Chlamydophila* pneumonia.

In some embodiments, the pneumonia comprises a parasite-related pneumonia. In some embodiments, the infection-related pneumonia comprises a *Mycoplasma* pneumonia. In some embodiments, the infection-related pneumonia comprises a fungal pneumonia. In some embodiments, the fungal pneumonia comprises a *Pneumocystis Jirovecii* Pneumonia.

In some embodiments, the viral pneumonia comprises a coronavirus pneumonia. In some embodiments, the ALI or ARDS comprises a coronavirus pneumonia. In some embodiments, the viral pneumonia does not include a coronavirus pneumonia. In some embodiments, the coronavirus pneumonia comprises a COVID-19 pneumonia. In some embodiments, the ALI or ARDS comprises a COVID-19 pneumonia. In some embodiments, the coronavirus pneumonia does not include a COVID-19 pneumonia. In some embodiments, the coronavirus pneumonia comprises a severe acute respiratory syndrome (SARS) pneumonia. In some embodiments, the coronavirus pneumonia comprises a Middle East respiratory syndrome (MERS) pneumonia.

There is a strong rationale for treating severe COVID-19 pneumonia with a CRAC inhibitor. Cytokines may drive lung injury in COVID-19 patients. For example, IL-6 may play a role in driving the overactive inflammatory response in the lungs of patients who have severe COVID-19 pneumonia. Elevated IL-2, IL-17 and TNFα may also play a role in severe COVID-19 pneumonia.

CRAC channel inhibitors may have multiple MOAs beneficial to treatment of lung injury. For example, they may inhibit the release of multiple key cytokines: IL-2, IL-6, IL-17, TNFα. They may inhibit a respiratory burst by neutrophils and neutrophil infiltration. They may prevent activation of the pulmonary endothelium and disruption of the alveolar-capillary barrier.

Preclinical data supports the use of CRAC inhibitors (e.g. N-(5-(6-Chloro-2,2-difluorobenzo[d][1,3]dioxol-5-yl) pyrazin-2-yl)-2-fluoro-6-methylbenzamide, Compound 1) in severe COVID-19 pneumonia. In vitro studies in human lymphocytes show Compound 1 inhibits release of multiple cytokines. Animal models of acute pancreatitis (AP) and lung injury show Compound 1 and other CRAC channel inhibitors inhibit cytokines and neutrophil infiltration in lung tissue.

Clinical data supports the use of CRAC inhibitors in severe COVID-19 pneumonia. An injectable emulsion of Compound 1 was safe in healthy volunteers for 365 days, and 90 days in patients with AP and accompanying SIRS plus hypoxemia. Treatment with Compound 1 resulted in a marked reduction in IL-6 levels in patients, and had beneficial effects on respiratory dysfunction in patients.

In some embodiments, the COVID-19 pneumonia comprises a severe pneumonia, or a severe COVID-19 pneumonia. In some embodiments, the ALI or ARDS comprises a severe COVID-19 pneumonia. In some embodiments, the COVID-19 pneumonia comprises a severe or critical COVID-19 pneumonia. In some embodiments, the COVID-19 pneumonia comprises a critical pneumonia, or a critical COVID-19 pneumonia. In some embodiments, the ALI or ARDS comprises a critical COVID-19 pneumonia. In some embodiments, the COVID-19 pneumonia does not include a severe COVID-19 pneumonia. In some embodiments, the COVID-19 pneumonia does not include a critical COVID-19 pneumonia.

In some embodiments, the pneumonia comprises a severe or critical pneumonia. In some embodiments, the ALI or ARDS comprises a severe pneumonia. An example of a severe pneumonia includes a pneumonia with impairment of air exchange or respiratory function. An example of a severe pneumonia includes need for oxygen support such as low-flow oxygen. In some embodiments, the ALI or ARDS comprises a critical pneumonia. An example of a critical pneumonia includes a pneumonia with respiratory failure. An example of a critical pneumonia includes need for additional oxygen support, or a need for high-flow oxygen. An example of a critical pneumonia includes need for mechanical ventilation, or a need for intubation.

Therapeutic Treatment of Respiratory Disorders Such as ALI/ARDS

Disclosed herein, in some embodiments, are methods of administering a composition described herein to a subject. Some embodiments relate to use a composition described herein, such as administering the composition to a subject.

Some embodiments relate to a method of treating a disorder in a subject in need thereof. Some embodiments relate to use of a composition described herein in the method of treatment. Some embodiments include administering a composition described herein to a subject with the disorder. In some embodiments, the administration treats the disorder in the subject. In some embodiments, the composition treats the disorder in the subject.

In some embodiments, the treatment comprises prevention, inhibition, or reversion of the disorder in the subject. Some embodiments relate to use of a composition described herein in the method of preventing, inhibiting, or reversing the disorder. Some embodiments relate to a method of preventing, inhibiting, or reversing a disorder a disorder in a subject in need thereof. Some embodiments include administering a composition described herein to a subject with the disorder. In some embodiments, the administration prevents, inhibits, or reverses the disorder in the subject. In some embodiments, the composition prevents, inhibits, or reverses the disorder in the subject.

Disclosed herein, are methods for treating or preventing a respiratory disorder. Some embodiments include treating a respiratory disorder. Some embodiments include preventing a respiratory disorder. Some embodiments include treating or alleviating a symptom of a respiratory disorder. Some embodiments include administering to a subject in need thereof, a composition described herein such as a pharmaceutical composition (e.g., a pharmaceutical composition comprising a Calcium channel inhibitor such as a CRAC inhibitor). Some embodiments include identifying the subject in need as having or being at risk of having the respiratory disorder.

In some embodiments, the respiratory disorder comprises an inflammatory disorder. In some embodiments, the inflammatory disorder comprises an ALI or ARDS. In some embodiments, the respiratory disorder comprises an ALI. In some embodiments, the respiratory disorder comprises an ARDS. In some embodiments, the ALI or the ARDS comprises a pneumonia. In some embodiments, the respiratory disorder comprises pneumonia. The pneumonia may, in some cases, be any pneumonia described herein. In some embodiments, the respiratory disorder is hospital-acquired. In some embodiments, the respiratory disorder is ventilator-associated or ventilator-induced.

In some embodiments, the respiratory disorder comprises an infection. In some embodiments, the infection comprises a viral infection. In some embodiments, the viral infection comprises a coronavirus infection. In some embodiments, the coronavirus infection comprises COVID-19. In some embodiments, the coronavirus infection comprises severe acute respiratory syndrome (SARS). In some embodiments, the infection comprises Middle East respiratory syndrome (MERS). In some embodiments, the viral infection comprises a rhinovirus infection. In some embodiments, the viral infection comprises an adenovirus infection. In some embodiments, the viral infection comprises a respiratory syncytial virus infection. In some embodiments, the viral infection comprises an influenza infection. In some embodiments, the influenza comprises influenza type A. In some embodiments, the influenza comprises influenza type B. In some embodiments, the influenza comprises influenza type C. In some embodiments, the influenza comprises influenza type D. In some embodiments, the influenza comprises a hemagglutinin subtype such as H1, H2, H3, H5, H6, H7, H9, or H10. In some embodiments, the influenza comprises a neuraminidase subtype such as N1, N2, N6, N7, N8, or N9.

In some embodiments, the infection comprises a bacterial infection. In some embodiments, the bacterial infection comprises a *Streptococcus* infection. In some embodiments, the bacterial infection comprises a *Staphylococcus aureus* infection. In some embodiments, the bacterial infection comprises a *Haemophilus influenzae* infection. In some embodiments, the bacterial infection comprises a *Legionella pneumophila* infection. In some embodiments, the bacterial infection comprises a Methicillin resistant *Staphylococcus aureus* (MRSA) infection. In some embodiments, the bacterial infection comprises a *Legionella pneumophila*. In some embodiments, the bacterial infection comprises a *Chlamydophila* infection.

In some embodiments, the infection comprises a parasite-related infection. In some embodiments, the infection-related infection comprises a *Mycoplasma* infection. In some embodiments, the infection-related infection comprises a fungal infection. In some embodiments, the fungal infection comprises a *Pneumocystis Jirovecii* Infection.

Disclosed herein are compositions and methods for treating acute lung injury (ALI) or acute respiratory distress syndrome (ARDS) in a subject comprising administering a therapeutically effective amount of an intracellular Calcium signaling inhibitor to said subject. Further, disclosed herein are compositions and methods for preventing acute lung injury (ALI) or acute respiratory distress syndrome (ARDS) in a subject at risk of developing ALI or ARDS, comprising administering a therapeutically effective amount of an intracellular Calcium signaling inhibitor to said subject.

The compositions and methods may be used in some embodiments for treating any ALI or ARDS, including, but not limited to a pneumonia, a viral pneumonia, a coronavirus pneumonia, a COVID-19 pneumonia, a severe COVID-19 pneumonia such as a COVID-19 with impairment of air exchange or respiratory function, and/or a critical COVID-19 pneumonia such as a COVID-19 with respiratory failure. The compositions and methods may be used for treating an infection. The compositions and methods may be used for treating a viral infection. The compositions and methods may be used for treating a coronavirus infection. The compositions and methods may be used for treating COVID-19. In some embodiments, a composition or method described herein includes a measure to treat pneumonia, such as a pneumonia described herein. The treatment may comprise administration of a compound or composition described herein to a subject. The subject may be identified as having a disease or disorder disclosed herein. The subject may be identified as being at risk of having a disease or disorder disclosed herein.

The compositions and methods may be used in some embodiments for preventing any ALI or ARDS, including, but not limited to a pneumonia, a viral pneumonia, a coronavirus pneumonia, a COVID-19 pneumonia, a severe COVID-19 pneumonia such as a COVID-19 with impairment of air exchange or respiratory function, and/or a critical COVID-19 pneumonia such as a COVID-19 with respiratory failure. The compositions and methods may be used for preventing an infection. The compositions and methods may be used for preventing a viral infection. The compositions and methods may be used for preventing a coronavirus infection. The compositions and methods may be used for preventing COVID-19. In some embodiments, a composition or method described herein includes a measure to prevent pneumonia, such as a pneumonia described herein. The prevention may comprise administration of a compound or composition described herein to a subject. The subject may be identified as having a disease or disorder disclosed herein. The subject may be identified as being at risk of having a disease or disorder disclosed herein.

In some embodiments, the intracellular Calcium signaling inhibitor is delivered to achieve a tissue level concentration that is equal to, about, or greater than the in vitro $IC_{50}$ value determined for the compound. In some embodiments the Calcium signaling inhibitor is delivered to achieve a tissue level concentration that is 1.5×, 2×, 3×, 4×, 5×, 6×, 7×, 8×, 9×, 10×, 11×, 12×, 13×, 14×, 15×, 16×, 17×, 18×, 19×, 20×, 21×, 22×, 23×, 24×, 25×, 26×, 27×, 28×, 29×, 30×, 31×, 32×, 33×, 34×, 35×, 36×, 37×, 38×, 39×, 40×, 41×, 42×, 43×, 44×, 45×, 46×, 47×, 48×, 49×, 50×, 51×, 52×, 53×, 54×, 55×, 56×, 57×, 58×, 59×, 60×, 61×, 62×, 63×, 64×, 65×, 66×, 67×, 68×, 69×, 70×, 71×, 72×, 73×, 74×, 75×, 76×, 77×, 78×, 79×, 80×, 81×, 82×, 83×, 84×, 85×, 86×, 87×, 88×, 89×, 90×, 91×, 92×, 93×, 94×, 95×, 96×, 97×, 98×, 99×, 100×, or any non-integer multiple ranging from 1× to 100× of the in vitro $IC_{50}$ value determined for the compound.

In some embodiments the Calcium signaling inhibitor is delivered to achieve a tissue level concentration that ranges from 1× to 100×, 2× to 80×, 3× to 60×, 4× to 50×, 5× to 45×, 6× to 44×, 7× to 43×, 8× to 43×, 9× to 41×, or 10× to 40×, or any non-integer within said range, of the in vitro $IC_{50}$ value determined for the compound.

In some embodiments the Calcium signaling inhibitor is delivered to achieve a tissue level concentration that is 1 μM, 2 μM, 3 μM, 4 μM, 5 μM, 6 μM, 7 μM, 8 μM, 9 μM, 10 μM, 11 μM, 12 μM, 13 μM, 14 μM, 15 μM, 16 μM, 17 μM, 18 μM, 19 μM, 20 μM, 21 μM, 22 μM, 23 μM, 24 μM, 25 μM, 26 μM, 27 μM, 28 μM, 29 μM, 30 μM, 31 μM, 32 μM, 33 μM, 34 μM, 35 μM, 36 μM, 37 μM, 38 μM, 39 μM, 40 μM, 41 μM, 42 μM, 43 μM, 44 μM, 45 μM, 46 μM, 47 μM, 48 μM, 49 μM, 50 μM, 51 μM, 52 μM, 53 μM, 54 μM, 55 μM, 56 μM, 57 μM, 58 μM, 59 μM, 60 μM, 61 μM, 62 μM, 63 μM, 64 μM, 65 μM, 66 μM, 67 μM, 68 μM, 69 μM, 70 μM, 71 μM, 72 μM, 73 μM, 74 μM, 75 μM, 76 μM, 77 μM, 78 μM, 79 μM, 80 μM, 81 μM, 82 μM, 83 μM, 84 μM, 85 μM, 86 μM, 87 μM, 88 μM, 89 μM, 90 μM, 91 μM, 92 μM, 93 μM, 94 μM, 95 μM, 96 μM, 97 μM, 98 μM, 99 μM, 100 μM, or any non-integer multiple ranging from about 1 μM to about 100 μM.

In some embodiments the Calcium signaling inhibitor is delivered to achieve a tissue level concentration that ranges from 1 μM to 100 μM, 2 μM to 90 μM, 3 μM to 80 μM, 4 μM to 70 μM, 5 μM to 60 μM, 6 μM to 50 μM, 7 μM to 40 μM, 8 μM to 30 μM, 9 μM to 20 μM, or 10 μM to 40 μM, or any integer or non-integer within said range.

In some embodiments the Calcium signaling inhibitor is delivered to achieve a tissue level concentration that ranges from 9.5 μM to 10.5 μM, 9 μM to 11 μM, 8 μM to 12 μM, 7 μM to 13 μM, 5 μM to 15 μM, 2 μM to 20 μM or 1 μM to 50 μM, or any integer or non-integer within said range.

In one embodiment is a method for treating a patient having cytokine storm syndrome comprising administering to the patient in need a therapeutically effective amount of N-(5-(6-Chloro-2,2-difluorobenzo[d][1,3]dioxol-5-yl)pyrazin-2-yl)-2-fluoro-6-methylbenzamide. In another embodiment, the patient is administered N-(5-(6-Chloro-2,2-difluorobenzo[d][1,3]dioxol-5-yl)pyrazin-2-yl)-2-fluoro-6-methylbenzamide via intravenously.

In a further embodiment is a method for inhibiting the release of multiple key cytokines comprising administering to the patient a therapeutically effective amount of N-(5-(6-Chloro-2,2-difluorobenzo[d][1,3]dioxol-5-yl)pyrazin-2-yl)-2-fluoro-6-methylbenzamide. In a further embodiment is a method for inhibiting release of IL-2, IL-6, IL-17, and/or TNFα comprising administering an effective amount of N-(5-(6-Chloro-2,2-difluorobenzo[d][1,3]dioxol-5-yl)pyrazin-2-yl)-2-fluoro-6-methylbenzamide. In yet another embodiment is a method of inhibiting excessive or uncontrolled release of proinflammatory cytokines comprising administering an effective amount of N-(5-(6-Chloro-2,2-difluorobenzo[d][1,3]dioxol-5-yl)pyrazin-2-yl)-2-fluoro-6-methylbenzamide.

N-(5-(6-Chloro-2,2-difluorobenzo[d][1,3]dioxol-5-yl)pyrazin-2-yl)-2-fluoro-6-methylbenzamide (Compound 1) is an example of a composition described herein, and inhibits calcium release-activated calcium (CRAC) channels. A pharmaceutical composition comprising Compound 1 has been demonstrated to be safe and potentially efficacious in critically ill patients with acute pancreatitis. Its rapid onset may be beneficial for acute settings. It may prevent the development of ARDS in patients with severe COVID-19 pneumonia and/or reduce the need for ventilators.

Compound 1 is a potent and selective small molecule inhibitor of CRAC channels. CRAC channels are found on many cell types, including immune cells, where aberrant activation of these channels may play a key role in the pathobiology of acute and chronic inflammatory syndromes.

Due to the fast-acting nature of Compound 1, it and other CRAC channel inhibitors may quickly lessen the cytokine storm associated with COVID-19 and may stabilize the pulmonary endothelial capillary barrier and prevent more serious lung injury. For patients infected with SARS-CoV-2, morbidity and mortality can arise from host immune responses. These responses can lead to cytokine storm, which in turn causes severe pneumonia and hypoxemic respiratory failure, ARDS, death or in the case of survivors, permanently compromised pulmonary function.

Some embodiments of the methods described herein include obtaining a baseline measurement from a subject. For example, in some embodiments, a baseline measurement is obtained from the subject prior to treating the subject. Examples of baseline measurements include a baseline protein measurement, a baseline mRNA measurement, a baseline lung inflammation measurement, a baseline lung myeloperoxidase activity (e.g., neutrophil infiltration) measurement, a baseline cytokine measurement (e.g. protein or mRNA levels of a cytokine such as TNFα, IL-2, IL-6, IL-17, IFN-α, IFN-β, IFN-ω, and IFN-γ), a baseline cytokine panel measurement, a baseline procalcitonin measurement, a baseline measurement of persistent systemic inflammatory response syndrome, a baseline procalcitonin measurement, a baseline endothelial cell $Ca^{21}$ flux measurement, a baseline lung injury measurement, a baseline endothelial lung dysfunction measurement, a baseline respiratory failure measurement (e.g. severity or duration), a baseline need for supplemental oxygen or ventilatory support, a baseline measurement of an amount or duration of supplemental oxygen or ventilatory support, a baseline lung fluid measurement, a baseline $PaO_2$ measurement, a baseline $FiO_2$ measurement, a baseline $PaO_2/FiO_2$ measurement, a baseline $SaO_2$ measurement, a baseline ordinal scale measurement, a baseline time to hospital discharge measurement, a baseline body temperature measurement, a baseline fever measurement, or a baseline heart rate measurement.

In some embodiments, the baseline measurement is obtained by performing an assay such as an immunoassay, a colorimetric assay, or a fluorescence assay, on the sample obtained from the subject. In some embodiments, the baseline measurement is obtained by an immunoassay, a colorimetric assay, or a fluorescence assay. In some embodiments, the baseline measurement is obtained by PCR. In some embodiments, the PCR comprises RT-qPCR or RT-qPCR. For example, quantitation or confirmation of viral particles such as SARS-Cov-2 nucleic acids may be obtained using an RT-PCR assay of a nasal swab, pharyngeal swab, or respiratory tract aspirate.

In some embodiments, the baseline measurement is obtained directly in or on the subject. In some embodiments, the baseline measurement is obtained with a nasal cannula. In some embodiments, the baseline measurement is obtained with pulse oximetry. In some embodiments, the baseline measurement is obtained with a thermometer. In some embodiments, the baseline measurement is obtained by making a visual inspection of the subject. In some embodiments, the baseline measurement is obtained with a medical imaging device.

Some embodiments of the methods described herein include obtaining a sample from a subject. In some embodiments, the baseline measurement is obtained from the subject prior to administration of a composition described herein. In some embodiments, the baseline measurement is obtained in a sample obtained from the subject. In some embodiments, the sample is obtained from the subject prior to administration or treatment of the subject with a composition described herein. In some embodiments, a baseline measurement is obtained in a sample obtained from the subject prior to administering the composition to the subject.

In some embodiments, the sample comprises a fluid. In some embodiments, the sample is a fluid sample. In some embodiments, the fluid sample is bronchoalveolar lavage fluid (BAL) sample. In some embodiments, the sample comprises a nasal sample. In some embodiments, the sample comprises a pharyngeal sample. In some embodiments, the sample comprises a swab (e.g., a nasal swab or a pharyngeal swab). In some embodiments, the sample comprises an aspirate. In some embodiments, the sample comprises a respiratory tract sample (e.g., a respiratory tract aspirate). In some embodiments, the sample comprises or consists of a blood, plasma, or serum sample. In some embodiments, the sample is a blood sample. In some embodiments, the sample is a plasma sample. In some embodiments, the sample is a serum sample. In some embodiments, the sample comprises a tissue. In some embodiments, the sample is a tissue sample. In some embodiments, the sample comprises or consists of lung tissue. In some embodiments, the sample comprises or consists of one or more lung cells. The lung cells may be epithelial cells or endothelial cells. In some embodiments, the sample comprises or consists of one or more endothelial cells such as pulmonary endothelial cells. In some embodiments, the sample comprises or consists of one or more epithelial cells such as alveolar epithelial cells.

In some embodiments, the composition or administration of the composition affects a measurement such as a protein measurement, a mRNA measurement, a lung inflammation measurement, a lung myeloperoxidase activity (e.g., neutrophil infiltration) measurement, a cytokine measurement (e.g. protein or mRNA levels of a cytokine such as TNFα, IL-6, IL-17, other cytokines), a cytokine panel measurement, a procalcitonin measurement, a measurement of persistent systemic inflammatory response syndrome, a procalcitonin measurement, a endothelial cell Ca2+ flux measurement, a lung injury measurement, a endothelial lung dysfunction measurement, a respiratory failure measurement (e.g. severity or duration), a need for supplemental oxygen or ventilatory support, a measurement of an amount or duration of supplemental oxygen or ventilatory support, a lung fluid measurement, a $PaO_2$ measurement, a $FiO_2$ measurement, a $PaO_2/FiO_2$ measurement, a $SaO_2$ measurement, a time to hospital discharge measurement, an ordinal scale measurement, a body temperature measurement, a fever measurement, or a heart rate measurement. In some embodiments, the composition improves the measurement relative to the baseline measurement. In some embodiments, another measure is improved, such as a symptom or marker associated with the disorder (for example, as discussed in the section on Acute lung injury (ALI) and its severe manifestation, acute respiratory distress syndrome (ARDS)s). In some embodiments, the composition reduces the measurement relative to the baseline measurement. In some embodiments, the composition increases the measurement relative to the baseline measurement.

Some embodiments of the methods described herein include obtaining the measurement from a subject. For example, the measurement may be obtained from the subject after treating the subject. In some embodiments, the CRAC inhibitor is administered to a subject at 0 hour (start of the first infusion of CRAC inhibitor) with an initial dose and a subsequent different dose may be administered at 24 hours and 48 hours after 0 hour. In some embodiments, the subsequence does of the CRAC inhibitor may be administered 72 hours after 0 hour. In some embodiments, the measurement is obtained in samples collected at aforementioned 24 hours. In some embodiments, the measurement is obtained in samples collected at aforementioned 48 hours. In some embodiments, the measurement is obtained in samples collected at aforementioned 72 hours. In some embodiments, the measurement is obtained in a second sample described herein (such as a blood, plasma, serum, or lung sample) obtained from the subject after the composition is administered to the subject. In some embodiments, the measurement is an indication that the disorder has been treated. In some embodiments, the measurement is obtained directly from the subject. In some embodiments, the measurement is obtained noninvasively, such as by using an imaging device.

In some embodiments, following administration of the composition (e.g. an intracellular Calcium signaling inhibitor, or a CRAC inhibitor), the subject has an improvement (e.g. an increase in numerical value) in an ordinal scale comprising an ordinal pneumonia scale such as the following: 1. Death 2. Hospitalized, on invasive mechanical ventilation or ECMO 3. Hospitalized, on non-invasive ventilation or high flow oxygen devices 4. Hospitalized, requiring low flow supplemental oxygen 5. Hospitalized, not requiring supplemental oxygen—requiring ongoing medical care (coronavirus (e.g. COVID-19) related or otherwise) 6. Hospitalized, not requiring supplemental oxygen—no longer requires ongoing medical care (other than per protocol study drug administration) 7. Not hospitalized.

In some embodiments, administration of the composition (e.g. an intracellular Calcium signaling inhibitor, or a CRAC inhibitor) to a subject reduces a hospital time measurement for the subject. In some embodiments, the hospital time measurement is an amount of time in a hospital. In some embodiments, the hospital time measurement is a time to hospital discharge measurement. In some embodiments, administration of the composition reduces the number of hospitalizations.

In some embodiments, administration of the composition (e.g. an intracellular Calcium signaling inhibitor, or a CRAC inhibitor) to a subject improves a partial pressure of oxygen ($PaO_2$) value in the subject. For example, the $PaO_2$ value may be increased by the administration of the composition. In some embodiments, administration of the composition to a subject improves a partial pressure of oxygen to fraction of inspired oxygen ratio ($PaO_2/FiO_2$) in the subject. For example, the $PaO_2/FiO_2$ may be increased by the administration of the composition.

In some embodiments, administration of the composition to a subject prevents, reduces or eliminates a need for supplemental oxygen or ventilatory support for the subject. In some embodiments, administration of the composition prevents a need for supplemental oxygen support. In some embodiments, administration of the composition reduces a need for supplemental oxygen support. In some embodiments, administration of the composition eliminates a need for supplemental oxygen support. In some embodiments, administration of the composition prevents a need for supplemental ventilatory support. In some embodiments, administration of the composition reduces a need for supplemental ventilatory support. In some embodiments, administration of the composition eliminates a need for supplemental ventilatory support. In some embodiments, administration of the composition reduces an amount of supplemental oxygen support. In some embodiments, administration of the composition reduces a duration of supplemental oxygen support. In some embodiments, administration of the composition reduces an amount of supplemental ventilatory support. In some embodiments, administration of the composition reduces a duration of supplemental ventilatory support.

Disclosed herein, in some embodiments are methods of treatment that may include administration of a compound disclosed herein to a subject. Some embodiments further comprise administering a respiratory treatment to the subject. In some embodiments, the respiratory treatment comprises respiratory assistance. In some embodiments, the respiratory assistance comprises intubation such as endotracheal intubation, ventilation such as mechanical ventilation or noninvasive ventilation, or oxygen support. In some embodiments, the subject has already been administered a respiratory treatment such as a respiratory assistance prior to administration of the composition, or prior to initiation of a treatment with the composition. In some embodiments, the respiratory treatment and the composition are administered concurrently. In some embodiments, the respiratory treatment and the treatment with the composition overlap.

In some embodiments, the Calcium channel inhibitor (e.g., Auxora) is administered at a dosage of about 0.5 mg/kg, 1.0 mg/kg, 1.5 mg/kg, 2 mg/kg, 5 mg/kg, 10 mg/kg, 15 mg/kg, 20 mg/kg, 25 mg/kg, 30 mg/kg, 35 mg/kg, 40 mg/kg, 45 mg/kg, 50 mg/kg, 55 mg/kg, 60 mg/kg, 65 mg/kg, 70 mg/kg, 75 mg/kg, 80 mg/kg, 85 mg/kg, 90 mg/kg, 95 mg/kg, 100 mg/kg, 125 mg/kg, 150 mg/kg, 175 mg/kg, 200 mg/kg, 225 mg/kg, 250 mg/kg, or any numbers between any two forgoing values.

Combination Administration with a Compound for Treating ALI/ARDS

Disclosed herein are compositions and administration regimens for the combinatorial administration of a Calcium channel inhibitor and a at least a compound for treating ALI or ARDS. In some embodiments an administration regimen comprises administration to a subject of a compound for treating ALI or ARDS, and administration of an intracellular Calcium signaling inhibitor.

In some embodiments the compound is selected from the list consisting of a prostaglandin inhibitor, complement inhibitor, β-agonist, beta-2 agonist, granulocyte macrophage colony-stimulating factor, corticosteroid, N-acetylcysteine, statin, glucagon-like peptide-1 (7-36) amide (GLP-1), triggering receptor expressed on myeloid cells (TREM1) blocking peptide, 17-allylamino-17-demethoxygeldanamycin (17-AAG), antibody to tumor necrosis factor (TNF), recombinant interleukin (IL)-1 receptor antagonist, cisatracurium besilate, and Angiotensin-Converting Enzyme (ACE) Inhibitor. In some embodiments, the compound includes an antiviral compound. In some embodiments, the antiviral compound is an anti-coronavirus compound. In some embodiments, the anti-coronavirus compound comprises remdesivir. Examples of antiviral compounds include antiretroviral compounds, protease inhibitors, nucleoside reverse transcriptase inhibitors, reverse transcriptase inhibitors, integrase inhibitors, entry inhibitors, maturation inhibitors, anti-influenza compounds, peramivir, zanamivir, oseltamivir, baloxavir marboxil, and pharmaceutically acceptable salts thereof. In some embodiments, the compound comprises an antibiotic. In some embodiments, the compound comprises an anti-malarial drug.

In some embodiments, the compound comprises hydroxychloroquine. In some embodiments, the compound comprises chloroquine.

In some embodiments the intracellular Calcium signaling inhibitor is an SOC inhibitor. In some embodiments the intracellular Calcium signaling inhibitor is a CRAC inhibitor. An exemplary CRAC inhibitor comprises N-(5-(6-Chloro-2,2-difluorobenzo[d][1,3]dioxol-5-yl)pyrazin-2-yl)-2-fluoro-6-methylbenzamide, having a structure of

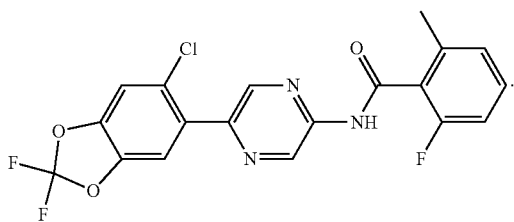 [SMILES: Cc1cccc(F)c1C(=O)Nc1cnc(-c2cc3c(cc2Cl)OC(F)(F)O3)cn1]

An exemplary CRAC inhibitor comprises GSK-7975A. An exemplary CRAC inhibitor comprises BTP2. An exemplary CRAC inhibitor comprises 2,6-Difluoro-N-(1-(4-hydroxy-2-(trifluoromethyl)benzyl)-1H-pyrazol-3-yl)benzamide.

In some embodiments the administration regimen comprises administration of a calcium channel inhibitor such as a CRAC inhibitor such as at least one of N-(5-(6-Chloro-2,2-difluorobenzo[d][1,3]dioxol-5-yl)pyrazin-2-yl)-2-fluoro-6-methylbenzamide and BTP2, and a compound for treating ALI/ARDS. In some embodiments the calcium channel inhibitor such as a CRAC inhibitor such as at least one of N-(5-(6-Chloro-2,2-difluorobenzo[d][1,3]dioxol-5-yl) pyrazin-2-yl)-2-fluoro-6-methylbenzamide and BTP2 is administered on the same day as a compound for treating ALI/ARDS on lung activities. In some embodiments the calcium channel inhibitor such as a CRAC inhibitor such as at least one of N-(5-(6-Chloro-2,2-difluorobenzo[d][1,3]dioxol-5-yl)pyrazin-2-yl)-2-fluoro-6-methylbenzamide and BTP2 is administered on the same week as a compound for treating ALI/ARDS. In some embodiments the calcium channel inhibitor such as a CRAC inhibitor such as at least one of N-(5-(6-Chloro-2,2-difluorobenzo[d][1,3]dioxol-5-yl)pyrazin-2-yl)-2-fluoro-6-methylbenzamide and BTP2 is administered concurrently with each administration of a compound for treating ALI/ARDS. In some embodiments the calcium channel inhibitor such as a CRAC inhibitor such as at least one of N-(5-(6-Chloro-2,2-difluorobenzo[d][1,3]dioxol-5-yl)pyrazin-2-yl)-2-fluoro-6-methylbenzamide and BTP2 is administered on an administration regimen pattern that is independent of the administration pattern for a compound for treating ALI/ARDS. In some embodiments the calcium channel inhibitor such as a CRAC inhibitor such as at least one of N-(5-(6-Chloro-2,2-difluorobenzo[d][1,3]dioxol-5-yl)pyrazin-2-yl)-2-fluoro-6-methylbenzamide and BTP2 is administered through the same route of delivery, such as orally or intravenously, as a compound for treating ALI/ARDS. In some embodiments the calcium channel inhibitor such as a CRAC inhibitor such as at least one of N-(5-(6-Chloro-2,2-difluorobenzo[d][1,3]dioxol-5-yl) pyrazin-2-yl)-2-fluoro-6-methylbenzamide and BTP2 is administered through a separate route of delivery compared to a compound for treating ALI/ARDS. In some embodiments the calcium channel inhibitor such as a CRAC inhibitor such as at least one of N-(5-(6-Chloro-2,2-difluorobenzo[d][1,3]dioxol-5-yl)pyrazin-2-yl)-2-fluoro-6-methylbenzamide and BTP2 is administered to a person receiving a compound for treating ALI/ARDS only after said person shows at least one sign of an impact of said drug on lung activity. In some embodiments the calcium channel inhibitor such as a CRAC inhibitor such as at least one of N-(5-(6-Chloro-2,2-difluorobenzo[d][1,3]dioxol-5-yl) pyrazin-2-yl)-2-fluoro-6-methylbenzamide and BTP2 is administered to a person receiving a compound for treating ALI/ARDS in the absence of any evidence in or from said person related to any sign of an impact of said compound on lung activity.

In some embodiments the calcium channel inhibitor such as a CRAC inhibitor such as at least one of N-(5-(6-Chloro-2,2-difluorobenzo[d][1,3]dioxol-5-yl)pyrazin-2-yl)-2-fluoro-6-methylbenzamide and BTP2 is administered in a single composition with a compound for treating ALI/ARDS. Accordingly, some embodiments disclosed herein relate to a composition comprising an intracellular Calcium signaling inhibitor and at least one compound for treating ALI/ARDS. In some embodiments the at least one drug selected from the list consisting of: a prostaglandin inhibitor, complement inhibitor, β-agonist, beta-2 agonist, granulocyte macrophage colony-stimulating factor, corticosteroid, N-acetylcysteine, statin, glucagon-like peptide-1 (7-36) amide (GLP-1), triggering receptor expressed on myeloid cells (TREM1) blocking peptide, 17-allylamino-17-demethoxygeldanamycin (17-AAG), antibody to tumor necrosis factor (TNF), recombinant interleukin (IL)-1 receptor antagonist, cisatracurium besilate, and Angiotensin-Converting Enzyme (ACE) Inhibitor.

In some embodiments, the intracellular Calcium signaling inhibitor is delivered to achieve a tissue level concentration that is equal to, about, or greater than the in vitro $IC_{50}$ value determined for the compound. In some embodiments the Calcium signaling inhibitor is delivered to achieve a tissue level concentration that is 1.5×, 2×, 3×, 4×, 5×, 6×, 7×, 8×, 9×, 10×, 11×, 12×, 13×, 14×, 15×, 16×, 17×, 18×, 19×, 20×, 21×, 22×, 23×, 24×, 25×, 26×, 27×, 28×, 29×, 30×, 31×, 32×, 33×, 34×, 35×, 36×, 37×, 38×, 39×, 40×, 41×, 42×, 43×, 44×, 45×, 46×, 47×, 48×, 49×, 50×, 51×, 52×, 53×, 54×, 55×, 56×, 57×, 58×, 59×, 60×, 61×, 62×, 63×, 64×, 65×, 66×, 67×, 68×, 69×, 70×, 71×, 72×, 73×, 74×, 75×, 76×, 77×, 78×, 79×, 80×, 81×, 82×, 83×, 84×, 85×, 86×, 87×, 88×, 89×, 90×, 91×, 92×, 93×, 94×, 95×, 96×, 97×, 98×, 99×, 100×, or any non-integer multiple ranging from 1× to 100× of the in vitro $IC_{50}$ value determined for the compound.

In some embodiments the Calcium signaling inhibitor is delivered to achieve a tissue level concentration that ranges from 1× to 100×, 2× to 80×, 3× to 60×, 4× to 50×, 5× to 45×, 6× to 44×, 7× to 43×, 8× to 43×, 9× to 41×, or 10× to 40×, or any non-integer within said range, of the in vitro $IC_{50}$ value determined for the compound.

In some embodiments the Calcium signaling inhibitor is delivered to achieve a tissue level concentration that is 1 μM, 2 μM, 3 μM, 4 μM, 5 μM, 6 μM, 7 μM, 8 μM, 9 μM, 10 μM, 11 μM, 12 μM, 13 μM, 14 μM, 15 μM, 16 μM, 17 μM, 18 μM, 19 μM, 20 μM, 21 μM, 22 μM, 23 μM, 24 μM, 25 μM, 26 μM, 27 μM, 28 μM, 29 μM, 30 μM, 31 μM, 32 μM, 33 μM, 34 μM, 35 μM, 36 μM, 37 μM, 38 μM, 39 μM, 40 μM, 41 μM, 42 μM, 43 μM, 44 μM, 45 μM, 46 μM, 47 μM, 48 μM, 49 μM, 50 μM, 51 μM, 52 μM, 53 μM, 54 μM, 55 μM, 56 μM, 57 μM, 58 μM, 59 μM, 60 μM, 61 μM, 62 μM, 63 μM, 64 μM, 65 μM, 66 μM, 67 μM, 68 μM, 69 μM, 70 μM, 71 μM, 72 μM, 73 μM, 74 μM, 75 μM, 76 μM, 77 μM, 78 μM, 79 μM, 80 μM, 81 μM, 82 μM, 83 μM, 84 μM, 85 μM, 86 μM, 87 μM, 88 μM, 89 μM, 90 μM, 91 μM, 92 μM, 93 μM, 94 μM, 95 μM, 96 μM, 97 μM, 98 μM, 99 μM, 100 μM, or any non-integer multiple ranging from about 1 μM to about 100 μM.

In some embodiments the Calcium signaling inhibitor is delivered to achieve a tissue level concentration that ranges from 1 μM to 100 μM, 2 μM to 90 μM, 3 μM to 80 μM, 4 μM to 70 μM, 5 μM to 60 μM, 6 μM to 50 μM, 7 μM to 40 μM, 8 μM to 30 μM, 9 μM to 20 μM, or 10 μM to 40 μM, or any integer or non-integer within said range.

In some embodiments the Calcium signaling inhibitor is delivered to achieve a tissue level concentration that ranges from 9.5 μM to 10.5 μM, 9 μM to 11 μM, 8 μM to 12 μM, 7 µM to 13 µM, 5 µM to 15 µM, 2 µM to 20 µM or 1 µM to 50 µM, or any integer or non-integer within said range.

Pharmaceutical Compositions

Provided herein can be pharmaceutical compositions comprising at least one of the Calcium signaling inhibitors described herein. In some cases, the pharmaceutical compositions comprise at least one of the Calcium signaling inhibitors and at least one of the compounds for treating ALI and/or ARDS disclosed herein.

Pharmaceutical compositions provided herein can be introduced as oral forms, transdermal forms, oil formulations, edible foods, food substrates, aqueous dispersions, emulsions, injectable emulsions, solutions, suspensions, elixirs, gels, syrups, aerosols, mists, powders, capsule, tablets, nanoparticles, nanoparticle suspensions, nanoparticle emulsions, lozenges, lotions, pastes, formulated sticks, balms, creams, and/or ointments.

In some embodiments, the pharmaceutical composition additionally comprises at least one of an excipient, a solubilizer, a surfactant, a disintegrant, and a buffer. In some embodiments, the pharmaceutical composition is free of pharmaceutically acceptable excipients. The term "pharmaceutically acceptable excipient", as used herein, means one or more compatible solid or encapsulating substances, which are suitable for administration to a subject. The term "compatible", as used herein, means that the components of the composition are capable of being commingled with the subject compound, and with each other, in a manner such that there is no interaction, which would substantially reduce the pharmaceutical efficacy of the composition under ordinary use situations. In some embodiments, the pharmaceutically acceptable excipient is of sufficiently high purity and sufficiently low toxicity to render them suitable for administration preferably to an animal, preferably mammal, being treated.

Some examples of substances, which can serve as pharmaceutically acceptable excipients include: amino acids such as alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine. In some embodiments, the amino acid is arginine. In some embodiments, the amino acid is L-arginine; monosaccharides such as glucose (dextrose), arabinose, mannitol, fructose (levulose), and galactose; cellulose and its derivatives such as sodium carboxymethyl cellulose, ethyl cellulose, and methyl cellulose; solid lubricants such as talc, stearic acid, magnesium stearate and sodium stearyl fumarate; polyols such as propylene glycol, glycerin, sorbitol, mannitol, and polyethylene glycol; emulsifiers such as the polysorbates; wetting agents such as sodium lauryl sulfate, Tween®, Span, alkyl sulphates, and alkyl ethoxylate sulphates; cationic surfactants such as cetrimide, benzalkonium chloride, and cetylpyridinium chloride; diluents such as calcium carbonate, microcrystalline cellulose, calcium phosphate, starch, pregelatinized starch, sodium carbonate, mannitol, and lactose; binders such as starches (corn starch and potato starch), gelatin, sucrose hydroxypropyl cellulose (HPC), polyvinylpyrrolidone (PVP), and hydroxypropyl methyl cellulose (HPMC); disintegrants such as starch, and alginic acid; super-disintegrants such as ac-di-sol, croscarmellose sodium, sodium starch glycolate and crospovidone.

Glidants such as silicon dioxide; coloring agents such as the FD&C dyes; sweeteners and flavoring agents, such as aspartame, saccharin, menthol, peppermint, and fruit flavors; preservatives such as benzalkonium chloride, PHMB, chlorobutanol, thimerosal, phenylmercuric, acetate, phenylmercuric nitrate, parabens, and sodium benzoate; tonicity adjustors such as sodium chloride, potassium chloride, mannitol, and glycerin; antioxidants such as sodium bisulfite, acetone sodium bisulfite, sodium formaldehyde, sulfoxylate, thiourea, and EDTA; pH adjuster such as NaOH, sodium carbonate, sodium acetate, HCl, and citric acid; cryoprotectants such as sodium or potassium phosphates, citric acid, tartaric acid, gelatin, and carbohydrates such as dextrose, mannitol, and dextran; surfactants such as sodium lauryl sulfate. For example, cationic surfactants such as cetrimide (including tetradecyl trimethyl ammonium bromide with dodecyl and hexadecyl compounds), benzalkonium chloride, and cetylpyridinium chloride. Some examples of anionic surfactants are alkylsulphates, alkylethoxylate sulphates, soaps, carxylate ions, sulfate ions, and sulfonate ions. Some examples of non-ionic surfactants are polyoxyethylene derivatives, polyoxypropylene derivatives, polyol derivatives, polyol esters, polyoxyethylene esters, poloxamers, glocol, glycerol esters, sorbitan derivatives, polyethylene glycol (such as PEG-40, PEG-50, or PEG-55) and esters of fatty alcohols; organic materials such as carbohydrates, modified carbohydrates, lactose (including a-lactose, monohydrate spray dried lactose or anhydrous lactose), starch, pregelatinized starch, sucrose, mannitol, sorbital, cellulose (including powdered cellulose and microcrystalline cellulose); inorganic materials such as calcium phosphates (including anhydrous dibasic calcium phosphate, dibasic calcium phosphate or tribasic calcium phosphate); co-processed diluents; compression aids; anti-tacking agents such as silicon dioxide and talc.

In some embodiments, the pharmaceutical compositions described herein are provided in unit dosage form. As used herein, a "unit dosage form" is a composition containing an amount of the at least one of the Calcium signaling inhibitors and/or the at least one of the compounds for treating ALI and/or ARDS that is suitable for administration to a subject in a single dose, according to good medical practice. The preparation of a single or unit dosage form however, does not imply that the dosage form is administered once per day or once per course of therapy. Such dosage forms are contemplated to be administered once, twice, thrice or more per day and may be administered as infusion over a period of time (e.g., from about 30 minutes to about 2-6 hours), or administered as a continuous infusion, and may be given more than once during a course of therapy, though a single administration is not specifically excluded.

Certain Terminology

Unless defined otherwise, all technical and scientific terms used herein have the same meaning as is commonly understood to which the claimed subject matter pertains. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/ or" unless stated otherwise. Furthermore, use of the term "including" as well as other forms, such as "include", "includes," and "included," is not limiting.

The section headings used herein are for organizational purposes only and are not to be construed as limiting the subject matter described.

Definition of standard chemistry terms may be found in reference works, including but not limited to, Carey and Sundberg "Advanced Organic Chemistry 4th Ed." Vols. A (2000) and B (2001), Plenum Press, New York. Unless otherwise indicated, conventional methods of mass spectroscopy, NMR, HPLC, protein chemistry, biochemistry, recombinant DNA techniques and pharmacology.

Unless specific definitions are provided, the nomenclature employed in connection with, and the laboratory procedures and techniques of, analytical chemistry, synthetic organic chemistry, and medicinal and pharmaceutical chemistry described herein are those recognized in the field. Standard techniques can be used for chemical syntheses, chemical analyses, pharmaceutical preparation, formulation, and delivery, and treatment of patients. Standard techniques can be used for recombinant DNA, oligonucleotide synthesis, and tissue culture and transformation (e.g., electroporation, lipofection). Reactions and purification techniques can be performed e.g., using kits of manufacturer's specifications or as commonly accomplished in the art or as described herein. The foregoing techniques and procedures can be generally performed of conventional methods and as described in various general and more specific references that are cited and discussed throughout the present specification.

It is to be understood that the methods and compositions described herein are not limited to the particular methodology, protocols, cell lines, constructs, and reagents described herein and as such may vary. It is also to be understood that the terminology used herein is for the purpose of describing particular embodiments only, and is not intended to limit the scope of the methods, compounds, compositions described herein.

The terms "kit" and "article of manufacture" are used as synonyms.

The term "subject" or "patient" encompasses mammals and non-mammals. Examples of mammals include, but are not limited to, any member of the Mammalian class: humans, non-human primates such as chimpanzees, and other apes and monkey species; farm animals such as cattle, horses, sheep, goats, swine; domestic animals such as rabbits, dogs, and cats; laboratory animals including rodents, such as rats, mice and guinea pigs, and the like. Examples of non-mammals include, but are not limited to, birds, fish and the like. In one embodiment of the methods and compositions provided herein, the mammal is a human.

The terms "treat," "treating" or "treatment," as used herein, include alleviating, abating or ameliorating a disease or condition symptoms, preventing additional symptoms, ameliorating or preventing the underlying causes of symptoms, inhibiting the disease or condition, e.g., arresting the development of the disease or condition, relieving the disease or condition, causing regression of the disease or condition, relieving a condition caused by the disease or condition, or stopping the symptoms of the disease or condition either prophylactically and/or therapeutically. As used herein, the term "target protein" refers to a protein or a portion of a protein capable of being bound by, or interacting with a compound described herein, such as a compound with a structure from the group of Compound A.

In certain embodiments, a target protein is a STIM protein. In certain embodiments, a target protein is an Orai protein.

As used herein, "STIM protein" includes but is not limited to, mammalian STIM-1, such as human and rodent (e.g., mouse) STIM-1, *Drosophila melanogaster* D-STIM, *C. elegans* C-STIM, *Anopheles gambiae* STIM and mammalian STIM-2, such as human and rodent (e.g., mouse) STIM-2. (see paragraphs [0211] through [0270] of US 2007/0031814, as well as Table 3 of US 2007/0031814, herein incorporated by reference) As described herein, such proteins have been identified as being involved in, participating in and/or providing for store-operated calcium entry or modulation thereof, cytoplasmic calcium buffering and/or modulation of calcium levels in or movement of calcium into, within or out of intracellular calcium stores (e.g., endoplasmic reticulum).

As used herein, an "Orai protein" includes Orai1 (SEQ ID NO: 1 as described in WO 07/081804), Orai2 (SEQ ID NO: 2 as described in WO 07/081804), or Orai3 (SEQ ID NO: 3 as described in WO 07/081804). Orai1 nucleic acid sequence corresponds to GenBank accession number NM_032790, Orai2 nucleic acid sequence corresponds to GenBank accession number BC069270 and Orai3 nucleic acid sequence corresponds to GenBank accession number NM_152288. As used herein, Orai refers to any one of the Orai genes, e.g., Orai1, Orai2, Orai3 (see Table I of WO 07/081804). As described herein, such proteins have been identified as being involved in, participating in and/or providing for store-operated calcium entry or modulation thereof, cytoplasmic calcium buffering and/or modulation of calcium levels in or movement of calcium into, within or out of intracellular calcium stores (e.g., endoplasmic reticulum).

The term "fragment" or "derivative" when referring to a protein (e.g. STIM, Orai) means proteins or polypeptides which retain essentially the same biological function or activity in at least one assay as the native protein(s). For example, the fragments or derivatives of the referenced protein maintains at least about 50% of the activity of the native proteins, at least 75%, at least about 95% of the activity of the native proteins, as determined e.g. by a calcium influx assay.

As used herein, amelioration of the symptoms of a particular disease, disorder or condition by administration of a particular compound or pharmaceutical composition refers to any lessening of severity, delay in onset, slowing of progression, or shortening of duration, whether permanent or temporary, lasting or transient that can be attributed to or associated with administration of the compound or composition.

The term "modulate," as used herein, means to interact with a target protein either directly or indirectly so as to alter the activity of the target protein, including, by way of example only, to inhibit the activity of the target, or to limit or reduce the activity of the target.

As used herein, the term "modulator" refers to a compound that alters an activity of a target. For example, a modulator can cause an increase or decrease in the magnitude of a certain activity of a target compared to the magnitude of the activity in the absence of the modulator. In certain embodiments, a modulator is an inhibitor, which decreases the magnitude of one or more activities of a target. In certain embodiments, an inhibitor completely prevents one or more activities of a target.

As used herein, "modulation" with reference to intracellular calcium refers to any alteration or adjustment in intracellular calcium including but not limited to alteration of calcium concentration in the cytoplasm and/or intracellular calcium storage organelles, e.g., endoplasmic reticulum, and alteration of the kinetics of calcium fluxes into, out of and within cells. In aspect, modulation refers to reduction.

As used herein, the term "target activity" refers to a biological activity capable of being modulated by a modulator. Certain exemplary target activities include, but are not limited to, binding affinity, signal transduction, enzymatic activity, tumor growth, inflammation or inflammation-related processes, and amelioration of one or more symptoms associated with a disease or condition.

The terms "inhibits", "inhibiting", or "inhibitor" of SOC channel activity or CRAC channel activity, as used herein, refer to inhibition of store operated calcium channel activity or calcium release activated calcium channel activity.

The term "acceptable" with respect to a formulation, composition or ingredient, as used herein, means having no persistent detrimental effect on the general health of the subject being treated.

The term "pharmaceutically acceptable," as used herein, refers a material, such as a carrier, diluent, or formulation, which does not abrogate the biological activity or properties of the compound, and is relatively nontoxic, i.e., the material may be administered to an individual without causing undesirable biological effects or interacting in a deleterious manner with any of the components of the composition in which it is contained.

The term "pharmaceutical combination" as used herein, means a product that results from the mixing or combining of more than one active ingredient and includes both fixed and non-fixed combinations of the active ingredients. The term "fixed combination" means that one active ingredient, e.g. a compound with a structure from the group of Compound A and a co-agent, are administered to a patient as separate entities either simultaneously, concurrently or sequentially with no specific intervening time limits, wherein such administration provides effective levels of the two compounds in the body of the patient. The latter also applies to cocktail therapy, e.g. the administration of three or more active ingredients.

The term "pharmaceutical composition" refers to a mixture of a compound with a structure from the group of Compound A, described herein with other chemical components, such as carriers, stabilizers, diluents, surfactants, dispersing agents, suspending agents, thickening agents, and/or excipients. The pharmaceutical composition facilitates administration of the compound to an organism. Multiple techniques of administering a compound exist in the art including, but not limited to: intravenous, oral, aerosol, parenteral, ophthalmic, subcutaneous, intramuscular, pulmonary and topical administration.

The terms "effective amount" or "therapeutically effective amount," as used herein, refer to a sufficient amount of an agent or a compound being administered which will relieve to some extent one or more of the symptoms of the disease or condition being treated. The result can be reduction and/or alleviation of the signs, symptoms, or causes of a disease, or any other desired alteration of a biological system. For example, an "effective amount" for therapeutic uses is the amount of the composition that includes a compound with a structure from the group of Compound A, required to provide a clinically significant decrease in disease symptoms. An appropriate "effective" amount in any individual case may be determined using techniques, such as a dose escalation study.

The terms "enhance" or "enhancing," as used herein, means to increase or prolong either in potency or duration a desired effect. Thus, in regard to enhancing the effect of therapeutic agents, the term "enhancing" refers to the ability to increase or prolong, either in potency or duration, the effect of other therapeutic agents on a system. An "enhancing-effective amount," as used herein, refers to an amount adequate to enhance the effect of another therapeutic agent in a desired system.

The terms "co-administration" or the like, as used herein, are meant to encompass administration of the selected therapeutic agents to a single patient, and are intended to include treatment regimens in which the agents are administered by the same or different route of administration or at the same or different time.

The term "carrier," as used herein, refers to relatively nontoxic chemical compounds or agents that facilitate the incorporation of a compound into cells or tissues.

The term "diluent" refers to chemical compounds that are used to dilute the compound of interest prior to delivery. Diluents can also be used to stabilize compounds because they can provide a more stable environment. Salts dissolved in buffered solutions (which also can provide pH control or maintenance) are utilized as diluents in the art, including, but not limited to a phosphate buffered saline solution.

A "metabolite" of a compound disclosed herein is a derivative of that compound that is formed when the compound is metabolized. The term "active metabolite" refers to a biologically active derivative of a compound that is formed when the compound is metabolized. The term "metabolized," as used herein, refers to the sum of the processes (including, but not limited to, hydrolysis reactions and reactions catalyzed by enzymes) by which a particular substance is changed by an organism. Thus, enzymes may produce specific structural alterations to a compound. For example, cytochrome P450 catalyzes a variety of oxidative and reductive reactions while uridine diphosphate glucuronyltransferases catalyze the transfer of an activated glucuronic-acid molecule to aromatic alcohols, aliphatic alcohols, carboxylic acids, amines and free sulphydryl groups. Further information on metabolism may be obtained from The Pharmacological Basis of Therapeutics, 9th Edition, McGraw-Hill (1996). Metabolites of the compounds disclosed herein can be identified either by administration of compounds to a host and analysis of tissue samples from the host, or by incubation of compounds with hepatic cells in vitro and analysis of the resulting compounds.

"Bioavailability" refers to the percentage of the weight of the compound disclosed herein (e.g. a compound from the group of Compound A) that is delivered into the general circulation of the animal or human being studied. The total exposure (AUC(0-∞)) of a drug when administered intravenously is usually defined as 100% bioavailable (F %). "Oral bioavailability" refers to the extent to which a compound disclosed herein, is absorbed into the general circulation when the pharmaceutical composition is taken orally as compared to intravenous injection.

"Blood plasma concentration" refers to the concentration of a compound with a structure from the group of Compound A, in the plasma component of blood of a subject. It is understood that the plasma concentration of compounds described herein may vary significantly between subjects, due to variability with respect to metabolism and/or possible interactions with other therapeutic agents. In accordance with one embodiment disclosed herein, the blood plasma concentration of the compounds disclosed herein may vary from subject to subject. Likewise, values such as maximum plasma concentration (Cmax) or time to reach maximum plasma concentration (Tmax), or total area under the plasma concentration time curve (AUC(0-∞)) may vary from subject to subject. Due to this variability, the amount necessary to constitute "a therapeutically effective amount" of a compound may vary from subject to subject.

As used herein, "calcium homeostasis" refers to the maintenance of an overall balance in intracellular calcium levels and movements, including calcium signaling, within a cell.

As used herein, "intracellular calcium" refers to calcium located in a cell without specification of a particular cellular location. In contrast, "cytosolic" or "cytoplasmic" with reference to calcium refers to calcium located in the cell cytoplasm.

As used herein, an effect on intracellular calcium is any alteration of any aspect of intracellular calcium, including but not limited to, an alteration in intracellular calcium levels and location and movement of calcium into, out of or within a cell or intracellular calcium store or organelle. For example, an effect on intracellular calcium can be an alteration of the properties, such as, for example, the kinetics, sensitivities, rate, amplitude, and electrophysiological characteristics, of calcium flux or movement that occurs in a cell or portion thereof. An effect on intracellular calcium can be an alteration in any intracellular calcium-modulating process, including, store-operated calcium entry, cytosolic calcium buffering, and calcium levels in or movement of calcium into, out of or within an intracellular calcium store. Any of these aspects can be assessed in a variety of ways including, but not limited to, evaluation of calcium or other ion (particularly cation) levels, movement of calcium or other ion (particularly cation), fluctuations in calcium or other ion (particularly cation) levels, kinetics of calcium or other ion (particularly cation) fluxes and/or transport of calcium or other ion (particularly cation) through a membrane. An alteration can be any such change that is statistically significant. Thus, for example if intracellular calcium in a test cell and a control cell is said to differ, such difference can be a statistically significant difference.

As used herein, "involved in" with respect to the relationship between a protein and an aspect of intracellular calcium or intracellular calcium regulation means that when expression or activity of the protein in a cell is reduced, altered or eliminated, there is a concomitant or associated reduction, alteration or elimination of one or more aspects of intracellular calcium or intracellular calcium regulation. Such an alteration or reduction in expression or activity can occur by virtue of an alteration of expression of a gene encoding the protein or by altering the levels of the protein. A protein involved in an aspect of intracellular calcium, such as, for example, store-operated calcium entry, thus, can be one that provides for or participates in an aspect of intracellular calcium or intracellular calcium regulation. For example, a protein that provides for store-operated calcium entry can be a STIM protein and/or an Orai protein.

As used herein, a protein that is a component of a calcium channel is a protein that participates in multi-protein complex that forms the channel.

As used herein, "basal" or "resting" with reference to cytosolic calcium levels refers to the concentration of calcium in the cytoplasm of a cell, such as, for example, an unstimulated cell, that has not been subjected to a condition that results in movement of calcium into or out of the cell or within the cell. The basal or resting cytosolic calcium level can be the concentration of free calcium (i.e., calcium that is not bound to a cellular calcium-binding substance) in the cytoplasm of a cell, such as, for example, an unstimulated cell, that has not been subjected to a condition that results in movement of calcium into or out of the cell.

As used herein, "movement" with respect to ions, including cations, e.g., calcium, refers to movement or relocation, such as for example flux, of ions into, out of, or within a cell. Thus, movement of ions can be, for example, movement of ions from the extracellular medium into a cell, from within a cell to the extracellular medium, from within an intracellular organelle or storage site to the cytosol, from the cytosol into an intracellular organelle or storage site, from one intracellular organelle or storage site to another intracellular organelle or storage site, from the extracellular medium into an intracellular organelle or storage site, from an intracellular organelle or storage site to the extracellular medium and from one location to another within the cell cytoplasm.

As used herein, "cation entry" or "calcium entry" into a cell refers to entry of cations, such as calcium, into an intracellular location, such as the cytoplasm of a cell or into the lumen of an intracellular organelle or storage site. Thus, cation entry can be, for example, the movement of cations into the cell cytoplasm from the extracellular medium or from an intracellular organelle or storage site, or the movement of cations into an intracellular organelle or storage site from the cytoplasm or extracellular medium. Movement of calcium into the cytoplasm from an intracellular organelle or storage site is also referred to as "calcium release" from the organelle or storage site.

As used herein, "protein that modulates intracellular calcium" refers to any cellular protein that is involved in regulating, controlling and/or altering intracellular calcium. For example, such a protein can be involved in altering or adjusting intracellular calcium in a number of ways, including, but not limited to, through the maintenance of resting or basal cytoplasmic calcium levels, or through involvement in a cellular response to a signal that is transmitted in a cell through a mechanism that includes a deviation in intracellular calcium from resting or basal states. In the context of a "protein that modulates intracellular calcium," a "cellular" protein is one that is associated with a cell, such as, for example, a cytoplasmic protein, a plasma membrane-associated protein or an intracellular membrane protein. Proteins that modulate intracellular calcium include, but are not limited to, ion transport proteins, calcium-binding proteins and regulatory proteins that regulate ion transport proteins.

As used herein, "cell response" refers to any cellular response that results from ion movement into or out of a cell or within a cell. The cell response may be associated with any cellular activity that is dependent, at least in part, on ions such as, for example, calcium. Such activities may include, for example, cellular activation, gene expression, endocytosis, exocytosis, cellular trafficking and apoptotic cell death.

As used herein, "immune cells" include cells of the immune system and cells that perform a function or activity in an immune response, such as, but not limited to, T-cells, B-cells, lymphocytes, macrophages, dendritic cells, neutrophils, eosinophils, basophils, mast cells, plasma cells, white blood cells, antigen presenting cells and natural killer cells.

As used herein, "cytokine" refers to small soluble proteins secreted by cells that can alter the behavior or properties of the secreting cell or another cell. Cytokines bind to cytokine receptors and trigger a behavior or property within the cell, for example, cell proliferation, death or differentiation. Exemplary cytokines include, but are not limited to, interleukins (e.g., IL-2, IL-3, IL-4, IL-5, IL-6, IL-7, IL-8, IL-9, IL-10, IL-11, IL-12, IL-13, IL-15, IL-16, IL-17, IL-18, IL-1α, IL-1β, and IL-1 RA), granulocyte colony stimulating factor (G-CSF), granulocyte-macrophage colony stimulating factor (GM-CSF), oncostatin M, erythropoietin, leukemia inhibitory factor (LIF), interferons, B7.1 (also known as CD80), B7.2 (also known as B70, CD86), TNF family members (TNF-α, TNF-β, LT-β, CD40 ligand, Fas ligand, CD27 ligand, CD30 ligand, 4-1BBL, Trail), and MIF.

"Store operated calcium entry" or "SOCE" refers to the mechanism by which release of calcium ions from intracellular stores is coordinated with ion influx across the plasma membrane.

"Selective inhibitor of SOC channel activity" means that the inhibitor is selective for SOC channels and does not substantially affect the activity of other types of ion channels.

"Selective inhibitor of CRAC channel activity" means that the inhibitor is selective for CRAC channels and does not substantially affect the activity of other types of ion channels and/or other SOC channels.

As used herein, the term "calcium" may be used to refer to the element or to the divalent cation $Ca^{2+}$.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

EXAMPLES

Example 1: CRAC Channel Inhibition by BTP2 Decreases Lung Injury

Preclinical data supports the concept that CRAC channel inhibitors will be useful in the treatment of lung injury. Studies with BTP2, an inhibitor of CRAC channels, delivered 2 hours after systemic endotoxin administration in mice resulted in a striking reduction in endothelial cell $Ca^{2+}$ flux and a sharp decrease in measures of lung injury. BTP2 was also noted to suppress endothelial lung dysfunction and lung inflammation in a rat model of ventilator-induced lung injury. Finally, intravenous infusion of N-(5-(6-Chloro-2,2-difluorobenzo[d][1,3]dioxol-5-yl)pyrazin-2-yl)-2-fluoro-6-methylbenzamide-injection emulsion (IE) was noted to decrease lung myeloperoxidase activity (i.e., neutrophil infiltration) and mRNA levels of the cytokines TNFα and IL-6 in a rat model of acute pancreatitis with secondary complications including lung injury.

Recent results from human clinical studies show that intravenous N-(5-(6-Chloro-2,2-difluorobenzo[d][1,3]dioxol-5-yl)pyrazin-2-yl)-2-fluoro-6-methylbenzamide-injection emulsion IE is safe in critically ill patients and may reduce the severity and duration of respiratory failure. Patients with acute lung injury, secondary to acute pancreatitis, treated with N-(5-(6-Chloro-2,2-difluorobenzo[d][1,3]dioxol-5-yl)pyrazin-2-yl)-2-fluoro-6-methylbenzamide-injection emulsion (IE) has a shorter duration of supplemental oxygen and ventilatory support than control patients. A reduction in persistent systemic inflammatory response syndrome is also noted in patients treated with N-(5-(6-Chloro-2,2-difluorobenzo[d][1,3]dioxol-5-yl)pyrazin-2-yl)-2-fluoro-6-methylbenzamide-injection emulsion (IE) compared to controls.

Both the preclinical and clinical data support the development of N-(5-(6-Chloro-2,2-difluorobenzo[d][1,3]dioxol-5-yl)pyrazin-2-yl)-2-fluoro-6-methylbenzamide-injection emulsion (IE) for use in patients with ALI/ARDS secondary to COVID-19 infection.

Example 2: Pre-Clinical Studies

Safety pharmacology studies conducted in rats indicated no adverse effects on central nervous or respiratory systems induced by a pharmaceutical composition comprising N-(5-(6-Chloro-2,2-difluorobenzo[d][1,3]dioxol-5-yl)pyrazin-2-yl)-2-fluoro-6-methylbenzamide (Compound 1). Compound 1 is a non-limiting example of a composition described herein that inhibits calcium release-activated calcium (CRAC) channels). Dose-limiting adverse clinical and cardiovascular effects were noted in a single telemetered cynomolgus monkey dosed at 25 mg/kg IV with Compound 1. Cardiovascular data at lower doses (1, 3 and 10 mg/kg) showed transient, non-dose-related, slight-to-moderate increases in systolic/diastolic arterial blood pressures and negative chronotropic effects (mild and non-adverse) at all doses and in placebo treated animals.

Repeat-dose toxicity studies conducted in both rats and monkeys showed no observable adverse effect levels (NOAELs) of 25 mg/kg/day and 3 mg/kg/day, respectively. In vitro genetic toxicity studies were negative in the Ames bacterial reverse mutation assay and weakly positive/equivocal in a micronucleus assay conducted in human peripheral blood lymphocytes. A subsequent in vivo micronucleus study conducted in rats involving two different endpoints (bone marrow micronucleus and liver Comet assays) showed no evidence of DNA reactivity. Based on the results of the complete battery of genotoxicity testing, the weight of evidence indicates that Compound 1 is neither mutagenic nor clastogenic. Hemolysis testing concluded that Compound 1 was compatible with human plasma and non-hemolytic in human blood. Specific local tolerance studies to examine irritation/inflammation at the injection site were not performed, but no evidence of compound-related or vehicle-related local irritation was observed in the repeat-dose toxicity studies in rat and monkey. Finally, in vitro 3T3 results indicated that Compound 1 is potentially phototoxic, so appropriate precautions are being taken in clinical trials.

Some support for the idea that CRAC channel inhibition could be useful in the treatment of lung injury comes from preclinical data examining the effects of BTP2, a widely used research CRAC channel inhibitor, as well as Compound 1. BTP2 was shown to attenuate lipopolysaccharide-induced lung injury in mice and ventilator-induced lung injury in rats. Using a rat model of acute pancreatitis (AP), intravenous (IV) infusion of Compound 1 was noted to decrease lung myeloperoxidase activity (i.e., neutrophil infiltration) and mRNA levels of the pro-inflammatory cytokines TNFα and IL-6. Finally, knockdown of Orai1 in mice, which reduces CRAC channel activity, inhibited TNFα-induced cytokine expression (including IL-6) and myeloperoxidase activity in lung tissue.

Potential efficacy of Compound 1 in treating acute lung injury was established in three diverse in vivo models of AP that cause both pancreatic damage and lung inflammation (TLCS-induced, FAEE-induced, and caerulein-induced acute pancreatitis models). Myeloperoxidase activity within lung tissue, as well as trypsin activity, myeloperoxidase activity and histopathological indices (edema, inflammatory cell infiltration, vacuolization, and necrosis) in pancreas tissue, were all markedly reduced following a single IP dose of Compound 1 in the mouse caerulein-induced pancreatitis model, two IP doses of Compound 1 in the mouse TLCS-induced and FAEE-induced pancreatitis models, and one 4-hour IV infusion of Compound 1 Nanoemulsion (the intended clinical dosage form, route of administration and infusion duration) in the rat caerulein-induced pancreatitis model. The timing of Compound 1 administration relative to induction of pancreatitis was investigated in the TLCS-induced and FAEE-induced pancreatitis models, and the results suggested that Compound 1 may be more effective in minimizing pancreatic injury and subsequent downstream events if it is administered early in the course of disease, although later administration retains effectiveness in halting disease progression.

Example 3: Phase 1 Clinical Trials

A phase 1 clinical trial is performed to evaluate the safety, tolerability, pharmacokinetics and pharmacodynamics of the pharmaceutical compositions disclosed herein on subjects having ALI and/ARDS or at risk for developing ALI and/or ARDS, such as contracted COVID-19 or other respiratory viruses/bacteria that are likely to lead to ALI/ARDS.

Single ascending dose (SAD) arms: subjects in each group receive either a single dose of the pharmaceutical composition or a placebo. Exemplary doses are 0.1, 0.5, 1, 2, 3, 4, 5, 10, 20, 25, 30, 35, 40, 45, 50, 55, 60, 65, 70, 75, 80, 85, 90, 95, 100 mg of the pharmaceutical composition. Safety monitoring and PK assessments are performed for a predetermined time. Based on evaluation of the PK data, and if the pharmaceutical composition is deemed to be well tolerated, dose escalation occurs, either within the same groups or a further group of healthy subjects. Dose escalation continues until the maximum dose has been attained unless predefined maximum exposure is reached or intolerable side effects become apparent.

Multiple ascending dose (MAD) arms: Subjects in each group receive multiple doses of the pharmaceutical composition or a placebo. The dose levels and dosing intervals are selected as those that are predicted to be safe from the SAD data. Dose levels and dosing frequency are chosen to achieve therapeutic drug levels within the systemic circulation that are maintained at steady state for several days to allow appropriate safety parameters to be monitored. Samples are collected and analyzed to determination PK profiles.

The percentage and speed to reduce pulmonary edema and alveolar fluid clearance are measured. Alveolar epithelial fluid clearance is impaired during ALI/ARDS, and decreased resolution of alveolar edema is associated with increased mortality. There are several potential mechanisms of decreased alveolar fluid clearance in ALI, including apoptosis and necrosis of alveolar epithelial cells, decreased vectorial sodium and chloride transport secondary to inflammatory mediators, and reactive oxygen species. The primary efficacy end point may be the number of ventilator-free days, defined as days for subjects achieving unassisted breathing and maintain unassisted breathing for at least two consecutive calendar days. For the subjects in the groups that contracted COVID-19, the primary efficacy end point may be a subject stops progressing to develop ALI and/or ARDS.

Example 4: Additional Clinical Studies

Single Ascending Dose and Multiple Ascending Dose Studies

Two Phase 1 studies of N-(5-(6-Chloro-2,2-difluorobenzo[d][1,3]dioxol-5-yl)pyrazin-2-yl)-2-fluoro-6-methylbenzamide (Compound 1) have been conducted in healthy subjects: a single ascending dose (SAD) study (Compound 1 Test 101) and a multiple ascending dose (MAD) study (Compound 1 Test 102). In Compound 1 Test 101 (Table 1), 32 healthy subjects were enrolled in five groups and randomized in a 3:1 ratio to receive a single dose of active versus placebo. The dose levels for each group are noted in Table 1. The dose volume of the emulsion was fixed at 1.3 mL/kg for all subjects in the SAD study groups, and an injectable emulsion of Compound 1 or placebo was administered via a 4-hour IV infusion.

TABLE 1

| SAD (Compound 1 Test 101) | | | | |
|---|---|---|---|---|
| Group | Active Treatment | Number of Active Treatment Subjects | Number of Placebo Treatment Subjects | IV Dose Volume (mL/kg) |
| 1 | 0.1 mg/kg | 6 | 2 | 1.3 |
| 2 | 0.24 mg/kg | 3 | 1 | 1.3 |
| 3 | 0.48 mg/kg | 3 | 1 | 1.3 |
| 4 | 1.0 mg/kg | 6 | 2 | 1.3 |
| 5 | 2.1 mg/kg | 6 | 2 | 1.3 |

Of the 32 enrolled subjects, there were no serious adverse events (SAE) or adverse events (AE) classified as moderate or severe in intensity. There were three clinical AEs that were all classified as mild in intensity. Two of the AEs were considered possibly related and one was considered unlikely or unrelated to study treatment. In each case, no action was taken with respect to study treatment because of the AEs. No laboratory abnormalities were observed that were considered clinically significant. There were vehicle-related increases in serum triglyceride and cholesterol levels noted in some subjects that returned to baseline within 24 hours. There was no evidence of any sustained treatment related increase in systolic or diastolic blood pressure. In addition, cardiac function, monitored by continuous electrocardiographic recording and serial biomarker testing, showed no evidence of any treatment related effect on heart rate, QTcF, cardiac troponin-T or B-type natriuretic peptide levels.

In the SAD study (Compound 1 Test 101), interim non-compartmental pharmacokinetic (PK) analysis indicates that Compound 1 likely distributes to three compartments. Plasma concentrations of compound rise steadily during the 4-hour infusion, with Tmax achieved at the end of infusion (4 hours). After the end of infusion, there is a rapid and prominent distribution phase followed by a prolonged period of residual drug levels. The terminal elimination phase has not yet been fully characterized as it appears to be much longer than was anticipated based on pre-clinical PK data in mouse, rat, dog and monkey. Plasma concentrations during the terminal phase are approximately 5% of Cmax values and, as indicated above, to date there have been no clinically significant AEs reported during this phase. Plasma exposures, defined by AUC0-24 h, appear to be dose-proportional and reached a maximum of 6710 ng*h/mL in Group 5, which is 4.3-fold below the mean AUC24 h in monkey at the NOAEL (29,000 ng*hr/mL).

In the MAD study (Table 2) of Compound 1 (Compound 1 Test 102), subjects in the first group were randomized to receive a single dose of active treatment, 0.50 mg/kg, versus placebo for seven consecutive days. Eight healthy subjects were enrolled in the first group, with five receiving active treatment and three receiving placebo. One of the subjects received placebo at the maximum dose volume of emulsion, 1.3 mL/kg, for 7 days, whereas all others were dosed on a weight-based adjustment of dose volume. There were no SAEs and no AEs classified as moderate or severe in intensity. There were 15 clinical AEs that were all classified as mild. In each case, no action was taken with respect to study treatment because of the AEs. No laboratory abnormalities were observed that were considered clinically significant.

TABLE 2

MAD (Compound 1 Test 102)

| Group | Active Treatment Daily for 7 days | Number of Active Treatment Subjects | Number of Placebo Treatment Subjects | IV Dose Volume (mL/kg) |
|---|---|---|---|---|
| 1 | 0.5 mg/kg | 5 | 3 | 0.3125a |
| 2 | 1.0 mg/kg | 6 | 2 | 0.625 | aone placebo patient received maximum dose volume of 1.3 mL/kg

Subjects in the second group of Compound 1 Test 102 were randomized to receive a single dose of active treatment, 1.0 mg/kg, versus placebo for seven consecutive days. Eight healthy subjects were enrolled in the second group, with six receiving active treatment and two receiving placebo for seven consecutive days. There were no SAEs and no AEs classified as moderate or severe in intensity. There were three AEs that were all classified as mild in intensity. In each case, no action was taken with respect to study treatment because of the AEs. No laboratory abnormalities were observed that were considered clinically significant.

There were vehicle-related increases in serum triglyceride noted in some subjects in both groups with levels returning to baseline within 24 hours. Cholesterol levels accumulated in some subjects in both groups with daily dosing but the increases were not considered clinically significant and were related to the vehicle. Thus, the largest rise in cholesterol levels was in the subject who received placebo at the maximum dose volume of emulsion. The rise in cholesterol is believed to be due to the release of tissue cholesterol induced by the lecithin in the emulsion (Byers et al., 1962), was noted in the pre-clinical studies in monkeys, and was reversible with cessation of dosing. There was no evidence of any sustained treatment related increase in systolic or diastolic blood pressure. In addition, cardiac function, monitored by continuous electrocardiographic recording and serial biomarker testing, showed no evidence of any sustained treatment related effect on heart rate, QTcF or B-type natriuretic peptide levels.

Non-compartmental PK analysis of Group 1 in Compound 1 Test 102 (0.5 mg/kg) indicates that Compound 1 accumulated in plasma, with a 2.6-fold increase in systemic exposure (AUC24 h) on Day 7 compared to Day 1 of dosing, consistent with modeling simulations. Cmax accumulated 1.6-fold (geometric mean of 363 ng/mL on Day 7). The geometric mean of the AUC24 h on Day 7 was 3190 ng*hr/mL, which is 9.1-fold below the NOAEL AUC24 h in monkey (29,000 ng*hr/mL). PK analysis of Group 2 in Compound 1 Test 102 (1.0 mg/kg) indicates that Compound 1 accumulated in plasma, with a 2.6-fold increase in AUC24 h on Day 7 compared to Day 1 of dosing, consistent with modeling simulations. Cmax accumulated 1.4-fold (geometric mean 637 ng/mL on Day 7). The geometric mean of the AUC24 h on Day 7 was 6830 ng*hr/mL, which is 4.2-fold below the NOAEL AUC24 h in monkey (29,000 ng*hr/mL). After the end of 7 days of infusion, there remained a prolonged period of residual drug levels in both MAD groups that remained significantly lower than the Cmax on Day 7. A 3rd group of healthy subjects in the MAD was not dosed, despite the benign safety profile, because of the prolonged period of residual drug levels noted in the previous groups of healthy subjects.

Subjects in Groups 4 and 5 of the SAD study and Groups 1 and 2 of the MAD study who received Compound 1 were followed for 1 year in a long-term extension study to assess for adverse events and serious adverse events. In addition, PK levels were drawn in all 4 groups on Day 270 to further characterize the terminal phase and the prolonged period of residual drug level. There were no serious adverse events and no adverse events rated moderate or severe in intensity in subjects followed for 365 days.

A population PK model was built using the data from the SAD and MAD studies. The model suggested three compartments for distribution as well as gender and body weight-dependent differences in exposures. The model showed that females have a higher volume of distribution compared to males, resulting in lower plasma AUC24 h values versus males, and that patients with higher body weights will have a lower AUC. The model was then used to identify the dosing regimens for the first and second phases of the open-label study described below.

Open Label Study in Patients with Acute Pancreatitis and SIRS

A Phase 2, open-label, dose-response, multi-center study of Compound 1 was conducted in patients with AP and accompanying SIRS and hypoxemia (Compound 1 Test 201). One patient was randomized having SIRS alone at Screening. The primary objective of the study was to evaluate safety and tolerability; the secondary objective was to evaluate efficacy and the PK profile of Compound 1.

The study had 2 phases; the Initial Phase consisted of 2 concurrently enrolled cohorts and the Second Phase consisted of 2 concurrently enrolled cohorts. In total, it was planned to have 4 Cohorts containing 24 adult male and female patients with AP and accompanying SIRS and hypoxemia. In the Initial Phase, 4 female patients were to be randomized in a 3:1 ratio to receive Compound 1+Supportive Care (SC) or SC alone (Cohort 1). Concurrently, 4 male patients were to be randomized in a 3:1 ratio to receive Compound 1+SC or SC alone (Cohort 2). Doses were to be 1.0 mg/kg on Day 1 and 1.4 mg/kg daily on Days 2, 3 and 4 (low dose regimen). In the Second Phase, 8 female patients were to be randomized in a 3:1 ratio to receive Compound 1+SC or SC alone (Cohort 3). Concurrently, 8 male patients were to be randomized in a 3:1 ratio to receive Compound 1+SC or SC alone (Cohort 4). Planned doses for both Cohorts 3 and 4 were to be 2.08 mg/kg daily on Days 1 and 2 and 1.6 mg/kg daily on Days 3 and 4 (high dose regimen).

The decision to start Cohort 3 in the Second Phase was made after study personnel reviewed the available efficacy, safety and tolerability data from Cohort 1 and discussed this with the Principal Investigator (PI). At this point, a decision was made to administer patients in Cohort 3 with the same dose level and schedule as in Cohort 1, as efficacy was observed in Cohort 1. Cohort 3, therefore, received the same dose level and schedule as Cohort 1, 1.0 mg·kg on Day 1 and 1.4 mg/kg daily on Days 2, 3 and 4. The decision to start Cohort 4 in the Second Phase of the study was made after study personnel reviewed the available efficacy, safety and tolerability data from Cohort 2 and discussed this with the Principal Investigator. Cohort 4, therefore, received the original planned dose level and schedule; 2.08 mg/kg daily on Days 1 and 2 and 1.6 mg/kg daily on Days 3 and 4.

The first infusion of Compound 1 was started within 6 (up to 8) hours of the patient or LAR providing informed consent and was administered as a continuous IV infusion over 4 hours. Subsequent infusions were to be started every 24 hours (±1 hour) from the start of the first infusion. In patients receiving Compound 1+SC (all doses), there were 9 patients of 14 patients (64%) who did not receive all 4 scheduled doses, 7 of 9 patients because of rapid clinical improvement leading to early discharge and 2 of 9 patients because of study drug discontinuation. Five of 8 patients (63%) receiving the low dose regimen+SC and 4 of 6 patients (67%) receiving the high dose regimen+SC did not receive all 4 doses of Compound 1.

The demographic information and baseline characteristics for the patients enrolled in the study are noted in Table 3.

There was 1 TEAE of Chromaturia in a patient receiving the high dose regimen+SC for which the causality was considered Possible. There were no other TEAEs, for which the causality was considered Possible, Probable or Definite.

SAEs were reported in 2 of 8 patients (25%) receiving the low dose regimen+SC, 1 of 6 patients (17%) receiving the high dose regimen+SC and 2 of 7 patients (29%) receiving SC alone. There was 1 death during the study. This patient, who received the high dose regimen+SC, experienced an SAE of Hypoxic-Ischemic Encephalopathy for which the outcome was fatal. The SAE was considered severe and the outcome was designated recovered/resolved with sequelae. Causality was considered to be Unrelated.

There were no untoward changes in vital signs, oxygenation, and laboratory values associated with treatment with either the low dose or high dose regimen of Compound 1.

Pharmacodynamic and Pharmacokinetic Study in Patients with Acute Pancreatitis

In Compound 1 Test 202, a pharmacodynamic and pharmacokinetic study of Compound 1 in patients with acute pancreatitis, patients with AP (regardless of the presence of SIRS and/or hypoxemia) were administered a single IV

TABLE 3

Demographics and Baseline Characteristics of Patients in Compound 1 Test 201

| Treatment | CM4620-IE + SC low dose regimen (N = 8) | CM4620-IE + SC high dose regimen (N = 6) | CM4620-IE + SC TOTAL (N = 14) | SC Alone (N = 7) |
|---|---|---|---|---|
| Median Age (years) | 55 | 43.5 | 50.5 | 54 |
| Min, Max | 26, 66 | 37, 55 | 26, 66 | 40, 72 |
| Gender, n % | Female 5 (63%) | Female 0 | Female 5 (36%) | Female 4 (57%) |
| | Male 3 (38%) | Male 6 (100%) | Male 9 (64%) | Male 3 (43%) |
| Race, n % | Asian 1 (13%) | Asian 0 | Asian 1 (7%) | Asian 0 |
| | Black 1 (13%) | Black 2 (33%) | Black 3 (21%) | Black 3 (43%) |
| | White 6 (75%) | White 4 (67%) | White 10 (71%) | White 4 (57%) |
| Median Weight (kg) | 86 | 92.8 | 87.5 | 93.1 |
| Min, Max | 56.2, 108.9 | 84.8, 113.8 | 56.2, 113.8 | 59, 108.9 |
| BMI (kg/m$^2$) | 31.6 | 28.9 | 30.3 | 34 |
| Min, Max | 22, 44.4 | 25, 38.2 | 22, 44.4 | 23.8, 41.6 |
| Hx Type 2 Diabetes Mellitus | 2 (25%) | 1 (17%) | 3 (21%) | 1 (14%) |
| Hx Hypertension | 4 (50%) | 4 (67%) | 8 (57%) | 6 (86%) |

The primary objective of this study was to assess the safety and tolerability of Compound 1 in patients with AP and accompanying SIRS and Hypoxemia. In this study, the low dose regimen+SC and the high dose regimen+SC were well tolerated in patients with AP and SIRS, with no evidence of untoward safety or tolerability findings.

Treatment-emergent AEs (TEAEs) were reported in 7 of 8 patients (88%) receiving the low dose regimen+SC, 5 of 6 patients (83%) receiving the high dose regimen+SC, and 3 of 7 patients (43%) receiving SC alone. Severe TEAEs were reported in 0 of 8 (0%) patients receiving the low dose regimen+SC, 2 of 6 (33%) receiving the high dose regimen+SC, and 2 of 7 (29%) receiving SC alone. There were 3 TEAEs in 2 patients leading to discontinuation of the study drug. Both patients received the high dose regimen+SC.

Two different TEAE preferred terms were reported in 2 or more patients receiving the low dose regimen+SC: Hypokalemia in 2 of 8 patients (25%) and Headache in 2 of 8 patients (25%). Three different TEAE preferred terms were reported in 2 or more patients receiving the high dose regimen+SC: Malnutrition, Confusional State and Acute Respiratory Distress Syndrome were each reported in 2 of 6 patients (33%). There were no TEAE preferred terms reported in 2 or more patients receiving SC alone.

infusion of 2.08 mg/kg of an injectable emulsion of Compound 1 and blood, plasma and serum were collected for analysis. It was planned to initially enroll 5 patients and then to enroll an additional 4 patients as needed. Ultimately, 7 patients were screened for the study, and all 7 enrolled in and completed the study. On Days 1 and 2, blood and plasma samples for PD and PK analyses, respectively, were obtained 30 minutes after completing the administration of Compound 1 and 24 hours from the start of the administration of Compound 1. In patients hospitalized at Day 5 and 10, blood and plasma samples were obtained; if discharged earlier, samples were obtained at the time of discharge. After discharge, patients returned to the hospital on Day 30 to provide final blood and plasma samples.

Of the 7 patients, 5 (71%) were male and 2 (29%) were female. The median (min, max) age in all 7 patients was 42 (29, 54) years. The age range was 38 to 54 years in males and 29 to 35 years in females. The weight range was 49.4 to 102.1 kg and the BMI range was 19.3 to 32.2. Of the 7 patients, 4 (57%) were black or African and 3 (43%) were white. There were no (0%) Hispanic or Latino patients enrolled in the study. The cause of AP was alcohol in 5 of the 7 patients, hypertriglyceridemia in 1 of the 7, and unknown in the other.

A total of 3 patients experienced 7 TEAEs during the study. One (1) patient experienced a TEAE of Melena and a TEAE of bursitis, 1 patient had a TEAE of Pancreatitis Acute (which was also an SAE), and 1 patient experienced TEAEs of Pneumonia, Alcohol Withdrawal Syndrome, Pyrexia and Respiratory Distress (which was also an SAE). Of the 7 TEAEs, there were 3 mild, 2 moderate and 2 severe TEAEs. The 2 severe TEAEs (Pancreatitis Acute and Respiratory Distress) were also SAEs. The causality of the 7 TEAEs to Compound 1 was Unrelated for 5 TEAEs and Unlikely for 2 TEAEs.

Example 5: Phase 2 Clinical Trial

A phase 2 clinical trial is performed to evaluate Compound 1 in patients with severe COVID-19 pneumonia. The study will investigate the use of Compound 1 in patients with severe COVID-19 pneumonia who are at risk for progression to acute respiratory distress syndrome (ARDS).

The open-label Phase 2 clinical study aims to enroll 60 patients with severe COVID-19 pneumonia. Forty patients will be assigned to receive Compound 1 plus standard of care and 20 assigned to receive standard of care alone.

Rationale for Study and Selected Doses: For patients with corona virus 2019 (COVID-19), morbidity and mortality can arise from host immune responses. These responses can lead to a "cytokine storm," which in turn causes acute lung injury (ALI), acute respiratory distress syndrome (ARDS), death, or permanently compromised pulmonary function in those who survive. Therapeutic agents that reduce cytokine release and ALI/ARDS could be life-saving in patients infected with severe acute respiratory syndrome coronavirus 2 (SARS-CoV-2), the virus that causes COVID-19, as well as other infectious agents.

Figure 1B:
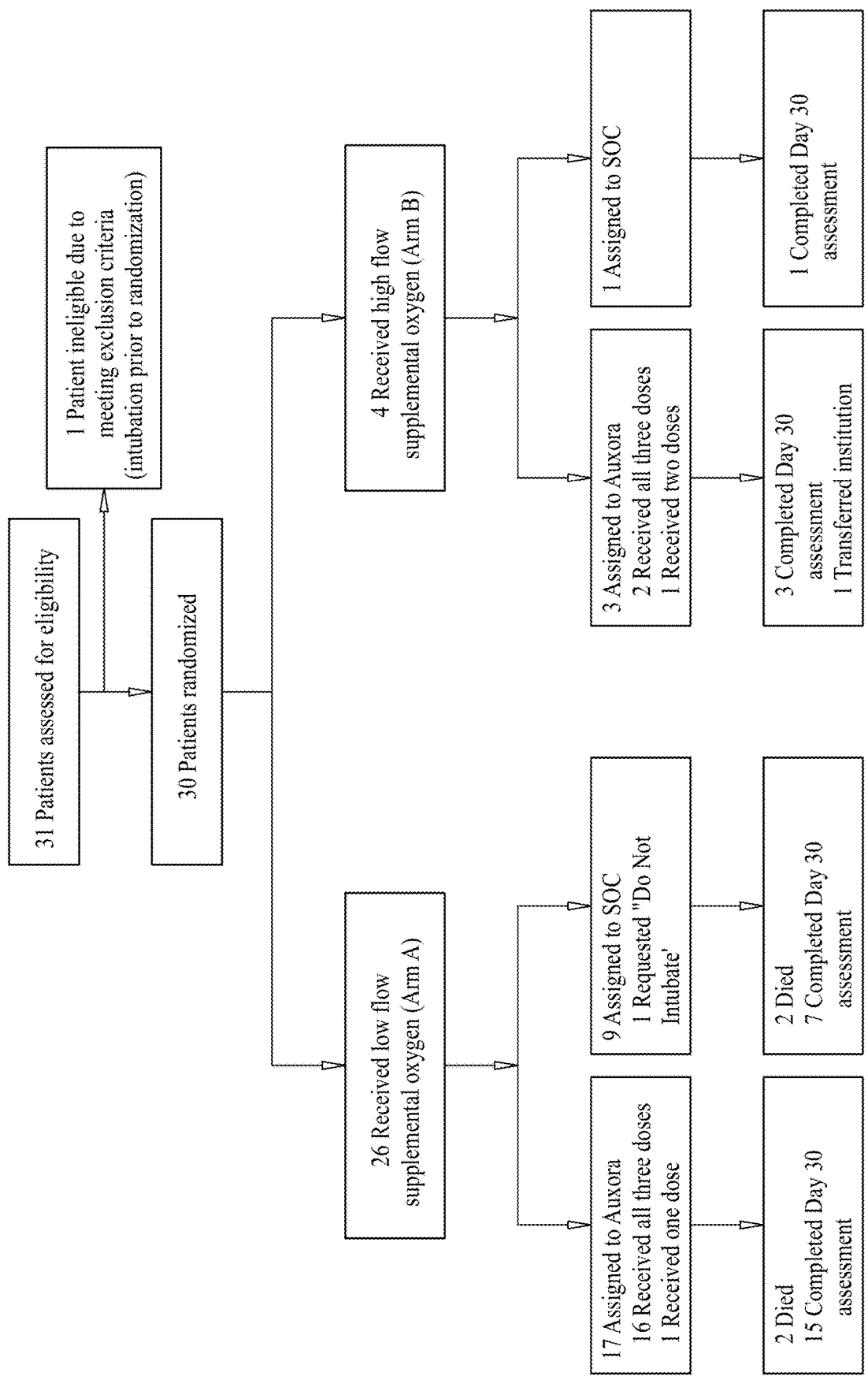
FIG. 1B shows patent enrollment and randomization in the clinical trial study.

Human clinical studies of Compound 1 further support the use of the drug to treat ALI/ARDS. Some evidence for the effect of Compound 1 on systemic inflammation is found in the differences in the SIRS score, percent of hospital days without SIRS, and persistence of SIRS in treated versus standard of care patients in Compound 1 Test 201. Persistent SIRS, defined as SIRS lasting continuously for ≥48 hours, is a specific risk factor for the development of organ failure, most commonly respiratory failure, in patients with AP. The effect of Compound 1 on elevated IL-6 levels may be particularly relevant to its potential efficacy in patients with severe COVID-19 pneumonia as elevated IL-6 appears to drive the respiratory complications of the virus. A total of 8 patients treated with Compound 1 in Compound 1 Test 201 and Compound 1 Test 202 (7 patients and 1 patient, respectively) had a maximum IL-6 level ≥150 pg/mL in the first 24 hours, with 2 of the patients in Compound 1 Test 201 having IL-6 levels greater than 1000 pg/mL. Three (3) patients treated with standard of care in Compound 1 Test 201 had a maximum IL-6 level ≥150 pg/mL in the first 24 hours. Treatment with Compound 1 decreased IL-6 levels to below 150 pg/mL in 7 of 8 patients, while only 1 of 3 patients treated with standard of care had IL-6 levels that dropped below this threshold. An example of a phase 2 clinical trial design is shown in FIG. 1.

Results of the PD ex vivo blood assay of lymphocyte function in Compound 1 Test 202 indicated that Compound 1 at or near Cmax inhibited CRAC channel-dependent stimulated IL-2 secretion by approximately 57%. The inhibitory effect of Compound 1 dissipated over the next 1-2 days, demonstrating pharmacological reversal. This result suggests that long-term immunosuppression is unlikely to result from therapy with Compound 1.

Calcium release-activated calcium (CRAC) channel inhibitors such as Compound 1 may block the production and release of pro-inflammatory cytokines from immune cells, including interleukin-2 (IL-2), IL-6, IL-17 and tumor necrosis factor-alpha (TNFα), interrupting the cascade of events leading to ALI and ARDS. Thus, treatment with Compound 1 could prevent patients with COVID-19 from developing the life-threatening effects of pro-inflammatory cytokine cascade and ALI/ARDS, while further preventing permanent pulmonary tissue scarring.

The dosing regimen for the current study includes 3 consecutive days of dosing. The derivation of this regimen comes from both the Phase 1 MAD and Phase 2a studies, in that the dosing regimens for the Phase 2a open-label study were chosen based on maximum systemic exposures observed in the Phase 1 MAD study that were well tolerated. Population PK-modeling based on critically ill AP patients was performed to confirm that the simulated plasma exposures (AUC24 hr and Cmax) with the selected dosing regimen would not cross the established NOAEL exposures in any patient, and three days of dosing is expected to provide robust decreases in IL-6 levels.

Number of Patients and Sites: 60 patients with confirmed COVID-19 pneumonia at up to 3 sites.

Compound 1 Dose and Route of Administration: 2.0 mg/kg of an injectable emulsion of Compound 1 will be administered at 0 hour and 1.6 mg/kg will be administered at both 24 hours and 48 hours from the Start of the First Infusion of Study Drug (SFISD).

Compound 1 will be administered intravenously as a continuous infusion over 4 hours via a bag and tubing compatible with lipid emulsions and using a 1.2 micron filter.

Hypothesis: Compound 1, a non-limiting example of a calcium release-activated calcium (CRAC) channel inhibitor, potently blocks the production and release of pro-inflammatory cytokines from immune cells, including those elevated by SARS-CoV-2 infection (e.g., IL-6, IL-17 and TNF-α) and may interrupt the cascade of events leading to acute lung injury (ALI) and acute respiratory distress syndrome (ARDS) in patients with severe COVID-19 pneumonia. It may further directly protect the lung through a local effect on CRAC channels and modulation of NFAT-induced activation of the lung endothelium. Recently published literature showed that a CRAC channel inhibitor similar to Compound 1 was beneficial in animal models of lung injury by both a direct effect on pulmonary endothelial cells, as well as a systemic effect on CRAC channels of immune cells. Lending further support are in vivo efficacy data on lung IL-6, TNFα, and MPO mRNA production in animals with experimental acute pancreatitis, a known cause of ALI/ARDS treated with Compound 1 and data from a 2a study of Compound 1 in patients with acute pancreatitis and accompanying SIRS with hypoxemia at presentation that showed both a reduction in significantly elevated IL-6 levels and improved oxygenation in patients treated with Compound 1.

Compound 1 is given intravenously, is distributed into the lung within 2 to 4 hours of the start of infusion, has a rapid onset of activity with IL-2 production being decreased by >50% at the end of the infusion, and does not appear to have long term immune-modulatory effects with recovery of IL-2 production 24 hours after the end of the infusion.

Compound 1 holds promise as a potential treatment for patients with severe COVID-19 pneumonia, especially those with progressive respiratory dysfunction due to cytokine storm, and given the lack of effective treatments, clinical development should be initiated.

Primary objectives: To assess the safety and tolerability of Compound 1 in patients with severe COVID-19 pneumonia.

Secondary objectives: To determine the effect of Compound 1 on biomarkers of inflammation in patients with severe COVID-19 pneumonia.

To determine the clinical efficacy of Compound 1 in patients with severe COVID-19 pneumonia.

To determine the pharmacokinetic profile of Compound 1 in patients with severe COVID-19 pneumonia.

Inclusion Criteria: All of the following must be met for a patient to be randomized into the study:
1. The diagnosis of COVID-19 established with a RT-PCR assay;
2. At least 1 of the following symptoms:
   Fever, cough, sore throat, malaise, headache, muscle pain, dyspnea at rest or with exertion, confusion, or respiratory distress;
3. At least 1 of the following clinical signs:
   Respiratory rate ≥30, heart rate ≥125, SaO2<93% on room air or requires ≥2 L oxygen by nasal cannula to maintain SaO2≥93%, or $PaO_2/FiO_2$<300, estimated from pulse oximetry or determined by arterial blood gas;
4. The presence of a respiratory infiltrate or abnormality consistent with pneumonia that is documented by either a CXR or CT scan of the lungs;
5. The patient is ≥18 years of age;
6. A female patient of child bearing potential must not attempt to become pregnant for 39 months, and if sexually active with a male partner, is willing to practice acceptable methods of birth control for 39 months after the last dose of Compound 1;
7. A male patient who is sexually active with a female partner of childbearing potential is willing to practice acceptable methods of birth control for 39 months after the last dose of Compound 1. A male patient must not donate sperm for 39 months;
8. The patient is willing and able to, or has a legal authorized representative (LAR) who is willing and able to, provide informed consent to participate, and to cooperate with all aspects of the protocol.

Exclusion Criteria: Patients with any of the following conditions or characteristics must be excluded from randomizing:
1. Expected survival or time to withdrawal of life-sustaining treatments expected to be <7 days.
2. Do Not Intubate order;
3. Home mechanical ventilation (noninvasive ventilation or via tracheotomy) except for continuous positive airway pressure or bi-level positive airway pressure (CPAP/BIPAP) used solely for sleep-disordered breathing;
4. Endotracheal intubation;
5. Oxygen delivered by high flow nasal cannula, noninvasive positive pressure ventilation, or ECMO;
6. Shock defined by SBP<90 or DBP<60 or use of vasopressors;
7. Multiple organ failure dysfunction or failure;
8. Positive Influenza A or B testing;
9. Pathogens detected by a respiratory panel tested as local standard of care;
10. The patient has a history of:
    a. Organ or hematologic transplant;
    b. HIV;
    c. Active hepatitis B, or hepatitis C infection;
11. Current treatment with:
    a. Chemotherapy;
    b. Glucocorticoids at the time of consent;
    c. Immunosuppressive medications or immunotherapy (Section 5.3 for list of prohibited immunosuppressive medications and immunotherapy) at the time of consent;
    d. Hemodialysis or Peritoneal Dialysis;
12. The patient is known to be pregnant or is nursing;
13. Currently participating in another study of an investigational drug or therapeutic medical device at the time of consent;
14. Allergy to eggs or known hypersensitivity to any components of Compound 1.

Study Design: In this randomized controlled open-label stage study, 60 patients who meet all of the inclusion criteria and none of the exclusion criteria will be randomized 2:1 to receive Compound 1 or continue with the local standard of care. The dose of Compound 1 will be 2.0 mg/kg of Compound 1 administered at 0 hour, and 1.6 mg/kg at 24 hours and 1.6 mg/kg at 48 hours. The SFISD should occur within 8 hours of the patient or LAR providing informed consent. The dosing will be based on actual body weight obtained at the time of hospitalization or screening for the study. A study physician or appropriately trained delegate will perform assessments at screening, immediately prior to the SFISD, and immediately prior to each subsequent infusion. At 72 hours after the SFISD, the patient will be assessed every 24 hours (±4 hours) until Day 30 after the SFISD, or until discharge if earlier. Patients who are discharged before Day 25 after the SFISD will be contacted at Day 30 (±5 days) and Day 60 (+5 days) for a safety and mortality assessment. Patients randomized to receive local standard of care will not have blood samples drawn for PK assessments.

After the first 12 patients receive any dose of Compound 1, study personnel will pause enrollment in the study. Study personnel will provide the PIs the summary listings and tables of SAEs that have occurred at all sites during the study in both the treated and local standard of care arms. The study will not resume until the PIs have had the opportunity to review the summary listings and tables and determine if it is safe to continue enrolling patients at their institution. Study personnel and the PIs will also consider amendments to the protocol during the study pause.

Immunosuppressive medications or immunotherapies are prohibited in patients randomized into the study. In patients randomized to local standard of care, routine use of glucocorticoids in patients who have been mechanically ventilated is not recommended. Low doses of glucocorticoids may be considered in patients randomized to local standard of care for refractory shock or ARDS. Before starting glucocorticoids, please call the medical monitor.

Results from the cytokine panel being tested at a reference lab may not be immediately available to assist the PI or treating physician in managing the patient. The PI or treating physician will order all laboratory testing necessary for the management of the patient and analysis of these samples will be performed at the local laboratory.

Safety Endpoints: Safety assessments will include the following:
The incidence of TEAEs and SAEs
The intensity and relationship of TEAEs and SAEs
Clinically significant changes in vital signs and safety laboratory results Efficacy Endpoints: Efficacy assessments will include the following:
- Change in $PaO_2/FiO2$
- Days alive and free of mechanical ventilation
- Time to discharge alive from hospital
- Mortality at Day 30 and Day 60
- Change in IL-6, IL-17, TNF-α, Cytokine Panel, and Procalcitonin levels Pharmacokinetic Assessments: In treated patients, sampling of serum will be employed for pharmacokinetic assessment after finishing the first and third doses of study drug.

Statistical Considerations—Sample Size Calculations: Data will be summarized using descriptive statistics. Continuous data will be summarized with number of patients (n), mean, median, minimum, maximum, standard of deviation, coefficient of variation and or geometric mean. Categorical data will be summarized with number and proportion of patients.

Interim Results of Study with Compound 1 in Patients with Severe COVID-19 Pneumonia Interim results for the phase 2 trial have been obtained, as follows. 18 patients with severe COVID-19 pneumonia have been enrolled, in which 12 treated have been treated with an injectable emulsion of Compound 1, and 6 have received the standard of care. 3 sites are currently enrolling patients. 11 of the enrolled patients are at site 1 (8 treated and 3 SOC), 3 are at site 2 (1 treated and 2 SOC), and 4 are at site 3 (3 treated and 1 SOC). The subjects with severe COVID-19 were those that necessitated low-flow oxygen treatment.

Analyses available at this point includes the following:
- Safety: determined safe to proceed
- Patient baseline characteristics
- Time to hospital discharge
- PaO2/FiO2 evolution over hospital stay
- Ordinal scale analyses Baseline demographics of the treatment groups provided so far are shown in Table 4.

TABLE 4

Baseline Demographics of Treatment Groups

| Characteristic | Compound 1 | Standard of Care |
|---|---|---|
| Patients | 12 | 6 |
| Age in years (mean) | 60 | 61 |
| Weight in kg (mean) | 104.7 | 97.5 |
| Sex (% male) | 7M/5F (58% M) | 4M/2F (67% M) |
| Diabetes (%) | 50% | 33% |
| Hypertensive (%) | 42% | 17% |
| Initial $PaO_2/FiO_2$ (mean) | 204 | 190 |

Figure 2:
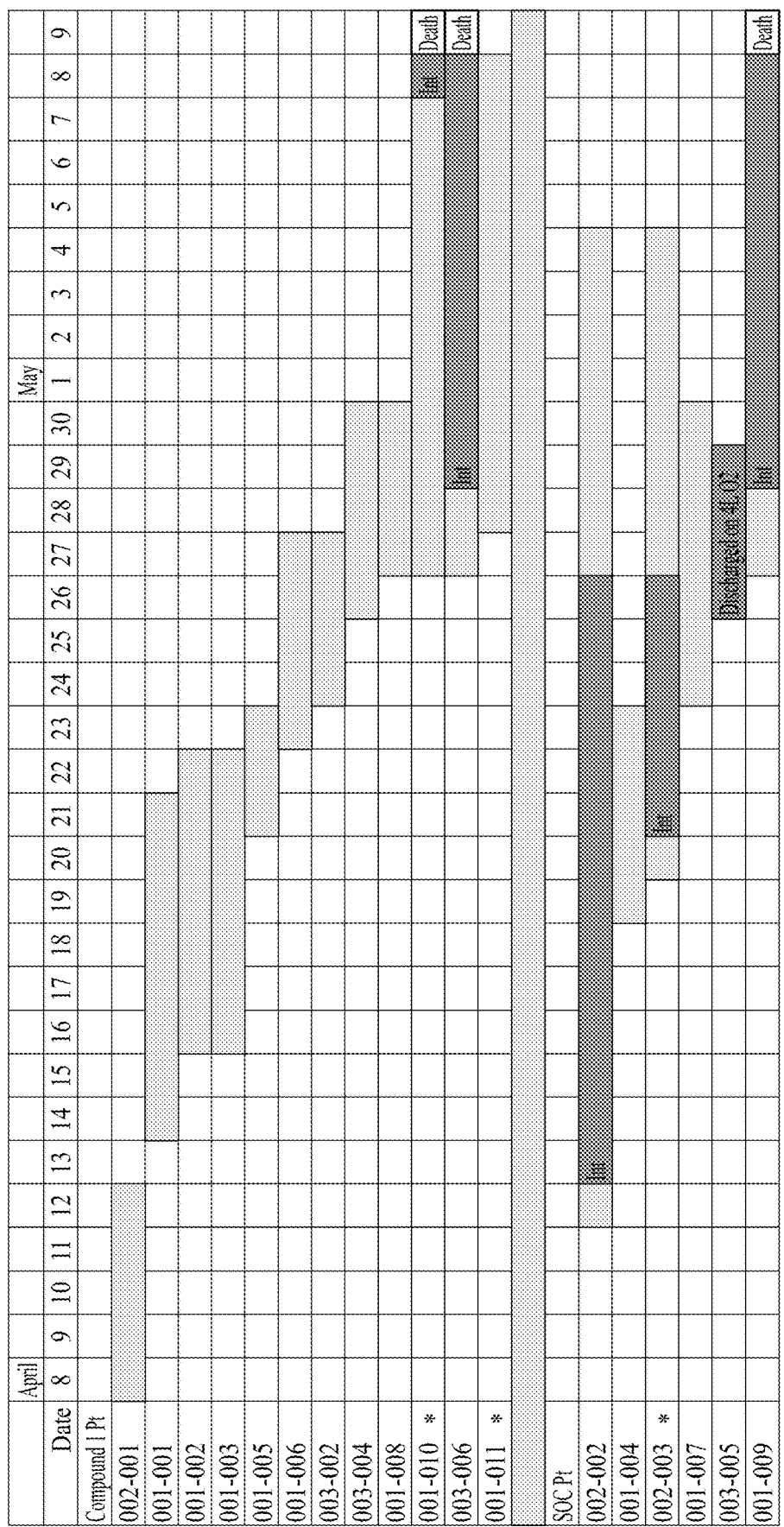
FIG. 2 is a chart showing interim results of a clinical trial. One patient in arm A received only 1 Auxora dose due to rapid improvement and early discharge, and 1 patient in arm B refused the third dose of Auxora. One patient in arm B, who received all 3 doses, was transferred after 120 h to another institution. In the standard of care group of arm A, 1 patient withdrew from the study at 96 h after being made do not intubate (DNI) because of declining respiratory status.

An interim analysis overview is shown in FIG. 2. So far, subjects receiving the standard of care (SOC), appear to have had more treatment failure, or earlier treatment failure, as well as more intubations and earlier intubations.

Figure 3:
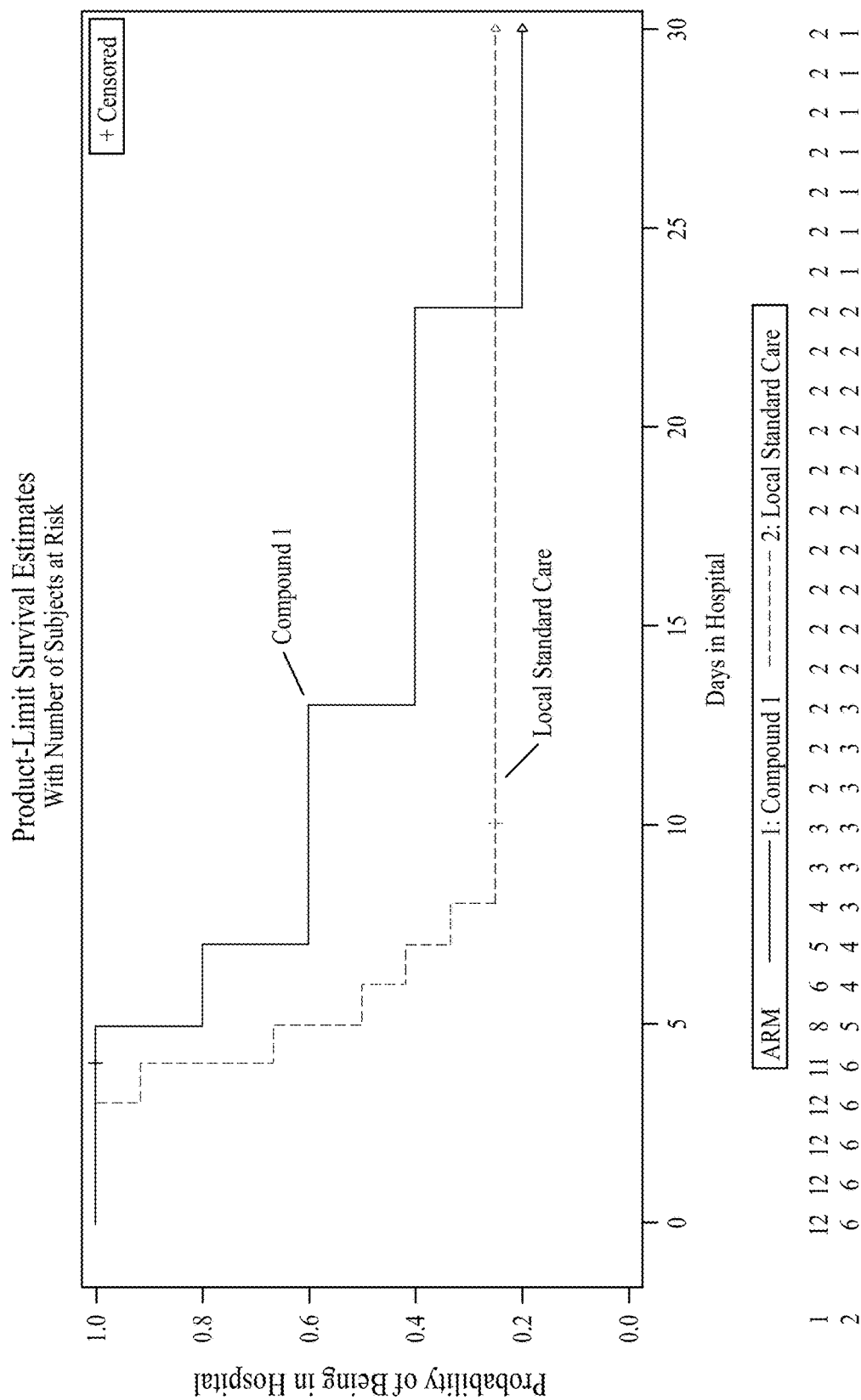
FIG. 3 is a plot showing probabilities of being in a hospital over time of patients treated with a CRAC inhibitor or a control.

Compound 1 in Severe COVID-19 Pneumonia: Time to Hospital Discharge. Hospitalization data including time to discharge are shown in Table 5 and FIG. 3. One subject in standard care group was discharged with low flow treatment and is considered as censored at discharge instead of out of hospital. 3 patients who died were censored at Day 30. Based on the data, COVID-19 patients treated with Compound 1 appear to have a lower probability of being at a hospital over time, a higher probability of being out of a hospital, and can expect a lower number of days being in a hospital. Similar improvements would be expected upon treatment with other intracellular Calcium signaling inhibitors or CRAC inhibitors.

TABLE 5

KM Estimate of Number of Days in Hospital

| | Subjects out of hospital | Median (95% CI) |
|---|---|---|
| Compound 1 | 9/12 (75%) | 5.5 days (4 days, na) |
| Local Standard Care | 4/6 (66%) | 13 days (5 days, na) |

Figure 4:
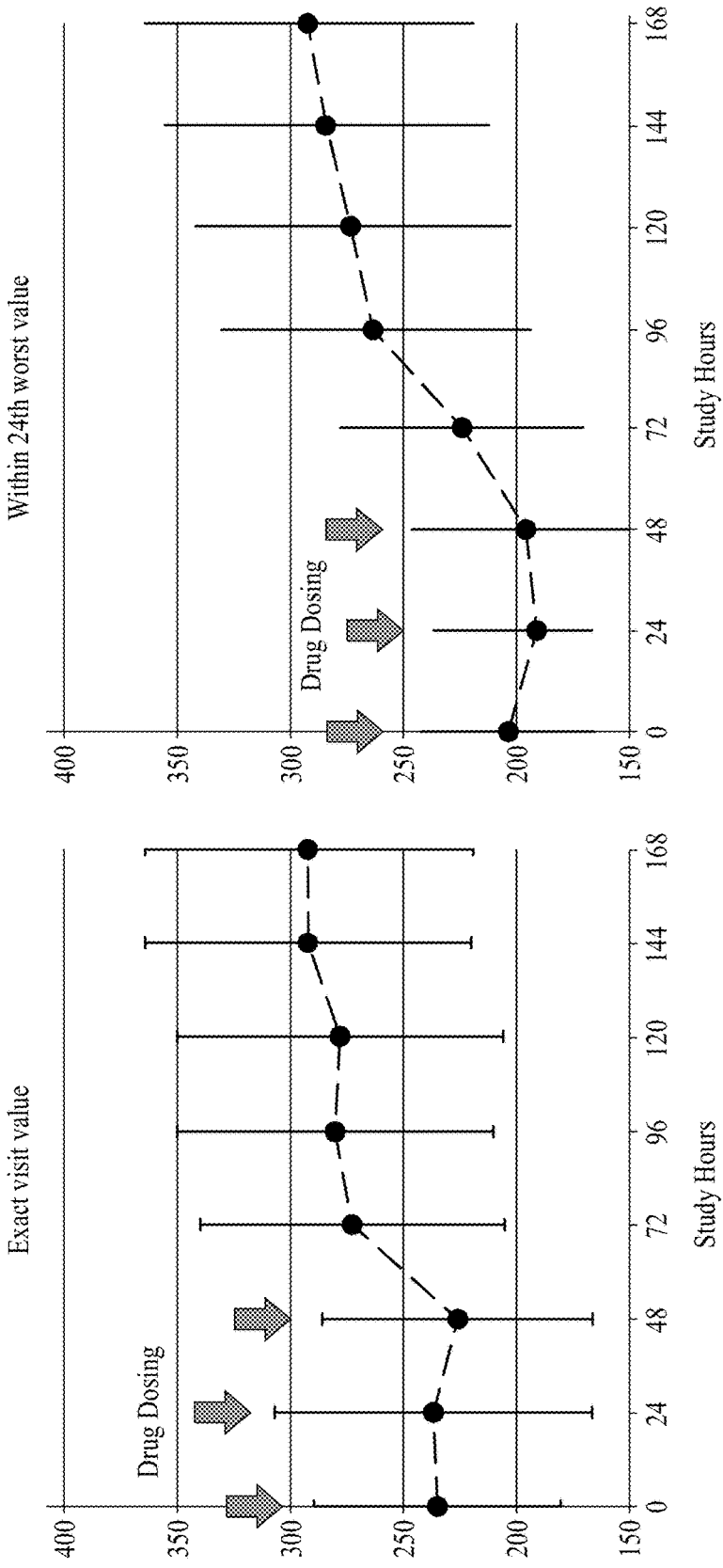
FIG. 4 includes plots showing $PaO_2/FiO_2$ data following treatment with a CRAC inhibitor.
Figure 5A:
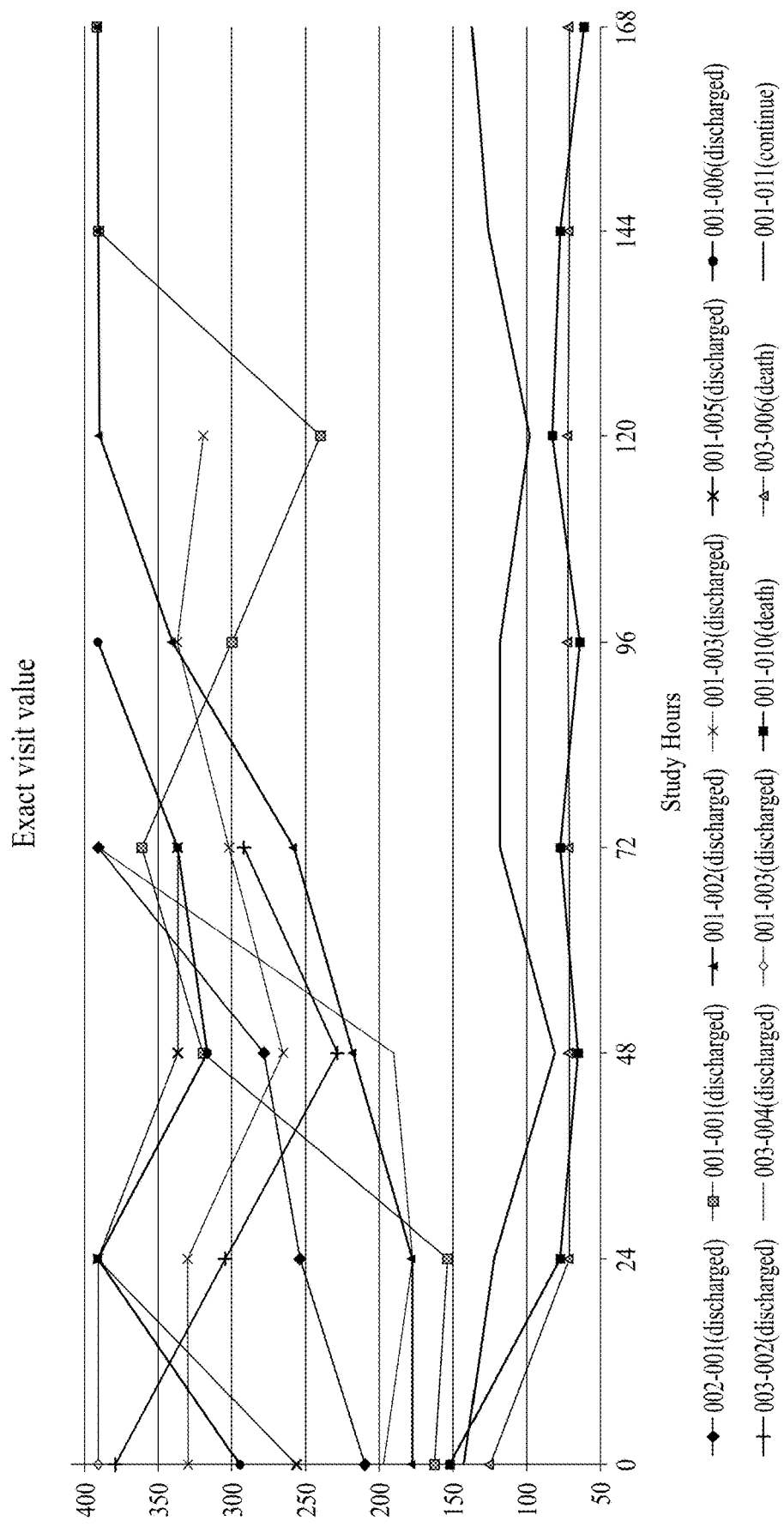
FIG. 5A is a plot showing individual $PaO_2/FiO_2$ data overtime for subjects administered a CRAC inhibitor.
Figure 5B:
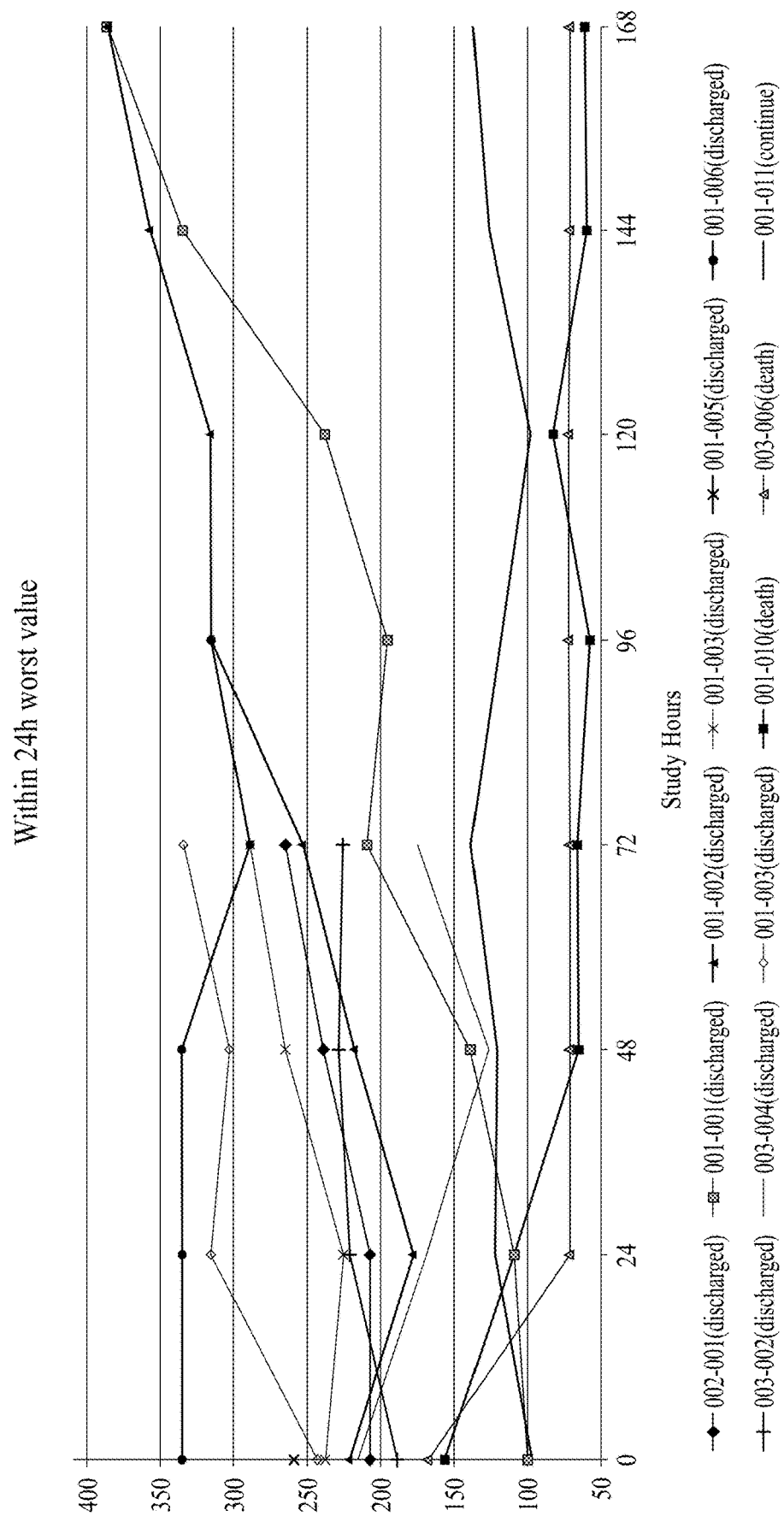
FIG. 5B is a plot showing individual $PaO_2/FiO_2$ data overtime for subjects administered a CRAC inhibitor.

Compound 1 in Severe COVID-19 Pneumonia: $PaO_2/FiO_2$ Results. Partial pressure of oxygen and Fraction of inspired oxygen data including time to discharge are shown in FIG. 4. The missing values after the discharge were imputed by a last-observation-carried-forward (LOCF) method using the exact visit value. $PaO_2/FiO_2$ increased following Compound 1 administration. FIGS. 5A and 5B include individual patient $PaO_2/FiO_2$ data over time for the subjects receiving Compound 1. For FIGS. 4, 5A and 5B, time 0 for the exact visit value is based on a 0 hour visit, and time 0 for the within 24 h worst value is based on a screening visit. The data show that patients receiving Compound 1 had improvements in $PaO_2/FiO_2$. Similar improvements would be expected upon treatment with other intracellular Calcium signaling inhibitors or CRAC inhibitors.

Figure 6:
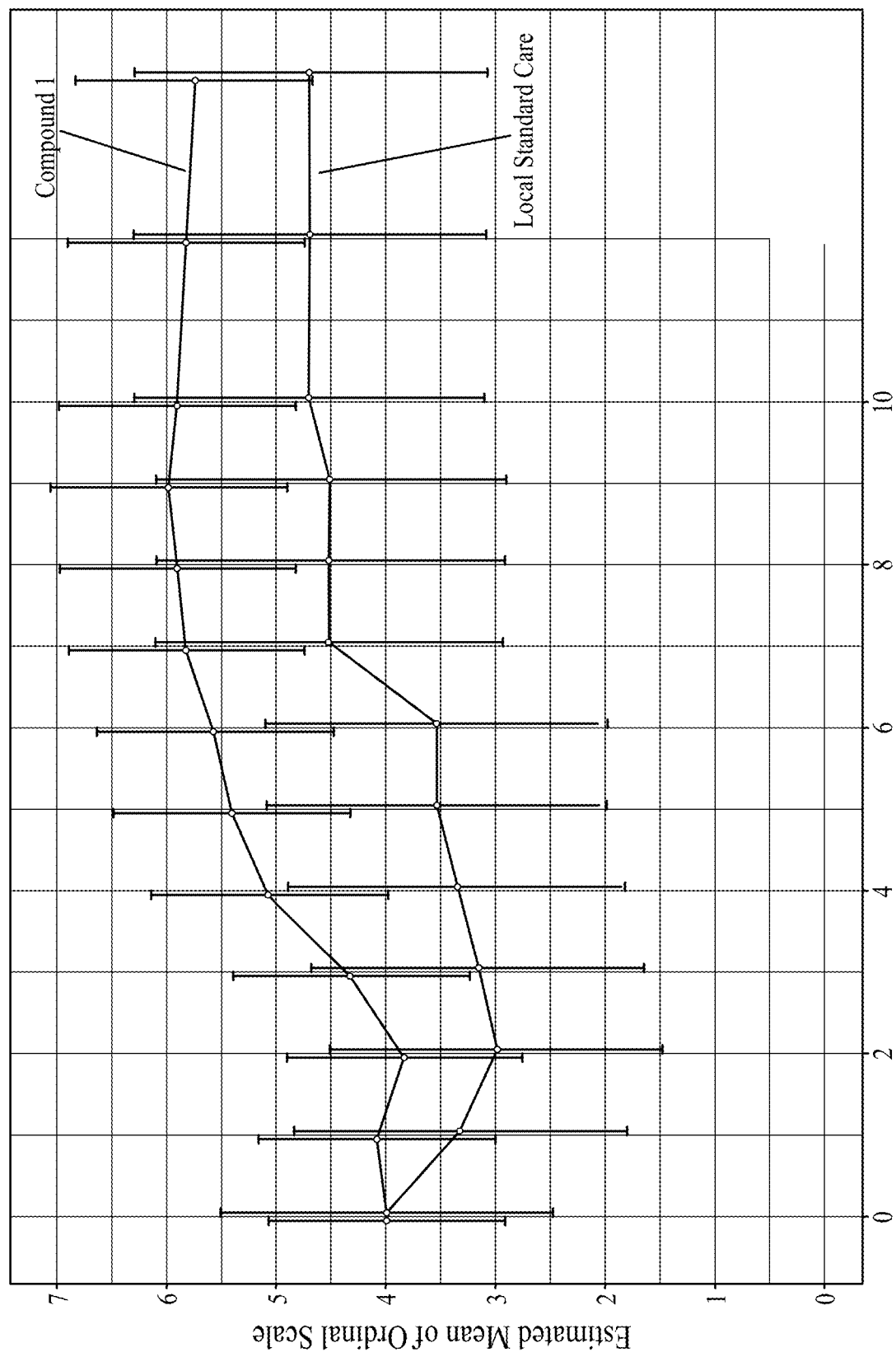
FIG. 6 is a plot showing ordinal scale data for patients treated with a CRAC inhibitor or a control.

Compound 1 in Severe COVID-19 Pneumonia: Ordinal Scale Analysis. Estimated mean (95% confidence interval, CI) of an ordinal scale over time data are shown in FIG. 6 and Table 6. The data in are based on an MMRM model and missing at random assumption. The ordinal scale was as follows: 1. Death 2. Hospitalized, on invasive mechanical ventilation or ECMO 3. Hospitalized, on non-invasive ventilation or high flow oxygen devices 4. Hospitalized, requiring low flow supplemental oxygen 5. Hospitalized, not requiring supplemental oxygen—requiring ongoing medical care (coronavirus (e.g. COVID-19) related or otherwise) 6. Hospitalized, not requiring supplemental oxygen—no longer requires ongoing medical care (other than per protocol study drug administration) 7. Not hospitalized. Subjects treated with Compound 1 exhibited an improvement (an increase in numerical value) in the ordinal scale. Similar improvements would be expected upon treatment with other intracellular Calcium signaling inhibitors or CRAC inhibitors.

TABLE 6

| Study Day | Difference (Compound 1 - Standard Care) | 95% CI | PR > \|t\| |
|---|---|---|---|
| 0 | 0.00 | (-1.87, 1.87) | 1.0000 |
| 1 | 0.75 | (-1.12, 2.62) | 0.4184 |
| 2 | 0.83 | (-1.03, 2.70) | 0.3692 |
| 3 | 1.17 | (-0.70, 3.03) | 0.2116 |
| 4 | 1.73 | (-0.15, 3.61) | 0.0705 |
| 5 | 1.87 | (-0.02, 3.76) | 0.0526 |
| 6 | 2.04 | (0.14, 3.94) | 0.0360 |
| 7 | 1.30 | (-0.61, 3.21) | 0.1749 |
| 8 | 1.39 | (-0.53, 3.31) | 0.1493 |
| 9 | 1.48 | (-0.44, 3.41) | 0.1269 |
| 10 | 1.21 | (-0.73, 3.14) | 0.2132 |
| 12 | 1.31 | (-0.81, 3.07) | 0.2445 |
| 14 | 1.05 | (-0.89, 3.00) | 0.2789 |

Table 7 shows the results of a sensitivity analysis of the ordinal scale results, and includes an estimated mean difference (9500 CI) of the ordinal scale over time. Three patients who had $PaO_2/FiO_2<100$ were removed.

TABLE 7

| Study Day | Difference (Compound 1 − Standard Care) | 95% CI | PR > \|t\| |
|---|---|---|---|
| 0 | 0.00 | (−1.88, 1.88) | 1.0000 |
| 1 | 0.70 | (−1.18, 2.58) | 0.4521 |
| 2 | 0.80 | (−1.08, 2.68) | 0.3910 |
| 3 | 1.10 | (−0.78, 2.98) | 0.2411 |
| 4 | 1.76 | (−0.14, 3.66) | 0.0683 |
| 5 | 2.02 | (−0.10, 3.94) | 0.0397 |
| 6 | 2.23 | (0.30, 4.16) | 0.0253 |
| 7 | 1.79 | (−0.16, 3.73) | 0.0704 |
| 8 | 1.89 | (−0.06, 3.85) | 0.0573 |
| 9 | 1.90 | (−0.07, 3.86) | 0.0576 |
| 10 | 1.81 | (−0.17, 3.78) | 0.0714 |
| 12 | 1.81 | (−0.08, 4.06) | 0.0716 |
| 14 | 2.07 | (−0.89, 3.00) | 0.0420 |
| 16 | 1.82 | (−0.17, 3.82) | 0.0717 |
| 18 | 1.83 | (−0.17, 3.83) | 0.0717 |

Figure 7:
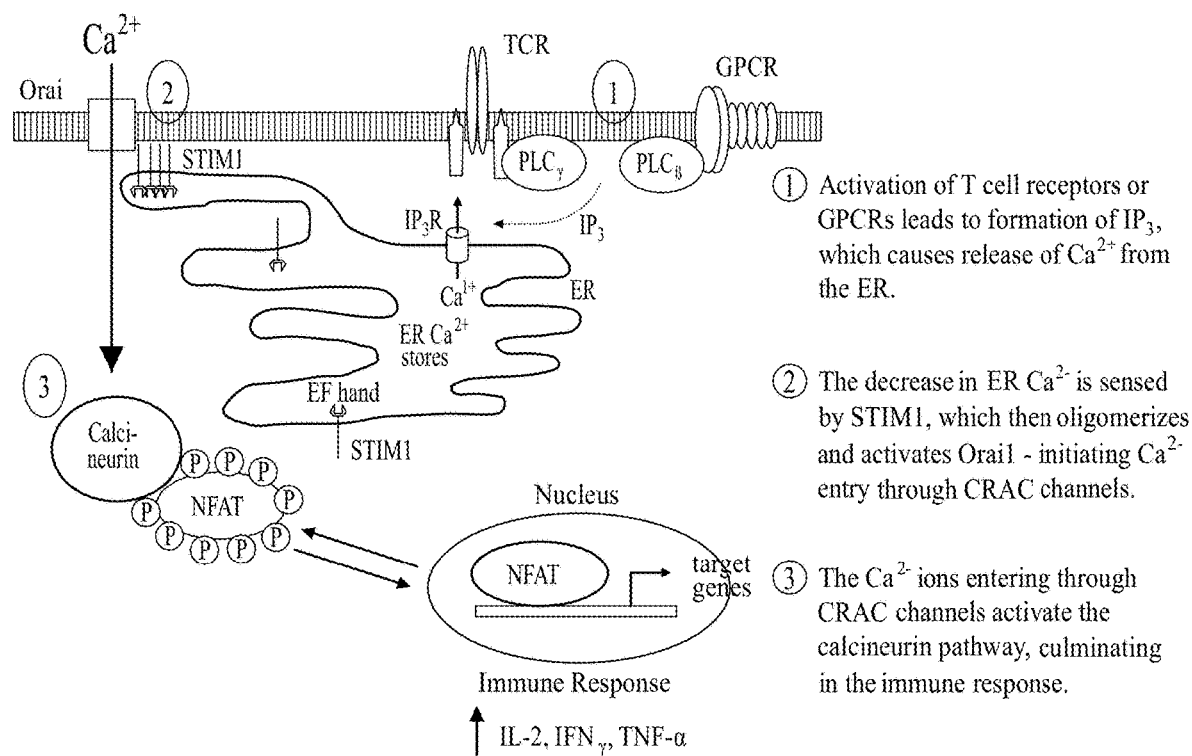
FIG. 7 is an illustration showing a cellular pathway.

Example 6: Additional Information Supporting the Use of CRAC Inhibitors for Treating or Preventing ALI/ARDS CRAC channels may play a proximal role in a calcium-calcineurin pathway leading to cytokine release in immune cells. As shown in FIG. 7, CRAC channels may control a calcium-calcineurin pathway. As demonstrated by the data in Tables 8-10, Compound 1 (a non-limiting example of a CRAC inhibitor) produces potent, concentration-dependent inhibition of cytokine release from human lymphocytes.

TABLE 8

| Isolated Cell Assay | Compound 1 $IC_{50}$ in nM + SEM (n) |
|---|---|
| IL-2 release by human CD4$^+$ T cells | 4 ± 0.5 (4) |
| IL-2 release by human PBMCs | 10 ± 0.4 (3) |
| IL-17 release by human PBMCs | 122 ± 36 (4) |

TABLE 9

| Whole Blood Assay of Stimulated IL-2 Release | Compound 1 $IC_{50}$ in nM + SEM (n) |
|---|---|
| Human | 178 ± 32 (5) |

TABLE 10

| Cytokine Released from Human PBMCs | Compound 1 Replicate $IC_{50}$ Values in nM (Mean) |
|---|---|
| IFNγ | 175, 102 (138) |
| IL-1β | 264, 217 (240) |
| IL-2 | 71, 47 (59) |
| IL-6 | 145, 126 (135) |
| IL-10 | 367, 2239 (303) |
| TNFα | 278, 173 (225) |

Compound 1 has also been shown to decreases cytokine levels in serum and lung, and to protect against lung inflammation in animal models. For example, Compound 1 was effective following i.p. injection in mice (Wen et al., Gastroenterol, 149: 481-492, 2015), and following 4-hour i.v. infusion in rats (Waldron et al., J Physiol, 597.12: 3085-3105, 2019). BTP2 down-regulated inflammatory cytokines associated with lung inflammation, and reduced infiltration of neutrophils into inflamed lung tissue (Gandhirajan et al., J Clin Invest, 123: 887-902, 2013).

CRAC inhibitors may improve vascular integrity in lungs. For example, BTP2 decreased vascular permeability in lungs (Gandhirajan et al., J Clin Invest, 123: 887-902, 2013). Direct endothelial cell protection may be unique to CRAC channel inhibitors, and may have beneficial effects in severe COVID-19 pneumonia separate from those related to cytokine reduction.

Figure 8:
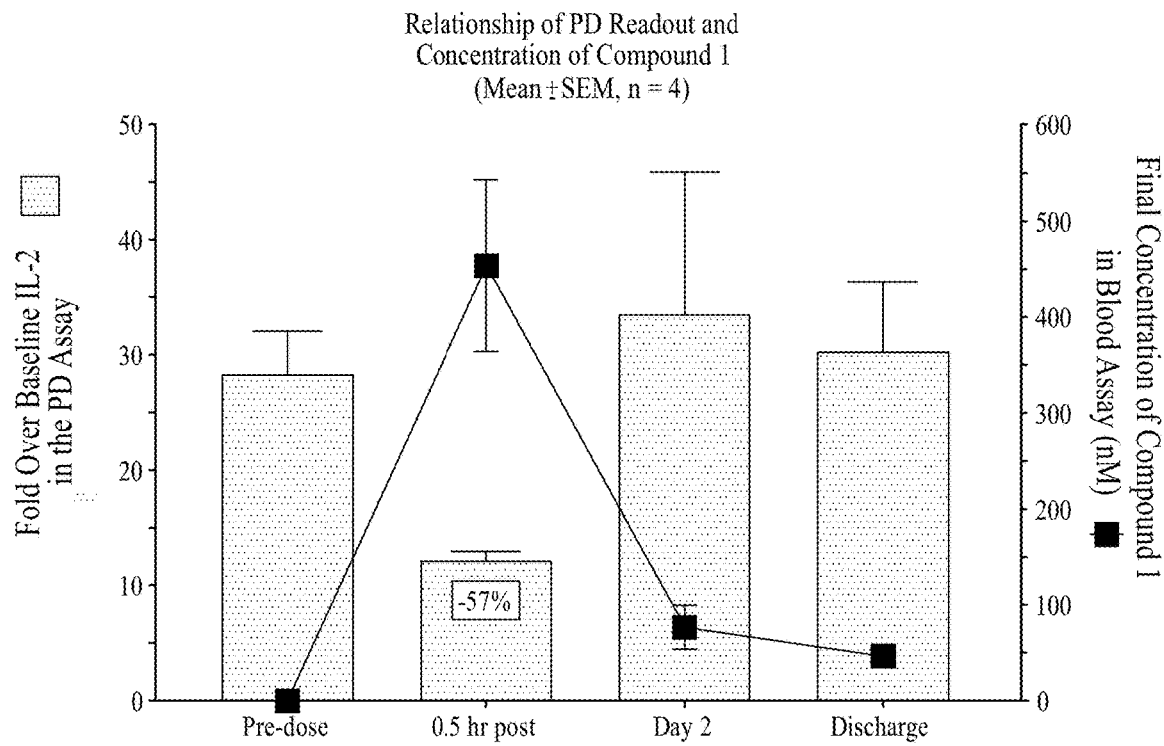
FIG. 8 is a chart showing a relationship of a pharmacodynamics readout and concentration of a CRAC inhibitor.

An intravenous formulation of a CRAC inhibitor comprising Compound 1 allowed rapid delivery and onset of action when a single 2.08 mg/kg dose was given in human patients with acute pancreatitis (AP). Ex vivo whole blood pharmacodynamic (PD) assays of CRAC channel-dependent IL-2 release were performed. The data showed a rapid onset of action—inhibitory effects reached a peak at the end of a 4-hour infusion (at or near Cmax), and recovery after 24 hours showed no long-term immunosuppressive effects (see FIG. 8).

In phase 1 and 2a clinical trials for human subjects (discussed above), no serious adverse events (SAE) or adverse events (AE) classified as moderate or severe in intensity were observed after Compound 1 treatment. Treated subjects in the two highest dose groups in the SAD study and all treated patients in the MAD study were followed for one year in an extension study to assess for long-term SAEs and AEs, and no SAEs or AEs rated moderate or severe in intensity were observed in subjects followed for 365 days. Only 1 mild AE was noted in the extension study. Moderate TEAEs were reported in 1 of 7 patients (14%), and severe TEAEs were reported in 2 of 7 patients (29%). The severe TEAEs were also SAEs. The SAEs were not considered drug related. Severe TEAEs were reported in 0 of 8 (0%) patients receiving the low dose regimen+SC, 2 of 6 (33%) receiving the high dose regimen+SC, and 2 of 7 (29%) receiving SC alone. SAEs were reported in 2 of 8 patients (25%) receiving the low dose regimen+SC, 1 of 6 patients (17%) receiving the high dose regimen+SC and 2 of 7 patients (29%) receiving SC alone. The SAEs were not considered drug related.

Figure 9A:
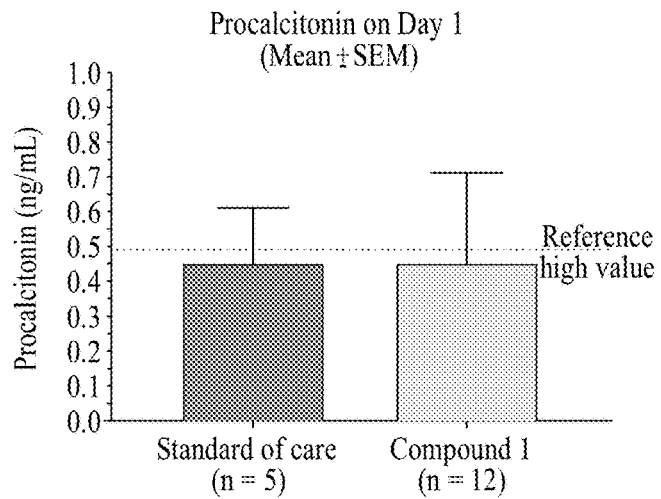
FIG. 9A is a graph indicating procalcitonin levels at a first time point in some human patients treated with a CRAC inhibitor or a standard of care (SOC).
Figure 9B:
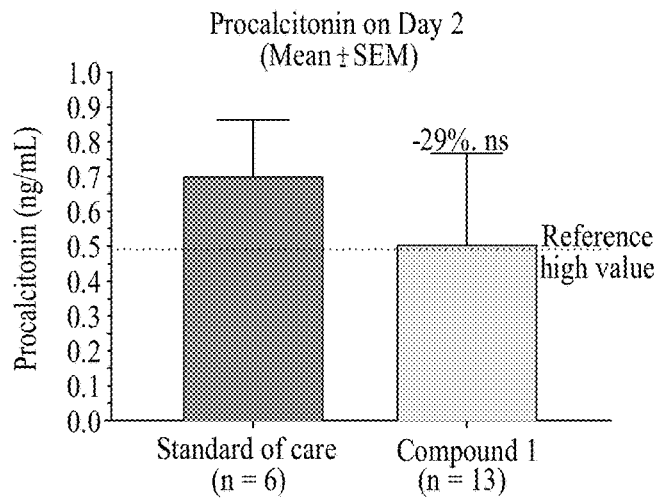
FIG. 9B is a graph indicating procalcitonin levels at a second time point in some human patients treated with a CRAC inhibitor or a standard of care (SOC).
Figure 9C:
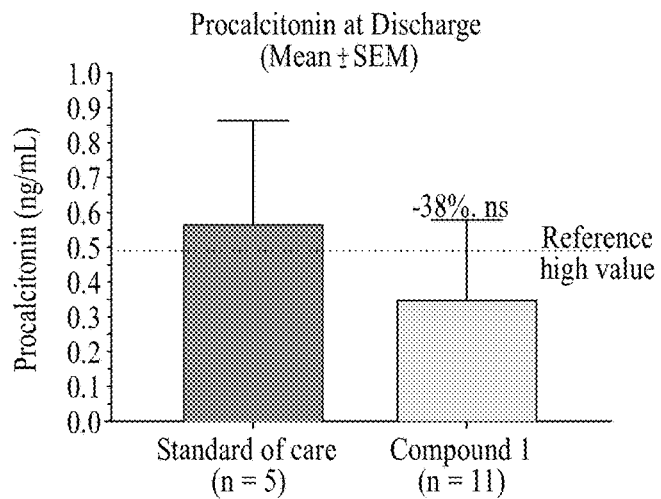
FIG. 9C is a graph indicating procalcitonin levels at a third time point in some human patients treated with a CRAC inhibitor or a standard of care (SOC).

In phase 2a study patients, procalcitonin levels did not increase with Compound 1 treatment versus the standard of care (FIG. 9A-FIG. 9C). Rather, the procalcitonin levels had a decreasing trend with CRAC inhibitor treatment.

Figure 10A:
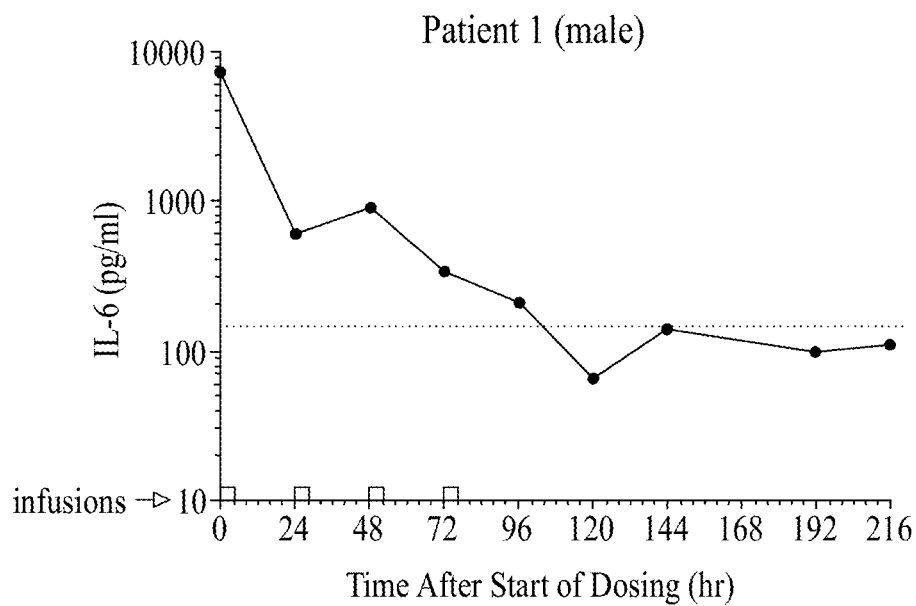
FIG. 10A is a chart showing inflammation marker levels in a first subject before and after CRAC inhibitor treatment.
Figure 10B:
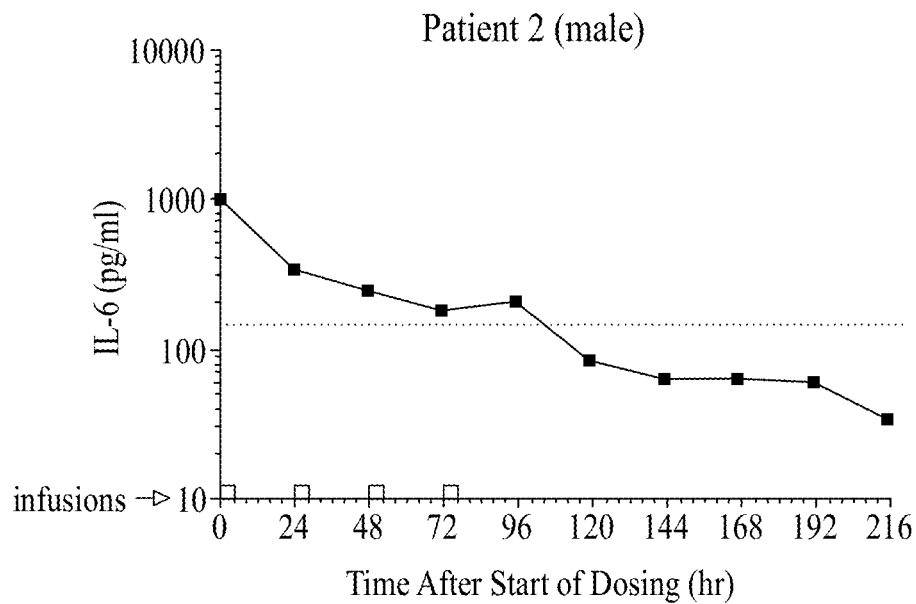
FIG. 10B is a chart showing inflammation marker levels in a second subject before and after CRAC inhibitor treatment.

Treatment of patients with severe AP had beneficial effects on IL-6 levels (see Table 11). Further, a rapid drop in markedly elevated IL-6 levels was seen in two critically ill patients with AP upon treatment with the CRAC inhibitor. The first of the two patients had the following parameters: IL-6>7296 pg/mL at study entry, 66 at 120 hrs; $ePaO_2/FiO_2 \leq 300$ in first 24 hours; WBC 3000/mm$^3$ at study entry; managed with high flow oxygen and intermittent bi-pap; no invasive mechanical ventilation; discharged home on room air day 8; procalcitonin 0.24 ng/mL at discharge; and 90 day follow up: alive, no SAEs (see FIG. 10A). The second of the two patients had the following parameters: IL-6 1021 pg/mL at study entry, 83 at 120 hrs; $ePaO_2/FiO_2 \leq 300$ in first 24 hours; ANC/ALC 76.5 at study entry; managed with oxygen; no invasive mechanical ventilation; on room air by 60 hours (before 4th infusion); procalcitonin 0.30 ng/mL at discharge; and 90 day follow up: alive, no SAEs (see FIG. 10B).

TABLE 11

|  | Admission IL-6 levels | | Discharge IL-6 levels | |
| --- | --- | --- | --- | --- |
|  | IL-6 ≥ 1000 pg/mL | 150 pg/mL ≤ IL-6 < 1000 pg/mL | IL-6 ≥ 1000 pg/mL | 150 pg/mL ≤ IL-6 < 1000 pg/mL |
| 2a Standard of Care Alone | 0 | 3 | 0 | 2 |
| 2a Low Dose Compound 1 Regimen + SC | 0 | 4 | 0 | 0 |
| 2a High Dose Compound 1 Regimen + SC | 2 | 1 | 0 | 1 |
| PK/PD Single Dose Compound 1 | 0 | 1 | 0 | 0 |

Example 7: Effect of CRAC Channel Inhibition on D-Dimer Levels

CRAC channel inhibitors stabilize the pulmonary endothelium and block proinflammatory cytokine release, potentially mitigating respiratory complications in patients with COVID-19. D-dimer levels have been correlated with disease severity and risk of mortality in patients with COVID-19. The effect of CRAC channel inhibition on D-dimer levels was investigated.

17 patients with severe COVID-19 pneumonia were randomized to Auxora and 9 to standard of care (SOC). All patients received anticoagulation according to SOC. Over the course of the study, D-dimer levels decreased in patients receiving Auxora but increased in those receiving SOC. From baseline to 48 hours, the median change was −0.24 μg/mL for patients receiving Auxora (n=10) and 0.63 μg/mL in patients receiving SOC (n=8), and from baseline to 96 hours the median change was −0.85 μg/mL (n=6) and 0.07 μg/mL (n=3), respectively. Two patients receiving SOC developed femoral deep vein thrombosis. No patients receiving Auxora developed thromboembolic disease. In the 30 days post-randomization, 2 patients receiving Auxora and 2 receiving SOC died due to respiratory failure, all of whom experienced >100% increase in D-dimer levels in the first 48 hours.

Auxora demonstrated improved D-dimer levels as early as 48 hours, a favorable safety profile, and improved clinical outcomes. Results from this study suggest that a >100% increase in D-dimer levels in the first 48 hours may identify patients with severe COVID-19 at risk for mortality from respiratory failure.

Figure 11:
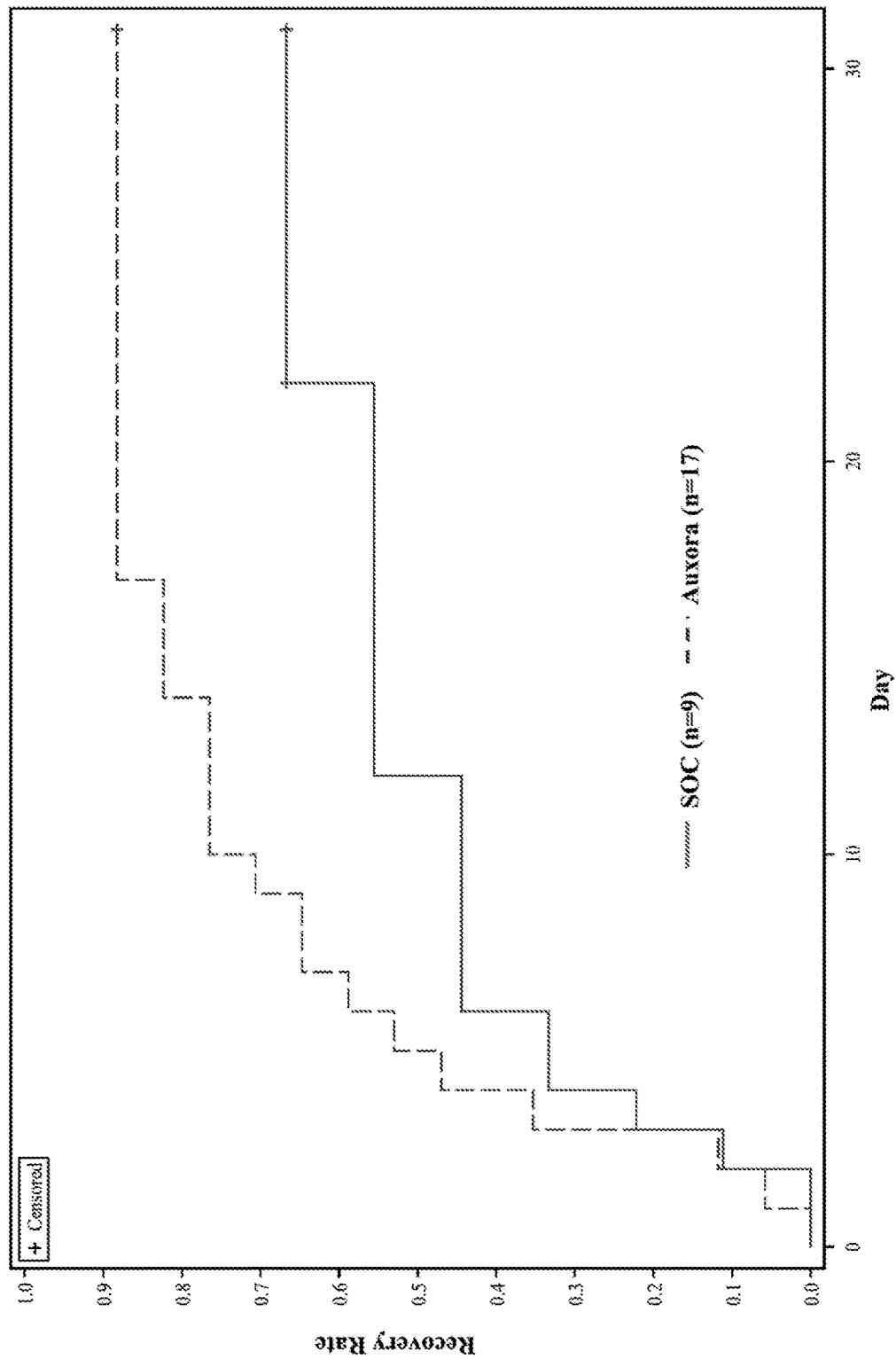
FIG. 11 is a chart showing the recovery rate among severe COVID-19 pneumonia patients treated with Auxora versus those treated with standard of care.

Example 8: Auxora Versus Standard of Care for the Treatment of Severe COVID-19 Pneumonia: Results from a Randomized Controlled Trial 17 patients with severe COVID-19 pneumonia were randomized to Auxora and 9 to standard of care (SOC). The difference in recovery rate between patients treated with Auxora and those receiving standard of care is summarized in FIG. 11. Recovery rate is defined as the first day the patient satisfied criterion 6, 7, or 8 of the 8-point ordinal scale (1. Death 2. Hospitalized, requiring invasive mechanical ventilation or ECMO 3. Hospitalized, requiring non-invasive medical ventilation or high-flow supplemental oxygen 4. Hospitalized, requiring low-flow supplemental oxygen 5. Hospitalized, not requiring supplemental oxygen but requiring ongoing medical care 6. Hospitalized, not requiring supplemental oxygen or ongoing medical care 7. Discharged, requiring supplemental oxygen 8. Discharged, not requiring supplemental oxygen) Patients treated with Auxora had a shorter median time to recovery (5 days) than patients treated with SOC (12 days); the recovery rate ratio was 1.87 (95% confidence interval [CI], 0.72 to 4.89.

Figure 12:
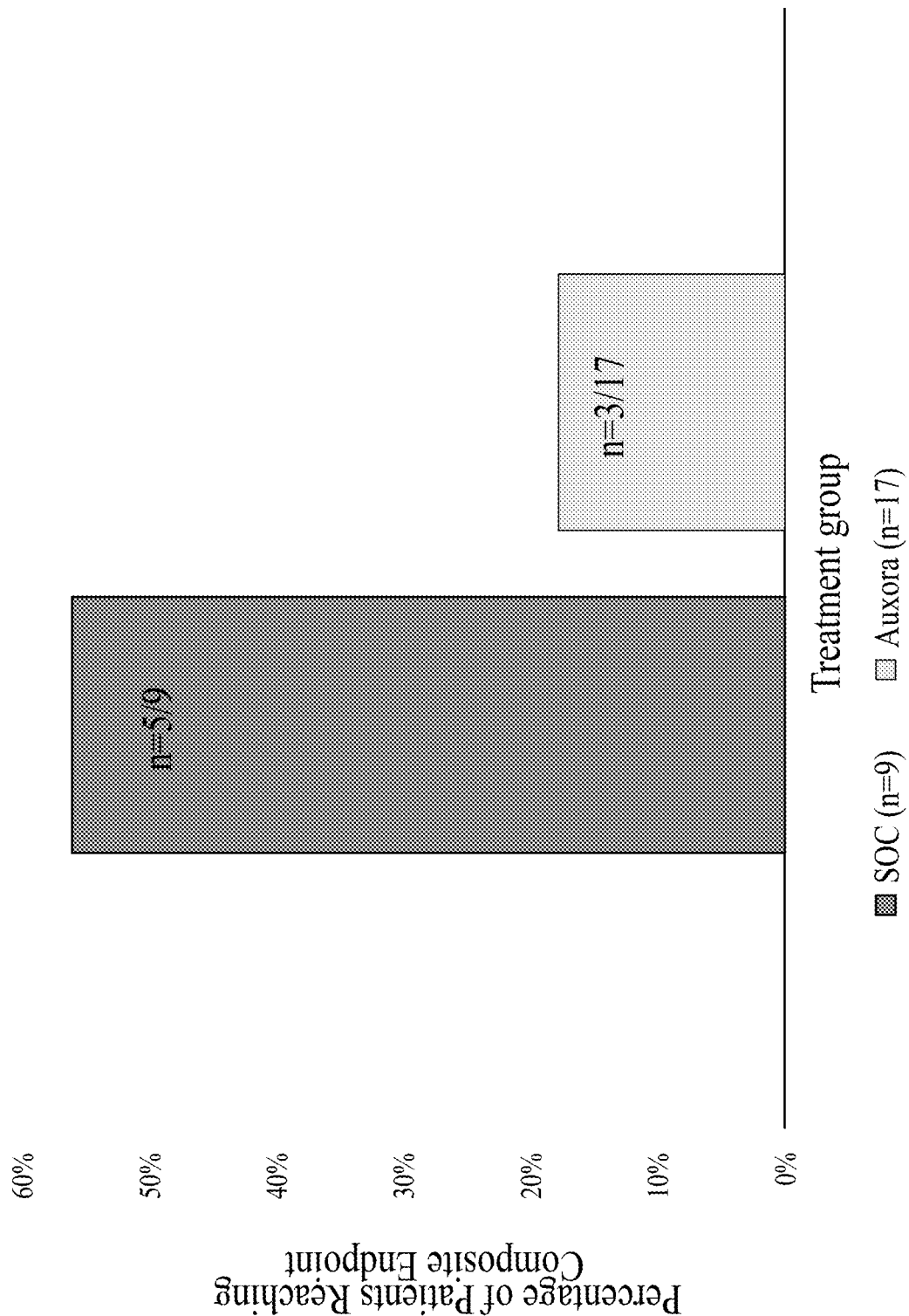
FIG. 12 is a graph showing the percentage of patients reaching a composition endpoint for severe COVID-19 pneumonia patients treated with Auxora versus those treated with standard of care.

Further, three of the 17 patients treated with Auxora (18%) were intubated compared to four of eight (50%) of the patients assigned to standard of care (95% CI, −0.07 to 0.71). The reduction was most pronounced in patients with a baseline $PaO_2/FiO_2$ between 101 and 200, in which only one of six patients (17%) treated with Auxora required intubation compared to three of four patients (75%) assigned to standard of care. No patients receiving Auxora or standard of care with a baseline $PaO_2/FiO_2 > 200$ required invasive mechanical ventilation. A composite endpoint of death or invasive mechanical ventilation occurred less frequently in patients treated with Auxora (18%) compared to those assigned to standard of care (56%) with a hazard ratio of 0.23 (95% CI, 0.05 to 0.96; P<0.05). The percentage of patients reaching a composite endpoint is summarized in FIG. 12.

Figure 13:
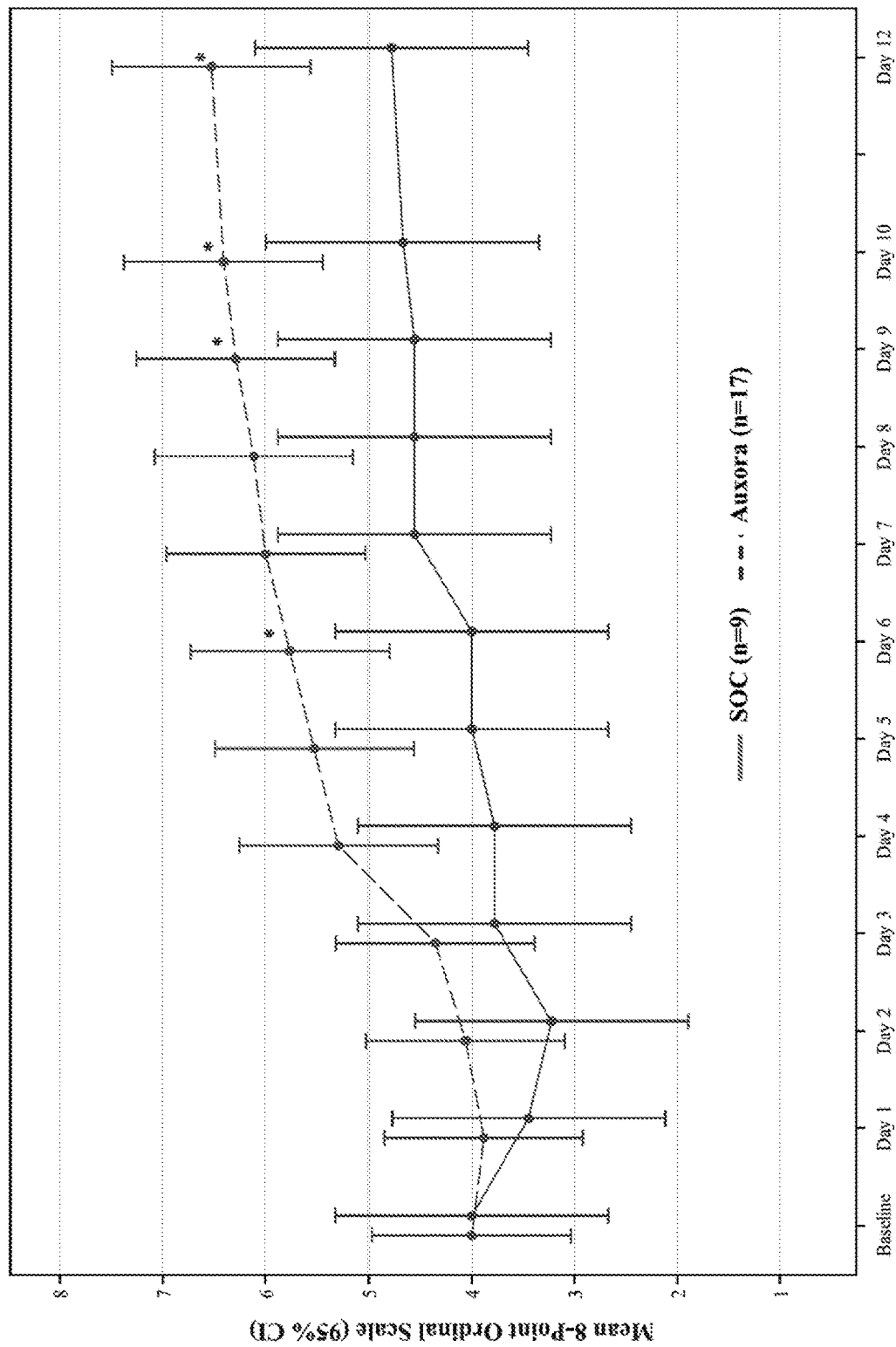
FIG. 13 is a chart showing eight-point ordinal scale over time in severe COVID-19 pneumonia patients treated with Auxora versus those treated with standard of care.
Figure 14:
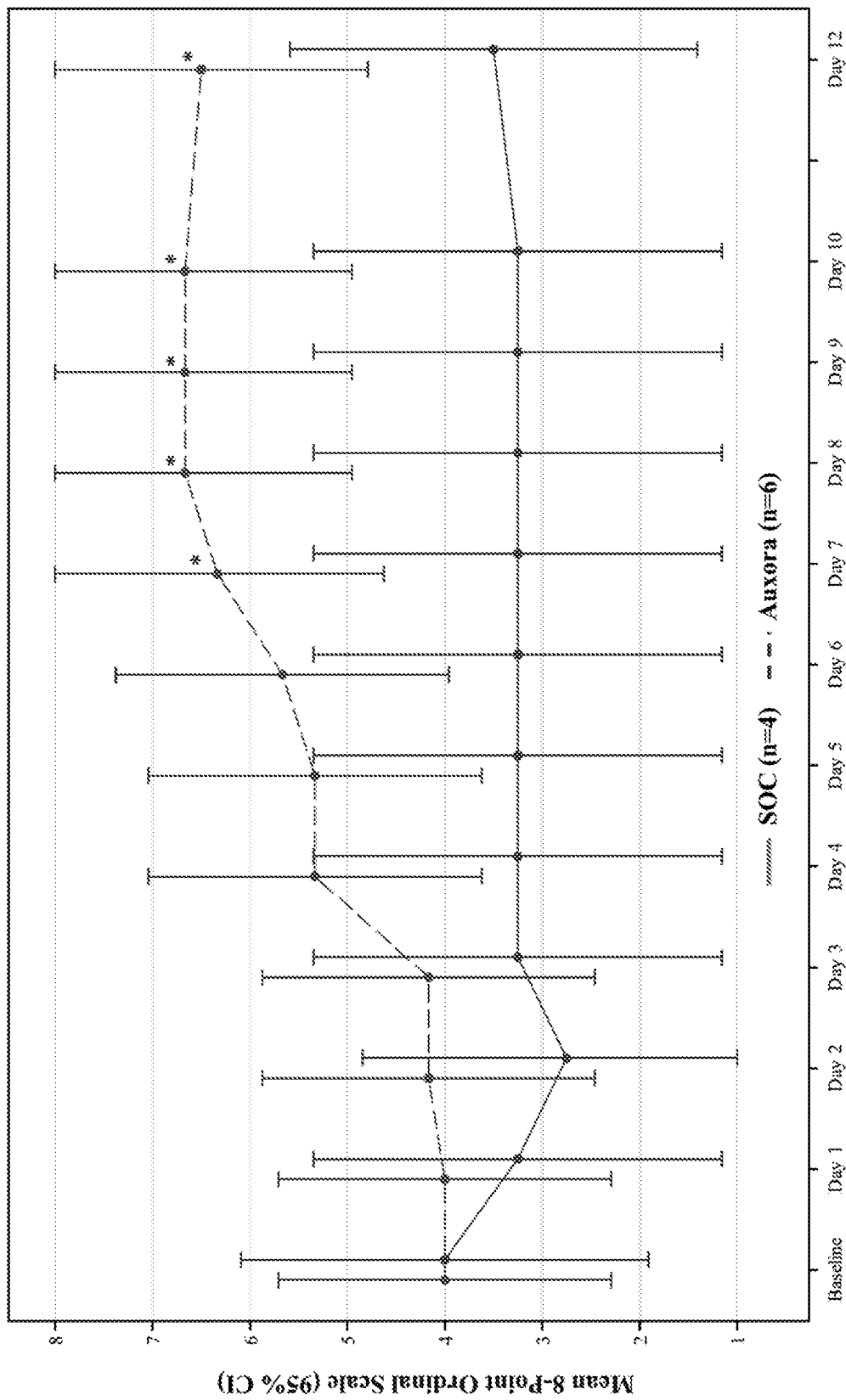
FIG. 14 is a chart showing eight-point ordinal scale over time in severe COVID-19 pneumonia (with $PaO_2/FiO_2$ between 101 and 200) patients treated with Auxora versus those treated with standard of care.

Clinical improvement, as measured by the mean of an 8-point ordinal scale, was greater in the Auxora group starting at day 4, reaching statistical significance on day 6, and remained significant from day 9 to day 12 (P<0.05; data summarized in FIG. 13). On day 4, the odds ratio for clinical deterioration on the 8-point ordinal scale for the Auxora group compared to the standard of care group was 0.21 (95% CI, 0.04 to 0.098; P<0.05). The clinical improvement was most pronounced in patients with a baseline $PaO_2/FiO_2$ between 101 and 200, with the difference in means reaching statistical significance at day 7; this was maintained through day 12 (P<0.05; data summarized in FIG. 14).

Example 9: Alveolitis in Severe COVID-19 Pneumonia

The relatively high mortality rate among severe COVID-19 pneumonia patients, combined with a systemic inflammatory response that is severe in some patients, has led to speculation that the pathobiology of COVID-19 pneumonia is distinct from other respiratory viral and bacterial pathogens.

Bronchoalveolar lavage (BAL) fluid is obtained from patients with respiratory failure secondary to severe COVID-19 pneumonia and compared with BAL specimens from patients with pneumonia secondary to other pathogens and intubated patients without pneumonia. The obtention of samples within 48 hours of intubation and sequentially over the course of the illness provides insight about the early pathogenesis of COVID-19-induced acute respiratory distress syndrome (ARDS). BAL samples are profiled using multicolor flow cytometry to identify CD4+ and CD8+ T cells, monocytes, mature and immature alveolar macrophages, and neutrophils. Bulk transcriptomic profiling of flow cytometry-sorted alveolar macrophages in a subject of patients with confirmed COVID-19 is also performed. Finally, single cell RNA-Seq on BAL fluid collected less than 48 hours after intubation from patients with severe COVID-19 pneumonia is performed.

Flow Cytometry and Cell Sorting

Non-bronchoscopic BAL (NBBAL) and BAL samples are filtered through a 70 m cell strainer, pelleted by centrifugation at 300 ref for 10 min at 4 C, followed by hypotonic lysis of red blood cells with 2 mL of BD PharmLyse reagent for 2 min. Lysis is stopped by adding 18 mL of MACS buffer. Cells are pelleted again and resuspended in 100 μL of Fc-Block (Human TruStain FcX, Biolegend), and a 10 μL aliquot is taken for counting using K2 Cellometer (Nexcelom) with AO/PI reagent. The volume of Fc-Block is adjusted so the concentration of cells is always less than $5 \times 10^7$ cells/mL and the fluorophore-conjugated antibody cocktail is added in 1:1 ratio. After incubation at 4 C for 30 min cells are washed with 5 mL of MACS buffer, pelleted by centrifugation and resuspended in 500 μL of MACS buffer+ 2 μL of SYTOX Green viability dye (ThermoFisher). Cells are sorted on FACS Aria II SORP instrument using 100 um nozzle and 20 psi pressure. Cells are sorted into 300 μL of MACS buffer for bulk RNA-seq or 300 μL of 2% BSA in PBS for single cell RNA-Seq. Sample processing is performed in a BSL-2 facility using BSL-3 practices.

Bulk RNA-Seq of Flow-Sorted Alveolar Macrophages

Immediately after sorting, cells are pelleted by centrifugation and lysed in 350 μL of RLT Plus lysis buffer (Qiagen) supplemented with 2-mercaptoethanol. Lysed cells are stored at −80 C until RNA isolation using AllPrep DNA/RNA Micro kit according to manufacturer's protocol (Qiagen). RNA quality and quantity are assessed using TapeStation 4200 High Sensitivity RNA tapes (Agilent) and RNA-Seq libraries are prepared from 250 pg of total RNA using SMARTer Stranded Total RNA-Seq Kit v2 (Takara Bio). After QC using TapeStation 4200 High Sensitivity DNA tapes (Agilent) dual indexed libraries are pooled and sequenced on a NextSeq 500 instrument (Illumina), 75 cycles, single-end, to an average sequencing depth of 19.55M reads.

FASTQ files are generated using bcl2fastq (Illumina). To enable detection of viral RNA, a custom hybrid genome is prepared by joining FASTA, GFF, and GTF files for GRCh37.87, SARS-CoV-2 (NC_045512.2)—virus causing COVID-19, and Influenza A/California/07/2009 (GCF_001343785.1). An additional negative strand transcript spanning the entirety of the SARS-CoV-2 genome is then added to the GTF and GFF files to enable detection of SARS-CoV-2 replication. Normalized counts tables later reveal extremely high enrichment of SARS-CoV-2 transcripts in diagnosed COVID-19 patients, and strong enrichment of IAV genes in patients marked as other viral pneumonia. To facilitate reproducible analysis, samples are processed using the publicly available nf-core/RNA-seq pipeline version 1.4.2 implemented in Nextflow 19.10.0 using Singularity 3.2.1-1 with the minimal command nextflow run nf-core/rnaseq -r 1.4.2 -singleEnd -profile singularity -unStranded --three_prime_clip_r2 3. Briefly, lane-level reads are trimmed using trimGalore! 0.6.4 and aligned to the hybrid genome described above using STAR 2.6.1d. Gene-level assignment is then performed using featureCounts 1.6.4.

Single Cell RNA-Seq of Flow-Sorted BAL Cells

Cells are sorted into 2% BSA in DPBS, pelleted by centrifugation at 300 ref for 5 min at 4 C, and resuspended in 0.1% BSA in DPBS to ~1000 cells/ul concentration. Concentration is confirmed using K2 Cellometer (Nexcelom) with AO/PI reagent and ~5,000-10,000 cells are loaded on 10× Genomics Chip A with Chromium Single Cell 5' gel beads and reagents (10× Genomics). Libraries are prepared according to manufacturer protocol (10× Genomics, CG000086_RevM). After quality check single cell RNA-seq libraries are pooled and sequenced on NovaSeq 6000 instrument.

Data is processed using Cell Ranger 3.1.0 pipeline (10× Genomics). To enable detection of viral RNA, reads are aligned to a custom hybrid genome containing GRCh38.93 and SARS-CoV-2 (NC_045512.2). An additional negative strand transcript spanning the entirety of the SARS-CoV-2 genome is then added to the GTF and GFF files to enable detection of SARS-CoV-2 replication. Data is processed using Scanpy v1.5.1, doublets are detected with scrublet v0.2.1 and removed, ribosomal genes are removed and multisample integration is performed with BBKNN v1.3.12. Gene set enrichment analysis is performed with signatures retrieved from gseamsigdb.org website using following terms:

HALLMARK_INTERFERON_GAMMA_RESPONSE M5913,

HALLMARK_INTERFERON_ALPHA_RESPONSE M5911. Computations are automated with snakemake v5.5.4.

What is claimed is:

1. A method for treating acute lung injury (ALI) or acute respiratory distress syndrome (ARDS) in a subject comprising administering a therapeutically effective amount of an intracellular Calcium signaling inhibitor to said subject.

2. The method of claim 1, wherein the ALI or ARDS comprises pneumonia.

3. The method of claim 2, wherein the pneumonia comprises a viral pneumonia.

4. The method of claim 3, wherein the viral pneumonia comprises a viral pneumonia due to a coronavirus, an adenovirus, an influenza virus, a rhinovirus, or a respiratory syncytial virus.

5. The method of claim 4, wherein the viral pneumonia comprises a viral pneumonia due to a coronavirus.

6. The method of claim 5, wherein the coronavirus is SARS-COV, SARS-COV-2, or MERS-COV.

7. The method of claim 6, wherein the coronavirus is SARS-COV-2.

8. The method of claim 3, wherein the viral pneumonia comprises a viral pneumonia due to an influenza virus.

9. The method of claim 8, wherein the influenza virus comprises influenza A, influenza B, influenza C, or influenza D.

10. The method of claim 1, wherein the ALI or ARDS is caused by a ventilator.

11. The method of claim 1, subsequent to said administering a therapeutically effective amount of an intracellular Calcium signaling inhibitor, an expression level or circulating level of a cytokine is decreased from a baseline level in said subject.

12. The method of claim 11, wherein said cytokine is selected from the group consisting of IL-2, IL-6, IL-7, IL-17, TNF-α, IFN-α, IFN-β, IFN-ω, and IFN-γ.

13. The method of claim 1, subsequent to said administering a therapeutically effective amount of an intracellular Calcium signaling inhibitor, an expression level or circulating level of D-dimer is decreased from a baseline level in said subject.

14. The method of claim 1, wherein said intracellular Calcium signaling inhibitor is a compound having the structure of: N-(5-(6-ethoxy-4-methylpyridin-3-yl)pyrazin-2-yl)-2,6-difluorobenzamide, N-(5-(2-ethyl-6-methylbenzo[d]oxazol-5-yl)pyridin-2-yl)-3,5-difluoroisonicotinamide, N-(4-(1-ethyl-3-(thiazol-2-yl)-1H-pyrazol-5-yl)phenyl)-2-fluorobenzamide, N-(5-(1-ethyl-3-(triflouromethyl)-1H-pyrazol-5-yl)pyrazin-2-yl)-2,4,6-trifluorobenzamide, 4-chloro-1-methyl-N-(4-(1-methyl-3-(trifluoromethyl)-1H-pyrazol-5-yl)phenyl)-1H-pyrazole-5-carboxamide, N-(4-(3-(difluoromethyl)-5-methyl-1H-pyrazol-1-yl)-3-fluorophenyl)-2,6-difluorobenzamide, N-(4-(3-(difluoromethyl)-5-methyl-1H-pyrazol-1-yl)-3-fluorophenyl)-2,4,6-trifluorobenzamide, N-(4-(3-(difluoromethyl)-1-methyl-1H-pyrazol-5-yl)-3-fluorophenyl)-2,4,6-trifluorobenzamide, 4-chloro-N-(3-fluoro-4-(1-methyl-3-(trifluoromethyl)-1H-pyrazol-5-yl)phenyl)-1-methyl-1H-pyrazole-5-carboxamide, 3-fluoro-4-(1-methyl-3-(trifluoromethyl)-1H-pyrazol-5-yl)-N-((3-methylisothiazol-4-yl)methyl)aniline, N-(5-(7-chloro-2,3-dihydro-[1,4]dioxino[2,3-b]pyridin-6-yl)pyridin-2-yl)-2,6-difluorobenzamide, N-(2,6-difluorobenzyl)-5-(1-ethyl-3-(thiazol-2-yl)-1H-pyrazol-5-yl)pyrimidin-2-amine, 3,5-difluoro-N-(3-fluoro-4-(3-methyl-1-(thiazol-2-yl)-1H-pyrazol-4-yl)phenyl)isonicotinamide, 5-(1-methyl-3-(trifluoromethyl)-1H-pyrazol-5-yl)-N-(2,4,6-trifluorobenzyl)pyridin-2-amine, N-(5-(1-ethyl-3-(trifluoromethyl)-1H-pyrazol-5-yl)pyridin-2-yl)-2,4,6-trifluorobenzamide, N-(5-(5-chloro-2-methylbenzo[d]oxazol-6-yl)pyrazin-2-yl)-2,6-difluorobenzamide, N-(5-(6-ethoxy-4-methylpyridin-3-yl)thiazol-2-yl)-2,3,6-trifluorobenzamide, N-(5-(1-ethyl-3-(trifluoromethyl)-1H-pyrazol-5-yl)pyridin-2-yl)-2,3,6-trifluorobenzamide, 2,3,6-trifluoro-N-(3-fluoro-4-(1-methyl-3-(trifluoromethyl)-1H-pyrazol-5-yl)phenyl)benzamide, 2,6-difluoro-N-(4-(5-methyl-2-(trifluoromethyl)oxazol-4-yl)phenyl)benzamide, or N-(5-(6-chloro-2,2-difluorobenzo[d][1,3]dioxol-5-yl)pyrazin-2-yl)-2-fluoro-6-methylbenzamide, or a pharmaceutically acceptable salt, pharmaceutically acceptable solvate, or pharmaceutically acceptable prodrug thereof.

15. The method of claim 14, wherein said intracellular Calcium signaling inhibitor is a compound of chemical name N-(5-(6-Chloro-2,2-difluorobenzo[d][1,3]dioxol-5-yl)pyrazin-2-yl)-2-fluoro-6-methylbenzamide or a pharmaceutically acceptable salt, pharmaceutically acceptable solvate, or pharmaceutically acceptable prodrug thereof.

16. The method of claim 14, wherein said intracellular Calcium signaling inhibitor is a compound of chemical name N-(2,6-difluorobenzyl)-5-(1-ethyl-3-(thiazol-2-yl)-1H-pyrazol-5-yl)pyrimidin-2-amine or a pharmaceutically acceptable salt, pharmaceutically acceptable solvate, or pharmaceutically acceptable prodrug thereof.

17. A composition comprising an intracellular Calcium signaling inhibitor and at least a compound for treating ALI or ARDS.

18. A pharmaceutical composition comprising a therapeutically effective amount of a compound of claim 14, and a pharmaceutically acceptable excipient.

19. The composition of claim 17, wherein said compound is selected from the list consisting of a prostaglandin inhibitor, complement inhibitor, β-agonist, beta-2 agonist, granulocyte macrophage colony-stimulating factor, corticosteroid, N-acetylcysteine, statin, glucagon-like peptide-1 (7-36) amide (GLP-1), triggering receptor expressed on myeloid cells (TREM1) blocking peptide, 17-allylamino-17-demethoxygeldanamycin (17-AAG), antibody to tumor necrosis factor (TNF), recombinant interleukin (IL)-1 receptor antagonist, cisatracurium besilate, an antiviral, remdesivir, hydroxycholoroquine, chloroquine, and Angiotensin-Converting Enzyme (ACE) Inhibitor.

20. The method of claim 14, wherein said intracellular Calcium signaling inhibitor is a compound of chemical name N-(5-(7-chloro-2,3-dihydro-[1,4]dioxino[2,3-b]pyridin-6-yl)pyridin-2-yl)-2,6-difluorobenzamide or a pharmaceutically acceptable salt, pharmaceutically acceptable solvate, or pharmaceutically acceptable prodrug thereof.

* * * * *